US009418675B2

(12) United States Patent
Zhu et al.

(10) Patent No.: US 9,418,675 B2
(45) **Date of Patent: *Aug. 16, 2016**

(54) WEARABLE COMMUNICATION SYSTEM WITH NOISE CANCELLATION

(71) Applicants: Manli Zhu, New City, NY (US); Qi Li, New Providence, NJ (US); Xuling Luo, Freehold, NJ (US); Danny Kopit, Brooklyn, NY (US)

(72) Inventors: Manli Zhu, New City, NY (US); Qi Li, New Providence, NJ (US); Xuling Luo, Freehold, NJ (US); Danny Kopit, Brooklyn, NY (US)

(73) Assignee: LI CREATIVE TECHNOLOGIES, INC., Florham Park, NJ (US)

( * ) Notice: Subject to any disclaimer, the term of this patent is extended or adjusted under 35 U.S.C. 154(b) by 267 days.

This patent is subject to a terminal disclaimer.

(21) Appl. No.: 14/082,085

(22) Filed: Nov. 15, 2013

(65) Prior Publication Data

US 2014/0081631 A1 Mar. 20, 2014

Related U.S. Application Data

(63) Continuation-in-part of application No. 12/924,681, filed on Oct. 4, 2010, now Pat. No. 8,606,572.

(60) Provisional application No. 61/851,636, filed on Mar. 12, 2013.

(51) Int. Cl.

| | |
|---|---|
| ***G10L 15/20*** | (2006.01) |
| ***G10L 21/0208*** | (2013.01) |
| *G10L 21/0216* | (2013.01) |

(52) U.S. Cl.

CPC ... *G10L 21/0208* (2013.01); *G10L 2021/02165* (2013.01)

(58) Field of Classification Search

CPC ........................ G10L 21/0208; G10L 15/20
USPC ............................................ 704/233, 226
See application file for complete search history.

(56) References Cited

U.S. PATENT DOCUMENTS

| | | | | |
|---|---|---|---|---|
| 3,723,670 | A * | 3/1973 | Sebesta et al. | 379/430 |
| 4,023,209 | A * | 5/1977 | Frieder et al. | 2/6.6 |
| 4,154,981 | A * | 5/1979 | Dewberry et al. | 379/175 |
| 4,374,301 | A * | 2/1983 | Frieder, Jr. | 379/430 |
| 5,012,519 | A * | 4/1991 | Adlersberg et al. | 704/226 |
| 5,034,747 | A * | 7/1991 | Donahue | 342/20 |
| 5,060,308 | A * | 10/1991 | Bieback | 398/133 |
| 5,136,555 | A * | 8/1992 | Gardos | 367/132 |
| 5,159,641 | A * | 10/1992 | Sopko et al. | 381/367 |

(Continued)

*Primary Examiner* — Jialong He

(74) *Attorney, Agent, or Firm* — Ash Tankha; Lipton, Weinberger & Husick

(57) ABSTRACT

A method and a wearable communication system for personal face-to-face and wireless communications in high noise environments are provided. A noise cancellation device (NCD) operably coupled to a wireless coupling device (WCD) includes a speech acquisition unit, an audio signal processing unit, one or more loudspeakers, and a communication module. The NCD receives voice vibrations from user speech via a contact microphone and a second microphone and converts the voice vibrations into an audio signal. The NCD processes the audio signal to remove noise signals and enhance a speech signal contained in the audio signal. A loudspeaker emits the speech signal during face-to-face communication. The NCD transmits the speech signal to a communication device via the WCD and receives an external speech signal from the communication device during wireless communication. With the NCD, the signal intelligibility and signal-to-noise ratio can be improved, for example, from −10 dB to 20 dB.

40 Claims, 43 Drawing Sheets

(56) References Cited

U.S. PATENT DOCUMENTS

| | | | | | |
|---|---|---|---|---|---|
| 5,195,528 | A | * | 3/1993 | Hok | 600/538 |
| 5,280,524 | A | * | 1/1994 | Norris | 379/388.02 |
| 5,282,253 | A | * | 1/1994 | Konomi | 381/151 |
| 5,574,794 | A | * | 11/1996 | Valley | 381/361 |
| 5,579,284 | A | * | 11/1996 | May | 367/132 |
| 5,586,176 | A | * | 12/1996 | Peck | 379/175 |
| 5,889,871 | A | * | 3/1999 | Downs, Jr. | 381/173 |
| 5,990,793 | A | * | 11/1999 | Bieback | 340/573.1 |
| 2002/0068616 | A1 | * | 6/2002 | Tabata et al. | 455/568 |
| 2003/0059078 | A1 | * | 3/2003 | Downs et al. | 381/381 |
| 2005/0033571 | A1 | * | 2/2005 | Huang et al. | 704/231 |
| 2006/0009970 | A1 | * | 1/2006 | Harton et al. | 704/231 |
| 2006/0206320 | A1 | * | 9/2006 | Li | 704/226 |
| 2006/0286933 | A1 | * | 12/2006 | Harkins et al. | 455/41.2 |
| 2008/0219456 | A1 | * | 9/2008 | Goldstein et al. | 381/56 |

* cited by examiner

Energy-based Algorithm

Change-point Detection Algorithm

WEARABLE COMMUNICATION SYSTEM WITH NOISE CANCELLATION

CROSS REFERENCE TO RELATED APPLICATIONS

This application is a continuation-in-part application of non-provisional patent application Ser. No. 12/924,681 titled "Noise cancellation device for communications in high noise environments", filed in the United States Patent and Trademark Office on Oct. 4, 2010, and claims priority to and the benefit of provisional patent application No. 61/851,636 titled "Mask communication system", filed in the United States Patent and Trademark Office on Mar. 12, 2013. The specifications of the above referenced patent applications are incorporated herein by reference in their entirety.

FIELD OF THE INVENTION

The method and system disclosed herein relates to a noise cancellation device that provides a noise cancellation solution for firefighters, first responders, and other persons, who may or may not wear a face mask or other personal protective equipment, in order to improve personal communications in a high noise environment. The noise cancellation device comprises a speech acquisition unit, an audio signal processing unit, one or more loudspeakers, and a communication interface such as a radio interface. The speech acquisition unit is in the form of a contact microphone. In an embodiment, the speech acquisition unit can be in the form of an in-the-ear microphone or a combination of the contact microphone and the in-the-ear microphone. The audio signal processing unit, which can be implemented by either digital processing or analog processing, comprises a noise reduction unit to improve signal-to-noise ratio without sacrificing speech intelligibility, a spectra equalization unit to equalize energy of low and high frequency speech signals, and a voice activity detection unit to detect speech. The loudspeakers and the communication interface such as the radio interface allow the noise cancellation device to provide a universal solution for communications with and without radios.

BACKGROUND

People need to wear a face mask or other personal protective equipment when they work in dangerous areas for the sake of safety. For example, a firefighter must wear a face mask or a self contained breathing apparatus when battling a fire. Firefighters and other first responders often rely on wireless communications, for example, radio communications to successfully and safely perform their tasks. When a face mask or the personal protective equipment is worn, it becomes difficult to conduct face-to-face communication or wireless communication, for example, person-to-radio communication because speech is heavily attenuated by the face mask or the personal protective equipment. Moreover, any communication can be severely degraded by background noise. In an extremely noisy environment, a communication device, for example, a radio can hardly pick up any clean speech at all. The firefighter has to hold the communication device close to the mouth and shout loudly in order to be heard accurately. Often, in order to communicate effectively through the communication device, the firefighter has to remove the protective face mask, which compromises health and safety of the firefighter. There is a need for users wearing the face mask or the personal protective equipment to have very clear and effective communications in such a high noise environment. Poor communication not only decreases the working efficiency but can also be fatal. Hence, there is a need for a wearable communication system that allows the user wearing the face mask, the personal protective equipment, or any other wearable unit to maintain clear and effective communications in high noise environments.

A few solutions to improve the efficiency of communications have been developed and utilized. Operational procedures, for example, hand and arm signals, provide a primitive solution and are not effective for scenarios requiring hands free communications. Commercial noise cancellation devices that can cancel ambient noise have been developed, although these noise cancellation devices can only work well when communicating without radios or when communicating through radios in a push to talk communication mode.

As a component of the noise cancellation devices, different kinds of microphones have been employed to improve the efficiencies of communications in the market, namely, an in-the-mask microphone, a bone conduction microphone, and an adhesive microphone. The first option, namely, the in-the-mask microphone integrated with the face mask, is an expensive solution since a user, for example, a first responder needs to replace an entire wearable unit, for example, the self contained breathing apparatus. The self contained breathing apparatus has a potential risk of air leakage because the in-the-mask microphone needs to be wired out for connection to an external radio. Moreover, speech becomes distorted as speech passes through the self contained breathing apparatus. The second option is the use of the bone conduction microphone, but the bone conduction microphone needs to have a tight contact with a human body. This contact needs to be either directly on the skull or the throat of the user, which makes the user uncomfortable. The installation of the bone conduction microphone is not stable since the microphone cannot be rigidly fixed to the human body. The adhesive microphone attached to the outside of the self contained breathing apparatus is the third option. However, the adhesive microphone is not considered a complete solution due to the following reasons: (1) no further active noise reduction technology has been applied. As a result, the noise level is still not low enough for comfortable listening; (2) the speech picked up by the adhesive microphone sounds different from normal speech because the speech is excited within the self contained breathing apparatus, so the person who listens to the speech has difficulty in identifying who is talking; (3) the adhesive microphone option does not work with those first responders who do not wear a face mask but work in a high noise environment.

Besides the above drawbacks, no existing commercial noise cancellation device has adequately implemented a voice operated switch (VOX) communication mode with radios. In the VOX communication mode, the radio acts as an open microphone and sends signals out only when speech is detected. With these commercial noise cancellation devices, the VOX communication mode with radios is not robust enough against background noise, which may cause the radio to continuously transmit unwanted noise across a network and interfere with others' abilities to use the same frequency. To address the above problems, a solution to improve communications is highly desirable.

Hence, there is a long felt but unresolved need for a method and a wearable communication system that provides a noise cancellation device that supports personal face-to-face communication, person-to-radio communication, and wireless communication in a high noise environment. Moreover, there is a need for a noise cancellation device that works effectively in high noise environments through radios in a push to talk (PTT) communication mode and a voice operated switch (VOX) communication mode, with and without radios.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The method and the wearable communication system disclosed herein address the above stated needs for a noise cancellation device that supports personal face-to-face communication, person-to-radio communication, and wireless communication in a high noise environment, and works effectively in the high noise environment through radios in a push to talk (PTT) communication mode and a voice operated switch (VOX) communication mode, with and without radios. The noise cancellation device disclosed herein provides a noise cancellation solution for users, for example, first responders, firefighters, etc., to effectively communicate in the high noise environment regardless of the communication mode. The noise cancellation device is attachable to a wearable unit. As used herein, the phrase "wearable unit" refers to any item worn by a user, for example, personal protective equipment, a self contained breathing apparatus, protective clothing, an item of clothing such as a lapel of a coat or a jacket or a protective covering, face masks, helmets, goggles, or other garments or equipment configured for protecting the user's body from injury. The noise cancellation device is compatible with the first responders' existing equipment and has no impact on the first responders' abilities to perform operational tasks. System requirements of the noise cancellation device, for example, size, weight, and placement of the noise cancellation device components are compatible with the existing firefighter standard operating procedures (SOPs). The noise cancellation device is easy to use and affordable, for example, by fire departments. Maintenance fees and repair costs are low. The noise cancellation device has low power consumption to ensure sufficient operation time.

The noise cancellation device disclosed herein comprises a speech acquisition unit, an audio signal processing (ASP) unit, one or more loudspeakers, and a communication interface such as a radio interface. The speech acquisition unit comprises a contact microphone which picks up or receives voice vibrations from speech of a user, for example, a person who wears a wearable unit, via the wearable unit in the high noise environment. The contact microphone is operably positioned with respect to the wearable unit of the user. The contact microphone is installed, for example, on an outside surface of a face mask. The contact microphone can pick up voice vibrations from the rigid outside surface of the face mask. The contact microphone converts the voice vibrations into an audio signal. The audio signal comprises noise signals and a speech signal. The contact microphone comprises an integrated piezoelectric transducer for detecting voice vibrations from the face mask. The voice vibrations are mechanical vibrations excited by user speech within the wearable unit. The integrated piezoelectric transducer transforms the mechanical vibrations within the wearable unit into an electric analog signal or an audio signal.

The contact microphone picks up reverberation signals from the face mask when the user is speaking. The noise cancellation device does not collect vibrations due to background noise and only receives speech signals because the background noise in an open space cannot generate the same reverberation as the user speech within the face mask. The contact microphone is washable and disposable after being used in a polluted environment. In an embodiment, the speech acquisition unit comprises an in-the-ear microphone which is inserted in the ear of a user who may or may not wear a face mask or personal protective equipment, and can pick up speech signals from cochlear emissions. Since an ear plug of the in-the-ear microphone can block background noise, the in-the ear microphone can substantially improve the signal-to-noise ratio. The in-the-ear microphone has a replaceable ear plug that varies in sizes to fit on each user's ear canal. Unlike the contact microphone, the in-the-ear microphone can be used for communications with or without a face mask because the mounting of the in-the-ear microphone does not rely on any wearable unit such as the face mask or the personal protective equipment. In an embodiment, the speech acquisition unit comprises only the contact microphone. In another embodiment, the speech acquisition unit comprises both the contact microphone and the in-the-ear microphone.

The audio signal processing (ASP) unit converts noisy speech to clean speech. The audio signal processing unit in operative communication with the speech acquisition unit processes the audio signal, removes noise signals comprising, for example, background noise, air regulator inhalation noise, low pressure alarm noise, personal alert safety system noise, etc., from the audio signal, and enhances a speech signal contained in the audio signal. The function of the audio signal processing unit can be implemented by either analog signal processing or digital signal processing. In an embodiment, the audio signal processing unit is configured as a digital signal processing unit. The digital signal processing unit comprises, for example, a pre-amplifier, a liner power regulator, a switch power regulator, an energy storage device, a digital signal processor, an analog to digital converter, a digital to analog converter, a flash memory, and one or more power amplifiers. The pre-amplifier is operably coupled to the contact microphone and amplifies the audio signal received from the contact microphone. The linear power regulator and the switch power regulator provide a stable voltage and current supply to the noise cancellation device. The energy storage device provides power supply to the noise cancellation device. The digital signal processor processes the audio signal. The analog to digital converter converts the audio signal from an analog format to a digital format. The digital to analog converter converts the audio signal from the digital format to the analog format. The flash memory stores computer program codes for the digital signal processor. The power amplifiers are in operative communication with the loudspeakers and amplify the audio signal processed by the digital signal processor. The pre-amplifier, the analog to digital converter, the digital to analog converter, and the flash memory are configured to be connected to the digital signal processor or integrated in the digital signal processor.

The digital signal processor of the digital signal processing unit comprises a filter bank analysis unit, a noise reduction unit, a spectra equalization unit, a voice activity detection unit, and a filter bank synthesis unit. The filter bank analysis unit decomposes a single channel full band audio signal into multiple narrow bands of audio signals or multiple sub band audio signals. The noise reduction unit cleans noisy speech by suppressing the noise signals in the audio signal. The spectra equalization unit corrects spectral distortion introduced by a wearable unit such as a face mask and equalizes energy of the audio signal in low frequency bands and high frequency bands. The voice activity detection unit detects speech for a voice operated switch (VOX) function. The voice activity detection unit detects locations of the speech signal and a silence signal in the audio signal, for example, by change point detection or energy differencing. As used herein, the phrase "change point detection" refers to a process of detecting abrupt changes, for example, steps, jumps, shifts, etc., in the mean level of an audio signal, or time points at which properties of time series data change. Also, as used herein, the phrase "energy differencing" refers to an energy based method of voice activity detection used to separate a speech signal into different speech and silence states. The voice activity detection unit comprises an optimal filter for detecting decrease and increase in energy of the audio signal. The optimal filter utilizes a set of energy thresholds to separate the speech signal into a silence state, an in speech state, and a leaving speech state. The set of energy thresholds is configured by a minimum value of a sub band noise power within a finite window to estimate a noise floor. The filter bank synthesis unit combines multiple sub band audio signals into a single channel full band speech signal. The speech signals acquired from the above contact microphone and the in-the-ear microphone can have distortion and noise, and therefore further signal processing is needed to improve the speech quality through the spectra equalization unit and the noise reduction unit.

The noise reduction unit of the digital signal processor comprises a Wiener filter based noise reduction unit, a model based noise reduction unit, and a spectral subtraction noise reduction unit. The Wiener filter based noise reduction unit suppresses the noise signals from the high noise environment and enhances quality of the speech signal. The model based noise reduction unit suppresses the noise signals generated by the wearable unit. The spectral subtraction noise reduction unit reduces degrading effects of noise signals acoustically added in the audio signal.

The model based noise reduction unit records and stores multiple noise sound samples in a noise sound database. The model based noise reduction unit trains multiple sound models to represent statistical characteristics of the noise sound samples. The sound models can be represented by a Gaussian mixture model and a hidden Markov model. The model based noise reduction unit decodes the audio signal and assigns a score to each of the trained sound models based on a comparison of the decoded audio signal with each of the trained sound models. The scores are assigned based on the likelihood that the decoded audio signal matches with the trained sound models. The model based noise reduction unit then identifies a noise sound model based on the assigned score of each of the trained sound models. For example, the model based noise reduction unit identifies the sound model with the largest score as the noise sound model. The model based noise reduction unit removes the noise signals from the audio signal based on the identified noise sound model to obtain a clean speech signal. The model based noise reduction unit comprises a noise suppression unit. The noise suppression unit comprises a filter bank analysis unit, multiple adaptive filters in an adaptive filter matrix, and a filter bank synthesis unit. The filter bank analysis unit decomposes a single channel full band audio signal into multiple sub band audio signals. The adaptive filters remove and suppress the noise signals on a sub band basis. The filter bank synthesis unit combines the sub band audio signals together into a single channel full band speech signal.

In an embodiment, the audio signal processing unit is configured as an analog signal processing unit. The analog signal processing unit comprises a pre-amplifier, an analog signal processor, and one or more power amplifiers. The pre-amplifier is operably coupled to the contact microphone and amplifies the audio signal received from the contact microphone. The analog signal processor processes the audio signal. The analog signal processor comprises multiple first band-pass filters, multiple noise reduction filters, multiple spectra equalization filters, a voice activity detection unit, and multiple second band-pass filters. The first band-pass filters decompose a single channel full band audio signal into multiple sub band audio signals. The noise reduction filters suppress the noise signals in the audio signal and enhance quality of the speech signal in the audio signal by applying, for example, at least one of a Wiener filter based noise reduction, a spectral subtraction noise reduction, and a model based noise reduction. The spectra equalization filters equalize energy of the audio signal in low frequency bands and high frequency bands. The voice activity detection unit detects locations of the speech signal and a silence signal in the audio signal, for example, by change point detection or energy differencing. The second band-pass filters synthesize the sub band audio signals into a single channel full band speech signal. The power amplifiers amplify the single channel full band speech signal prior to transmitting the single channel full band speech signal to one or more loudspeakers of the noise cancellation device. With the noise cancellation device, the signal intelligibility and signal-to-noise ratio can be improved, for example, from about −10 dB to about 20 dB.

The loudspeakers are in operative communication with the audio signal processing unit. The loudspeakers emit speech signals and/or external speech signals received from a communication device via the communication interface for supporting and facilitating personal face-to-face communication and wireless communication in high noise environments. The communication device is a portable handheld device, for example, a radio, a handheld transceiver such as a walkie-talkie, etc., used for wireless communication between users. The loudspeakers are utilized in the high noise environment, since the users cannot hear each other clearly when they wear wearable units such as face masks or personal protective equipment. The communication interface, for example, a radio interface of the noise cancellation device supports person-to-radio communications by enabling the noise cancellation device to output clean speech signals to the communication device, for example, a radio. As used herein, the phrase "communication interface" refers to a systems interface or a network interface, for example, a radio interface between two devices in a network. The communication interface connects the noise cancellation device to the communication device. The communication interface, in operative communication with the audio signal processing unit, transmits the speech signal to the communication device for facilitating wireless communication in high noise environments. In an embodiment, a panic button is operably connected on the noise cancellation device for triggering an alert signal and transmitting a pre-recorded distress message stored in the noise cancellation device through the communication device to another device, for example, another communication device or a remote command center.

Also, disclosed herein is a wearable communication system for personal face-to-face communication and wireless communication in a high noise environment. The wearable communication system comprises the noise cancellation device disclosed above and a wireless coupling device. The noise cancellation device comprises the speech acquisition unit comprising a first microphone and a second microphone. In this embodiment, the first microphone is a contact microphone that receives voice vibrations from user speech in the high noise environment via the wearable unit and converts the voice vibrations into the audio signal. The first microphone is located within the noise cancellation device at a connecting point between a voicemitter of a wearable unit such as a face mask and the noise cancellation device. The first microphone picks up or receives voice vibrations from the voicemitter. In an embodiment, the noise cancellation device receives voice vibrations from user speech via the first microphone, when the noise cancellation device is attached to a mask of the wearable unit. The second microphone is a regular microphone that detects voice vibrations from user speech in air and converts the voice vibrations into the audio signal. In an embodiment, the noise cancellation device is configured to receive voice vibrations from user speech via the second microphone, when the noise cancellation device is attached to an item of clothing of the wearable unit and the second microphone is utilized as a lapel microphone.

In the wearable communication system disclosed herein, the noise cancellation device comprises the digital signal processing unit, one or more loudspeakers, and a first communication module. In an embodiment, the loudspeakers comprise a front loudspeaker and a rear loudspeaker. In another embodiment, the front loudspeaker and the rear loudspeaker are combined and configured to function as a single loudspeaker. The first communication module transmits the speech signal from the noise cancellation device to the communication device and receives an external speech signal transmitted by the communication device during wireless communication. As used herein, the phrase "communication module" refers to a wired or a wireless module, for example, a Bluetooth® module of Bluetooth Sig, Inc., for transmitting and receiving audio signals between the noise cancellation device and the wireless coupling device. The loudspeakers are in operative communication with the digital signal processing unit and emit the speech signal for facilitating personal face-to-face communication in the high noise environment. The loudspeakers also emit the external speech signals received from the communication device for facilitating wireless communication in the high noise environment. The digital signal processing unit of the noise cancellation device comprises a first microphone amplifier operably coupled to the first microphone for amplifying the audio signal received from the first microphone, a second microphone amplifier operably coupled to the second microphone for amplifying the audio signal received from the second microphone, one or more power regulators, the energy storage device, the digital signal processor, the analog to digital converter, the digital to analog converter, the flash memory, and one or more power amplifiers in operative communication with the loudspeakers as disclosed above.

The wireless coupling device is attached to the communication device and operably couples the noise cancellation device to the communication device. The wireless coupling device comprises a second communication module and a microcontroller. The second communication module receives the transmitted speech signal from the first communication module of the noise cancellation device and transmits the external speech signal from the communication device to the noise cancellation device, during wireless communication. The second communication module of the wireless coupling device is securely paired with the first communication module of the noise cancellation device for preventing external wireless signals from interfering with communication of the speech signal and the external speech signal between the wireless coupling device and the noise cancellation device. The microcontroller transmits the received speech signal from the noise cancellation device to the communication device. The microcontroller further controls an operation of the wireless coupling device to prevent interference of the wireless coupling device with a normal operation of the communication device. In an embodiment, a release button is operably connected on the wireless coupling device. The release button releases control of the communication device for allowing the communication device to operate as a standalone device, when the wireless coupling device is attached to the communication device.

Also, disclosed herein is a method for personal face-to-face communication and wireless communication in a high noise environment. The method disclosed herein provides the noise cancellation device disclosed above. In the method disclosed herein, the noise cancellation device is operably coupled to a communication device using the wireless coupling device. The noise cancellation device receives voice vibrations from user speech in the high noise environment. The first microphone of the noise cancellation device receives the voice vibrations from user speech via the wearable unit. The second microphone of the noise cancellation device receives the voice vibrations from user speech in air. The noise cancellation device converts the received voice vibrations into an audio signal. The noise cancellation device processes the audio signal by removing noise signals from the audio signal, and enhancing a speech signal contained in the audio signal. The noise cancellation device then transmits the speech signal to the wireless coupling device via the first communication module of the noise cancellation device for facilitating wireless communication through the communication device in the high noise environment. The noise cancellation device also transmits the speech signal to one or more loudspeakers, for example, the front loudspeaker for facilitating personal face-to-face communication in the high noise environment. The front loudspeaker emits the speech signal during personal face-to-face communication. The noise cancellation device receives the external speech signal transmitted by the communication device via the second communication module of the wireless coupling device during the wireless communication. The rear loudspeaker emits the external speech signal transmitted by the communication device during the wireless communication.

The wearable communication system disclosed herein provides a communication solution for firefighters, first responders, and other users who work in extremely noisy and hazardous environments and must communicate wearing a protective face mask such as a self contained breathing apparatus face mask or other personal protective equipment. The wearable communication system provides clear, hands free, face-to-face, and wireless communications, for example, radio communication in high noise environments when a protective face mask is worn and also when a protective face mask is not worn.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a structure or a method step referenced by a numeral in a drawing carries over to the description of that structure or method step shown by that same numeral in any subsequent drawing herein.

FIGS. 12A-12C exemplarily illustrate a change point detection algorithm implemented by a voice activity detection unit of the noise cancellation device.

FIGS. 23E-22F exemplarily illustrate side perspective views of an embodiment of the noise cancellation device.

DETAILED DESCRIPTION OF THE INVENTION

Figure 1:
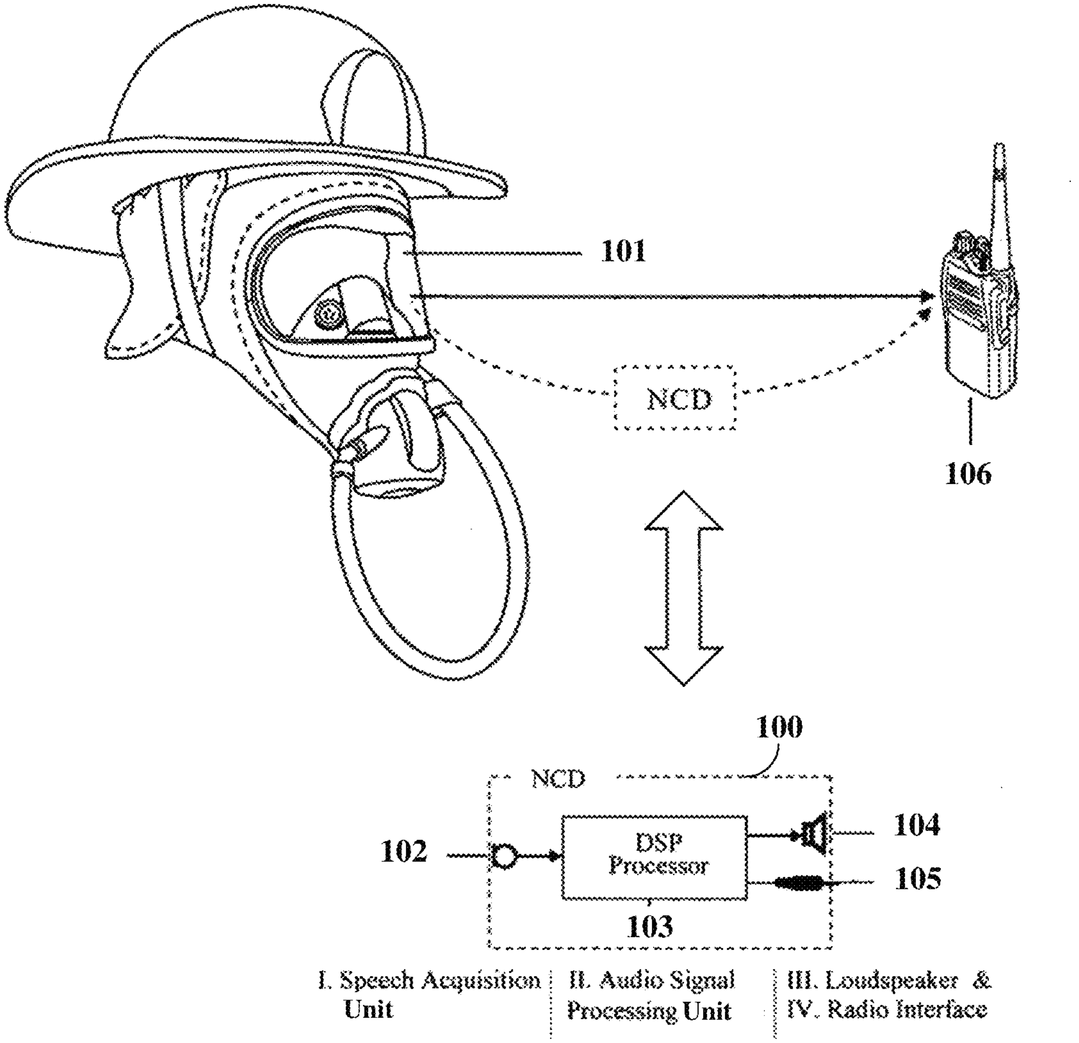
FIG. 1 exemplarily illustrates a layout of a noise cancellation device.

FIG. 1 exemplarily illustrates a layout of a noise cancellation device 100. As exemplarily illustrated in FIG. 1, the noise cancellation device 100 establishes a connection between a user, for example, a person who wears a wearable unit such as a face mask 101 and a communication device 106 such as a radio for good communications. As used herein, the phrase "wearable unit" refers to any item worn by a user, for example, personal protective equipment, a self contained breathing apparatus, protective clothing, an item of clothing such as a lapel of a coat or a jacket or a protective covering, face masks, helmets, goggles, or other garments or equipment configured for protecting the user's body from injury. The communication device 106 is a portable handheld device, for example, a radio, a handheld transceiver such as a walkie-talkie, etc., used for wireless communication between users. The noise cancellation device 100 comprises a speech acquisition unit 102, an audio signal processing unit 103, a loudspeaker 104, and a communication interface such as a radio interface 105. As used herein, the phrase "communication interface" refers to a systems interface or a network interface between the noise cancellation device 100 and the communication device 106 in a network, for example, a wireless radio network. For purposes of illustration, the communication interface is also referred to as a "radio interface". In an embodiment, the radio interface 105 is an audio jack that allows the communication device 106, that is, the radio to be connected by a piece of cable with the audio jack. The speech acquisition unit 102 is used to capture speech from users who may or may not wear the wearable unit.

The audio signal processing unit 103 processes the detected noisy voice and delivers clean speech to the loudspeaker 104 for face-to-face communications and to the radio interface 105 for wireless radio communications. The communication interface connects the noise cancellation device 100 to the communication device 106. The communication interface, in operative communication with the audio signal processing unit 103, transmits the speech signal to the communication device 106 for facilitating wireless communication in a high noise environment. The loudspeaker 104, in operative communication with the audio signal processing unit 103, emits the speech signal and an external speech signal received from the communication device 106 via the communication interface for facilitating personal face-to-face communication and wireless communication in the high noise environment.

Figure 2:
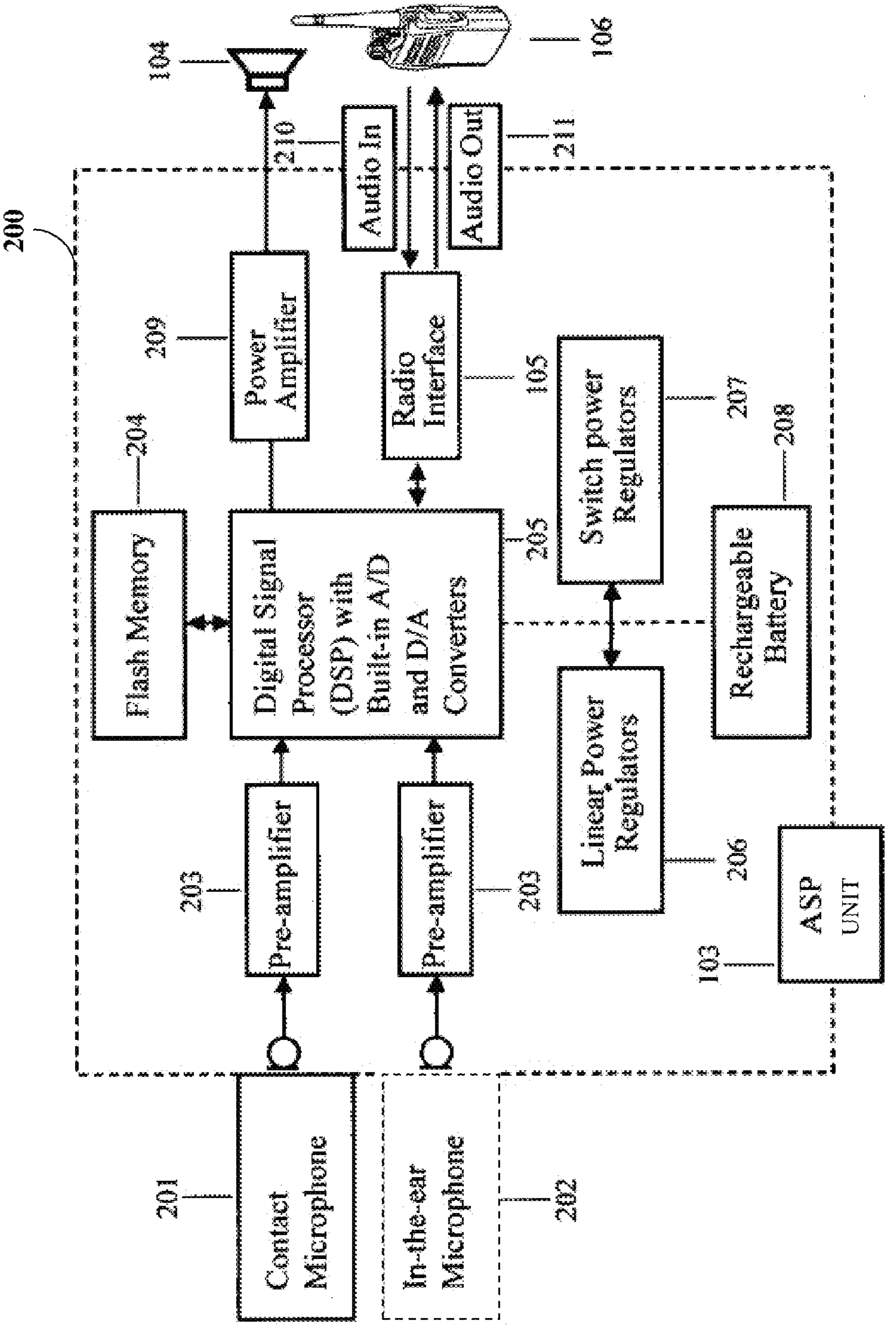
FIG. 2 exemplarily illustrates a digital implementation of the noise cancellation device.

FIG. 2 exemplarily illustrates a digital implementation of the noise cancellation device 100 exemplarily illustrated in FIG. 1. The speech acquisition unit 102 of the noise cancellation device 100, exemplarily illustrated in FIG. 1, comprises a contact microphone 201. In an embodiment, the speech acquisition unit 102 comprises an in-the-ear microphone 202. The speech acquisition unit 102 can have any of the three formats: the contact microphone 201, the in-the-ear microphone 202, or the combined contact microphone 201 and in-the-ear microphone 202. The contact microphone 201 is operably positioned with respect to a wearable unit of a user. For example, the contact microphone 201 is attached to an outside surface of a user's face mask 101 exemplarily illustrated in FIG. 1. The contact microphone 201 receives voice vibrations from user speech in a high noise environment via the wearable unit. The voice vibrations are mechanical vibrations excited by user speech within the wearable unit. The contact microphone 201 converts mechanical vibrations to electric analog signals. The contact microphone 201 has an embedded or integrated piezoelectric transducer (not shown) that can pick up the mechanical vibrations from the wearable unit, for example, the face mask 101 or the personal protective equipment of the user and convert the mechanical vibrations into a voltage that can then be made audible. That is, the piezoelectric transducer of the contact microphone 201 transforms the mechanical vibrations within the wearable unit into electric analog signals. A user, for example, a firefighter typically wears a self contained breathing apparatus in an emergency situation, and therefore his or her face is tightly covered by the face mask 101. When the user, for example, the firefighter starts to speak, the voice generates positive pressure inside the face mask 101, which leads to mechanical vibrations on the rigid surface of the face mask 101. The mechanical vibrations can be picked up by the contact microphone 201. The contact microphone 201 converts the mechanical vibrations into audio signals. Each audio signal comprises noise signals and a speech signal. Because the noise in the open environment has a few contributions to the surface vibration, the contact microphone 201 can pick up the user's clean voice with little influence from background noise.

The in-the-ear microphone 202 is another microphone that can be used in an embodiment. The in-the-ear microphone 202 is inserted in the user's ear. When a person speaks, his or her voice is transmitted within his or her body and can be detected in the ear from cochlear emissions. The in-the-ear microphone 202 can therefore pick up the speech signals from the cochlear emissions. The dimensions of the in-the-ear microphone 202 can be small. The diameter of the in-the-ear microphone 202 is, for example, less than about 3 mm and the length is, for example, less than about 5 mm. The in-the-ear microphone 202 can be built into an ear plug 802, exemplarily illustrated in FIG. 8A, which has an ear hood 803 exemplarily illustrated in FIG. 8B for easy and stable wearing. Both the microphones 201 and 202 can pick up human speech or user speech in a different way from that of a traditional microphone such that background noise is substantially blocked.

In the digital implementation, the audio signal processing (ASP) unit 103 of the noise cancellation device 100 is configured as a digital signal processing unit 200. The digital signal processing unit 200 comprises a digital signal processor (DSP) 205. The audio signal processing unit 103, in operative communication with the speech acquisition unit 102, processes the audio signal, removes noise signals comprising, for example, background noise, air regulator inhalation noise, low pressure alarm noise, personal alert safety system noise, etc., from the audio signal, and enhances a speech signal contained in the audio signal. The audio signal processing unit 103 with the digital implementation includes four major chips, namely, two pre-amplifiers 203 operably coupled to the microphones 201 and 202, a flash memory 204, the digital signal processor 205 with a built in analog to digital (A/D) converter 401 and a built-in digital to analog (D/A) converter 406 exemplarily illustrated in FIG. 4, and a power amplifier 209 for the loudspeaker 104. The output analog signals from the contact microphone 201 are amplified by the pre-amplifier 203 and then imported into the digital signal processor 205. In an embodiment, the output analog signals from the contact microphone 201 and the in-the-ear microphone 202 are amplified by the pre-amplifiers 203 and then imported into the digital signal processor 205. The flash memory 204 stores the software or the computer program codes for the digital signal processor 205.

Once the noise cancellation device 100 starts to operate, the digital signal processor 205 reads the computer program codes from the flash memory 204 into an internal memory and begins to execute the computer program codes. During the initiation processes, the computer program codes are written into the registers of the digital signal processor 205. Two power regulators are used: one is the linear power regulator 206 and the other is a switch power regulator 207. The power regulators 206 and 207 are used to provide stable voltage and current supply for all the components on the circuit board of the noise cancellation device 100. An energy storage device 208, for example, a battery or a rechargeable battery provides power supply to the noise cancellation device 100. The power amplifier 209 is in operative communication with the loudspeaker 104 and amplifies the audio signal processed by the digital signal processor 205. The pre-amplifiers 203, the analog to digital converter 401, the digital to analog converter 406, and the flash memory 204 are configured to be connected to the digital signal processor 205 or integrated in the digital signal processor 205. The loudspeaker 104 is used for face-to-face communications and the radio interface 105 connects the noise cancellation device 100 to a communication device 106 such as the radio for wireless communications as disclosed in the detailed description of FIG. 1. The communications between users such as firefighters and the communication device 106 are two way communications through an audio in port 210 and an audio out port 211. As exemplarily illustrated in FIG. 2, to maintain clear and effective communications, the analog signals from the communication device 106 can be sent to the digital signal processor 205 and released to the loudspeaker 104 after being processed via the audio in port 210.

The noise cancellation device 100 works as follows: after acoustic analog signals are picked up by the contact microphone 201, these signals are amplified by the pre-amplifiers 203. In an embodiment, after acoustic analog signals are picked up by the microphones, which can be the contact microphone 201, the in-the-ear microphone 202, or both, these analog signals are amplified by the pre-amplifiers 203. The analog signals are then converted to a digital form by using the analog to digital converter 401 exemplarily illustrated in FIG. 4, which converts the analog signals into a stream of numbers. However, the required output signals have to be analog signals, which require the digital to analog converter 406 exemplarily illustrated in FIG. 4. The digital to analog converter 406 converts the digital signals to an analog form. The analog to digital converter 401 and digital to analog converter 406 can change the signal format. The digital signal processor 205 implements all the signal processing. The digital signal processor 205 comprises a noise reduction unit 403 to clean the noisy speech signal, a spectra equalization unit 404 to correct the spectra distortion introduced by the face mask 101, and a noise robust voice activity detection unit 407, exemplarily illustrated in FIG. 4, to detect speech for a voice operated switch (VOX) function.

Figure 3:
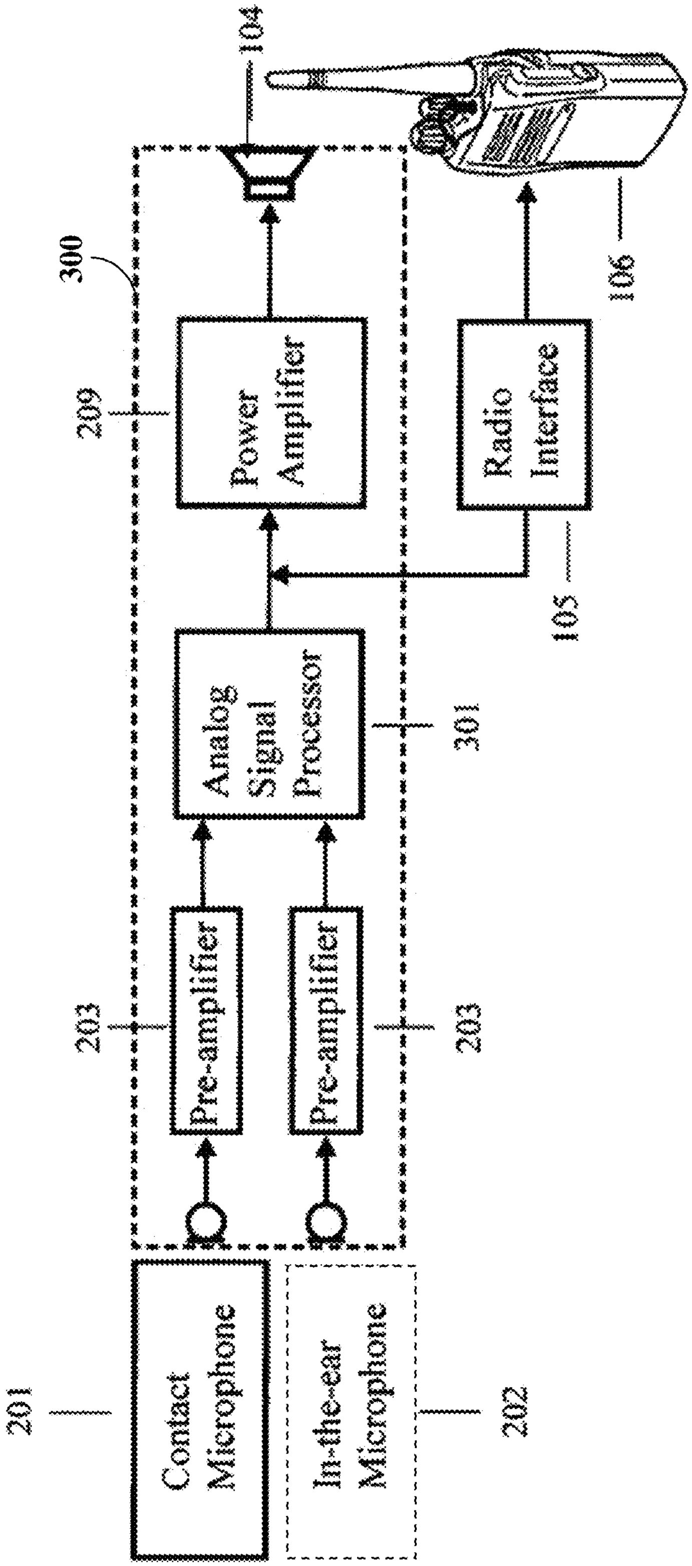
FIG. 3 exemplarily illustrates an analog implementation of the noise cancellation device.

FIG. 3 exemplarily illustrates an analog implementation of the noise cancellation device 100 exemplarily illustrated in FIG. 1. The dashed block in FIG. 3 is similar to the audio signal processing unit 103 with digital implementation exemplarily illustrated in FIG. 2. In the analog implementation, the audio signal processing unit 103 is configured as an analog signal processing unit 300. The analog signal processing unit 300 comprises an analog signal processor 301. The analog signal processor 301 is introduced to process the audio signals picked up by the contact microphone 201. In an embodiment, the analog signal processor 301 processes the audio signals picked up by the contact microphone 201 and/or the in-the-ear microphone 202.

Figure 4:
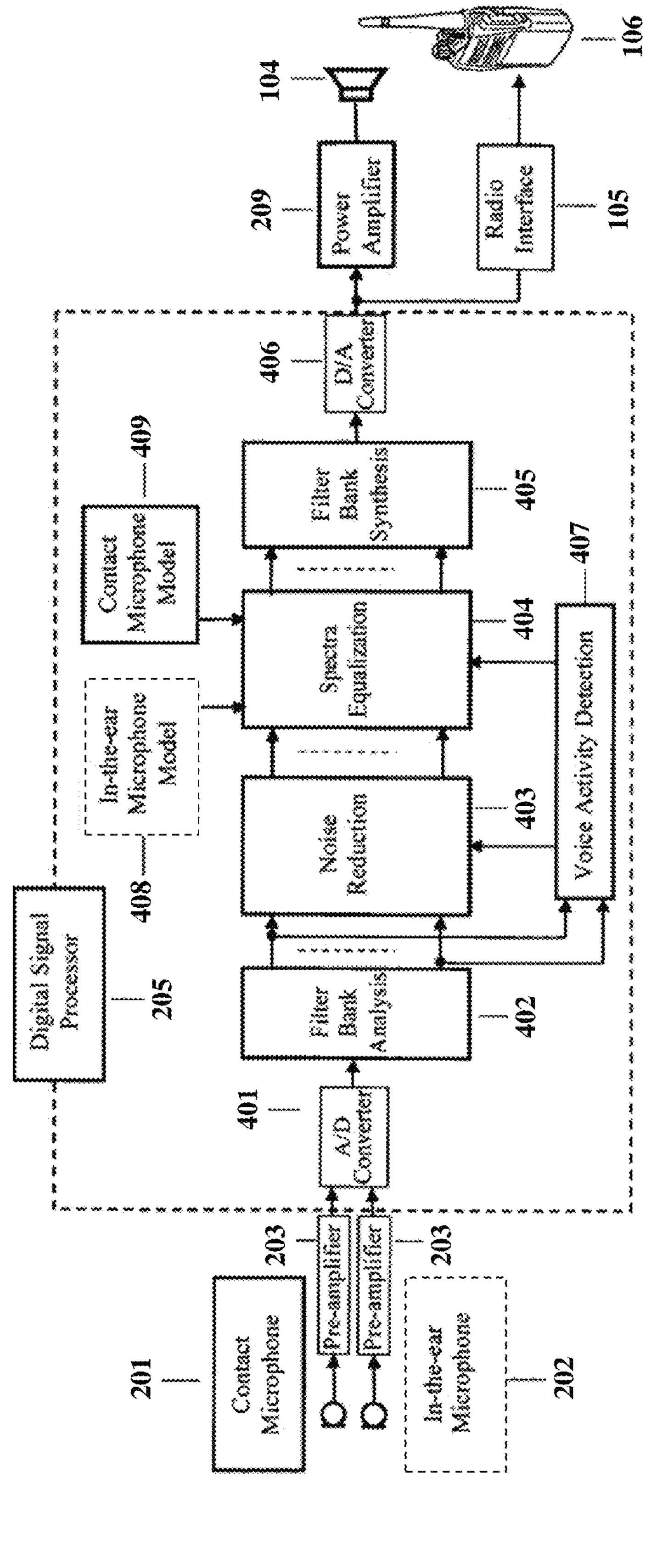
FIG. 4 exemplarily illustrates a detailed system diagram of the noise cancellation device with a digital implementation.

FIG. 4 exemplarily illustrates a detailed system diagram of the noise cancellation device 100, exemplarily illustrated in FIG. 1, with a digital implementation. The digital signal processor 205 comprises a filter bank analysis unit 402, a noise reduction unit 403, a spectra equalization unit 404, a voice activity detection unit 407, and a filter bank synthesis unit 405. The filter bank analysis unit 402 decomposes the single channel full band audio signals into a number of narrow sub band audio signals. In each sub band, noise reduction algorithms are used to suppress noise signals and enhance the speech signal, which is achieved by the noise reduction unit 403 based on the decomposed sub band audio signals. Four noise reduction algorithms can be applied to suppress noise signals and enhance the speech signal.

The contact microphone 201 picks up a user's voice on the face mask 101, exemplarily illustrated in FIG. 1, as disclosed in the detailed description of FIG. 2. In an embodiment, either the contact microphone 201 or in-the-ear microphone 202 picks up the user's voice on the face mask 101 or in the ear. Therefore, the spectrum of the audio signals from the face mask 101 is different from the spectrum of the audio signals transmitted in the open air. The low frequency information is boosted such that the audio signals sound like the user is talking with a face mask 101 covering the mouth. The spectra equalization unit 404 equalizes the energy of the audio signals in low and high frequency bands. After equalization, the audio signals are more evenly distributed over the full frequency bands and speech intelligibility is improved. After the audio signals in all sub bands are processed, the filter bank synthesis unit 405 can combine the sub band audio signals together into a single channel full band speech signal. The voice activity detection unit 407 determines where the speech is. The voice activity detection unit 407 detects locations of the speech signal and a silence signal in the audio signal, for example, by change point detection or energy differencing. As used herein, the phrase "change point detection" refers to a process of detecting abrupt changes, for example, steps, jumps, shifts, etc., in the mean level of an audio signal, or time points at which properties of time series data change. Also, as used herein, the phrase "energy differencing" refers to an energy based method of voice activity detection used to separate a speech signal into different speech and silence states.

Both the noise reduction unit 403 and the spectra equalization unit 404 can use the information from the voice activity detection unit 407 to update noise statistics and suppress noise in a noise section and keep the speech intact in a speech section. An analog to digital (A/D) converter 401 and a digital to analog (D/A) converter 406 switch between digital and analog signals. A contact microphone model 409 is built in the noise cancellation device 100. In an embodiment, an in-the-ear microphone model 408 and the contact microphone model 409 are built in the noise cancellation device 100: the in-the-ear microphone model 408 simulates the difference between a close talk microphone and the in-the-ear microphone 202, while the contact microphone model 409 simulates the difference between a close talk microphone and the contact microphone 201. The in-the-ear microphone model 408 and the contact microphone model 409 can correct the spectral distortion such that the audio signals after the models 408 and 409 sound more natural than before the models 408 and 409. Only one model 408 or 409 will be applied if only one type of microphone 202 or 201 is used to pick up the audio signals in the noise cancellation device 100.

Figure 5:
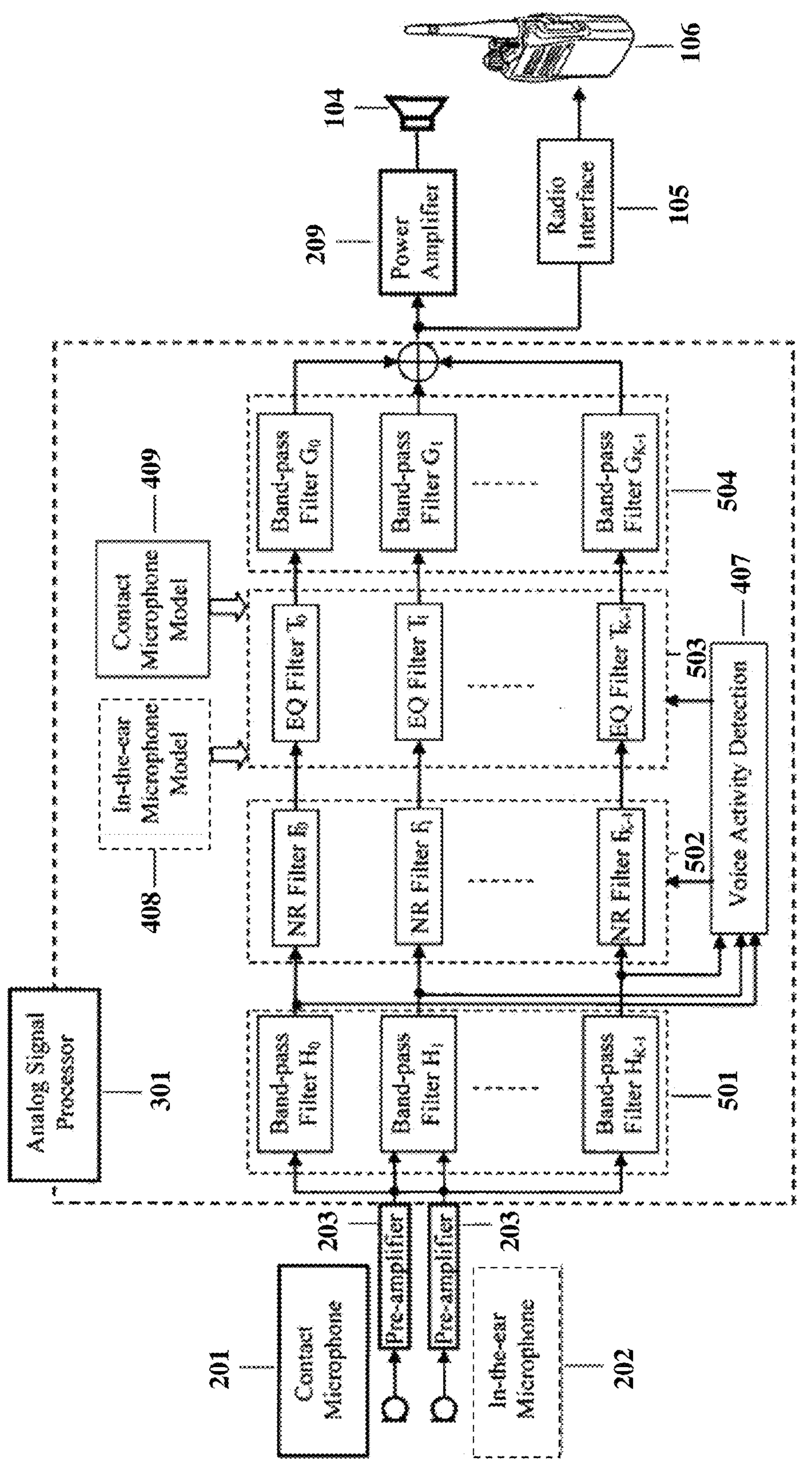
FIG. 5 exemplarily illustrates a detailed system diagram of the noise cancellation device with an analog implementation.

FIG. 5 exemplarily illustrates a detailed system diagram of the noise cancellation device 100, exemplarily illustrated in FIG. 1, with an analog implementation. The difference between the digital implementation and the analog implementation of the noise cancellation device 100 is that analog filters are used in the analog implementation to block the noise with certain frequencies. The analog signal processor 301 comprises a set of first band-pass filters 501, a set of noise reduction (NR) filters 502, a set of spectra equalization (EQ) filters 503, and a set of second band-pass filters 504. It is assumed that k is the total number of sample points; hence, the number of sub bands is k−1. The first band-pass filters 501 from $H_0$ to $H_{k-1}$ perform the same functions as the filter bank analysis unit 402 exemplarily illustrated in FIG. 4. The noise reduction filters 502 from $F_0$ to $F_{k-1}$ perform the same functions as the noise reduction unit 403 exemplarily illustrated in FIG. 4. The spectra equalization filters 503 from $T_0$ to $T_{k-1}$ perform the same functions as the spectra equalization unit 404 exemplarily illustrated in FIG. 4. The second band-pass filters 504 from $G_0$ to $G_{k-1}$ perform the same functions as the filter bank synthesis unit 405 exemplarily illustrated in FIG. 4. The voice activity detection (VAD) unit 407, the in-the-ear microphone model 408, and the contact microphone model 409 perform the same functions as disclosed in the detailed description of FIG. 4.

Figure 6:
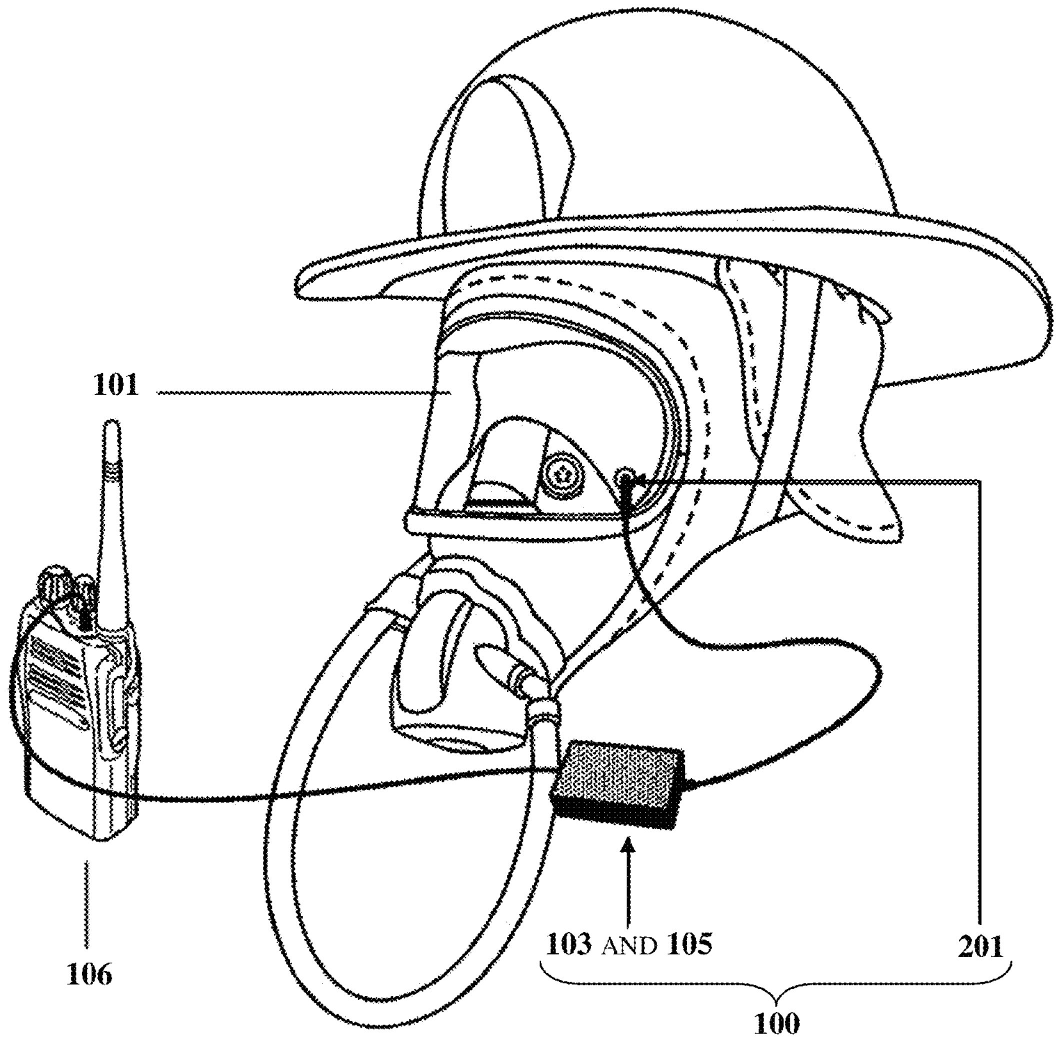
FIG. 6 exemplarily illustrates the noise cancellation device with a contact microphone.

FIG. 6 exemplarily illustrates the noise cancellation device 100 with a contact microphone 201, where the contact microphone 201 is attached to the outside surface of the face mask 101. In this embodiment, the audio signal processing unit 103 and the radio interface 105 are combined for users who wear the face mask 101 to communicate through the communication device 106 such as the radio.

Figure 7:
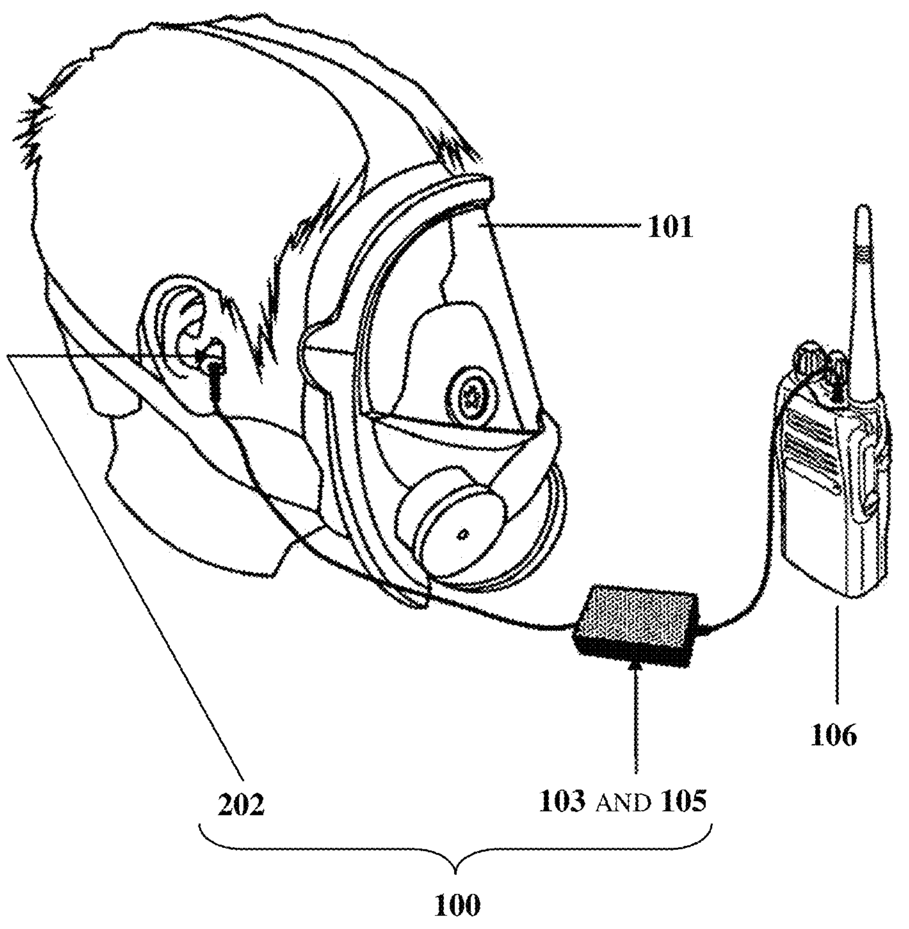
FIG. 7 exemplarily illustrates an embodiment of the noise cancellation device with an in-the-ear microphone.

FIG. 7 exemplarily illustrates an embodiment of the noise cancellation device 100 with an in-the-ear microphone 202. The in-the-ear microphone 202 is inserted in the human ear; hence, the installation of the noise cancellation device 100 does not depend on the face mask 101. The in-the-ear microphone 202 can be used for communications without the face mask 101 or personal protective equipment. In this embodiment, the audio signal processing unit 103 and the radio interface 105 are combined for users who wear the face mask 101 to communicate through the communication device 106, that is, the radio.

Figure 8B:
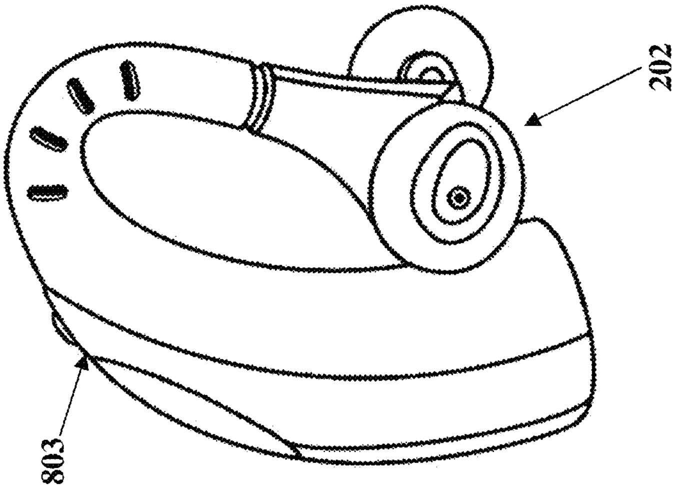
FIGS. 8A-8B exemplarily illustrate the embodiment showing the in-the-ear microphone and a structure of the in-the-ear microphone.
Figure 8A:
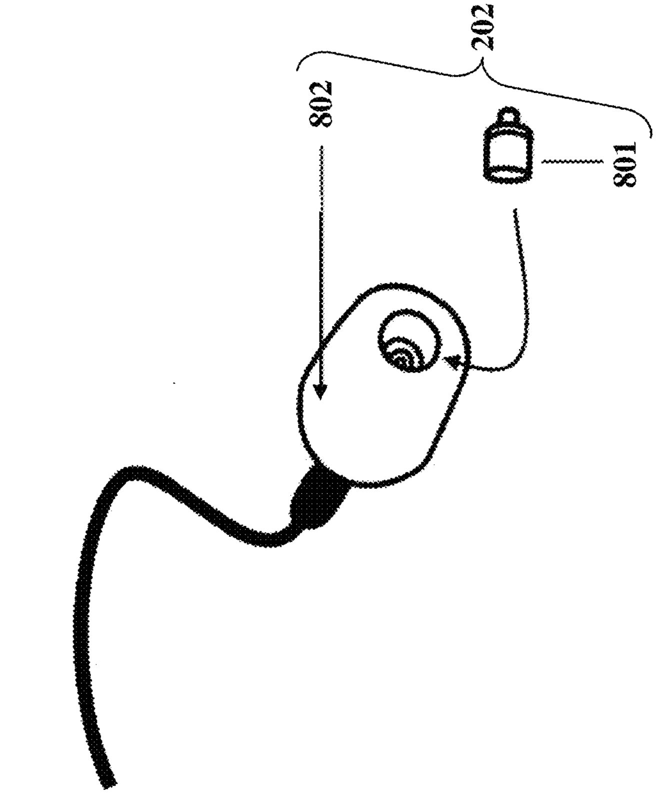

FIGS. 8A-8B exemplarily illustrate the embodiment showing the in-the-ear microphone 202 and a structure of the in-the-ear microphone 202. The component shown in the circle is a mini microphone 801. The mini microphone 801 can be built into an ear plug 802 as exemplarily illustrated in FIG. 8A. The final design of the in-the-ear microphone 202 can be similar to what is shown in FIG. 8B, which has an ear hood 803 for easy and stable wearing.

Figure 9:
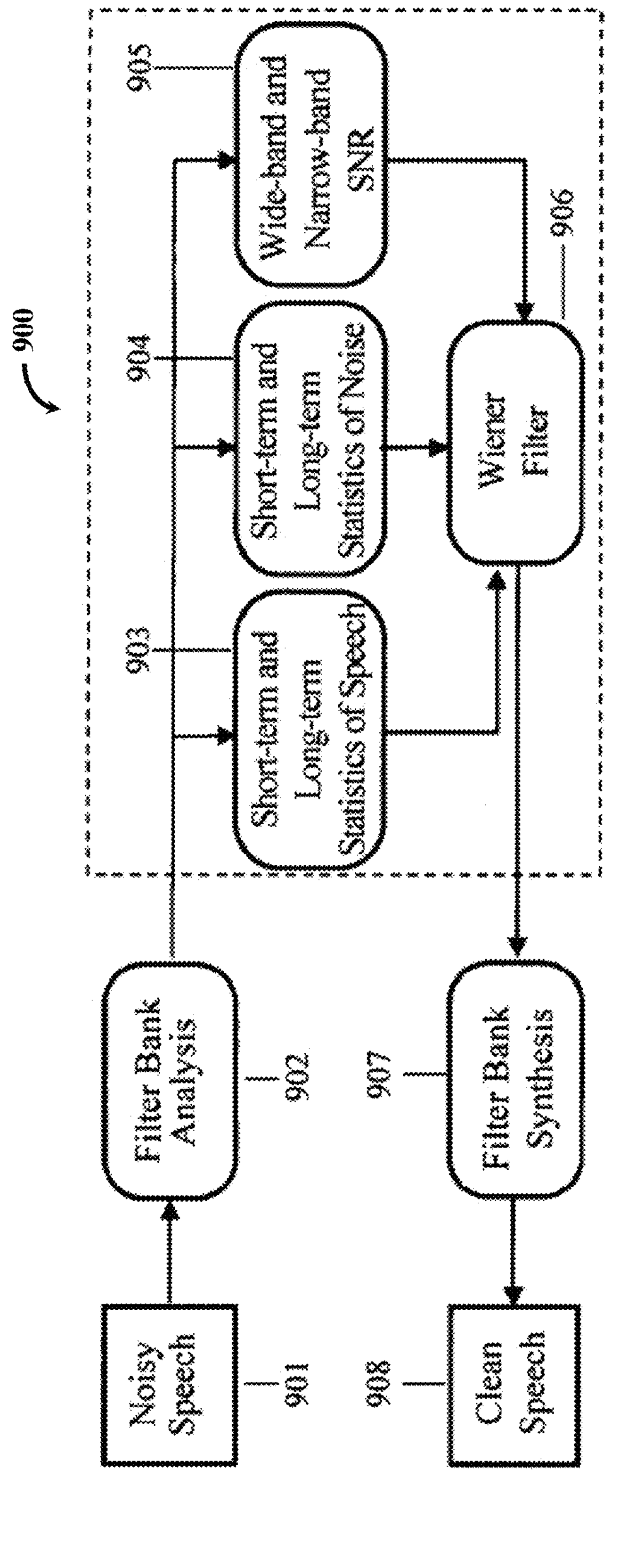
FIG. 9 exemplarily illustrates an adaptive noise reduction algorithm based on a temporal Wiener filter implemented by a Wiener filter based noise reduction unit of the noise cancellation device.

FIG. 9 exemplarily illustrates an adaptive noise reduction algorithm based on a temporal Wiener filter 906 implemented by a Wiener filter based noise reduction unit 900. FIG. 9 exemplarily illustrates a process flow diagram comprising the steps performed by the Wiener filter based noise reduction unit 900 for suppressing noise signals in the audio signal via a Wiener filter based noise reduction method. The noise reduction unit 403 exemplarily illustrated in FIG. 4, comprises the Wiener filter based noise reduction unit 900, a model based noise reduction unit 1000 exemplarily illustrated in FIG. 10, and a spectral subtraction noise reduction unit. The Wiener filter based noise reduction unit 900 suppresses the noise signals from a high noise environment and enhances quality of the speech signal. The model based noise reduction unit 1000 suppresses the noise signals generated by the wearable unit. The spectral subtraction noise reduction unit reduces degrading effects of the noise signals acoustically added in the audio signal. The noise reduction unit 403 suppresses noise and enhances the speech quality by applying at least one of multiple algorithms. The noise reduction algorithms that can be applied in either the noise reduction unit 403 or the set of noise reduction (NR) filters 502, exemplarily illustrated in FIG. 5, include a Wiener filter based noise reduction algorithm, a spectral subtraction noise reduction algorithm, and a model based noise reduction algorithm.

The schematic diagram for performing the Wiener filter based noise reduction to suppress background noise is exemplarily illustrated in FIG. 9. The Wiener filter based noise reduction unit 900 comprises three components: a Wiener filter bank analysis unit 902, an adaptive Wiener filter 906, and a Wiener filter bank synthesis unit 907. The Wiener filter bank analysis unit 902 transforms a full band noisy speech 901 sequence into a frequency domain such that the subsequent analysis can be performed on a sub band basis. This is achieved by the short time discrete Fourier transform (DFT). The bandwidth of each sub band is given by the ratio of the sampling frequency to the transformed length. The Wiener filter based noise reduction unit 900 explores short term and long term statistics of speech 903, short term and long term statistics of noise 904, and a wide band and narrow band signal-to-noise ratio (SNR) 905 to support a Wiener gain filtering. After the spectrum of noisy speech 901 passes through the Wiener filter 906, an estimation of the clean speech spectrum is generated, that is, the adaptive Wiener filter 906 estimates the clean speech spectrum from the spectrum of the noisy speech 901. The Wiener filter bank synthesis unit 907, as an inverse process of the Wiener filter bank analysis unit 902, reconstructs the signals of the clean speech 908 given the estimated clean speech spectrum.

The spectral subtraction noise reduction algorithm is configured to reduce the degrading effects of noise acoustically added in speech signals. Similar to the Wiener filter noised reduction algorithm, the spectral subtraction noise reduction algorithm estimates the magnitude of the frequency spectrum of the underlying clean speech 908 by subtracting frequency spectrum magnitude of the noise from the frequency spectrum magnitude of the noisy speech 901. The spectral subtraction algorithm estimates the current spectrum magnitude of the noisy speech 901 by using the average measured noise magnitude when there is no speech activity. Therefore, the implemented voice activity detection unit 407, exemplarily illustrated in FIG. 4, can help make the voice operated switch (VOX) function more reliable in a noisy environment, since the voice activity detection unit 407 can determine whether or not a user is speaking. In the first twenty five milliseconds, it is assumed that only noise appears and the frequency spectrum of the background noise is estimated. During the noisy speech 901, the noise spectrum is continuously updated when the current spectrum is below a preset threshold.

In the spectral subtraction noise reduction algorithm, the difference between real noise and estimated noise is called noise residual. Environmental noise sounds like the sum of tone generators with random frequencies. This phenomenon is known as "music noise". To solve this problem, smooth factors are applied in both frequency and time domains to remove the "music noise". The Wiener filter based noise reduction algorithm can be first applied, and then the spectral subtraction algorithm is subsequently adopted. After Wiener filtering, the noise level is reduced. The noise residual after the spectral subtraction noise reduction algorithm is applied is low enough to be masked by speech. Therefore, music noise is barely audible in the time domain.

Figure 10:
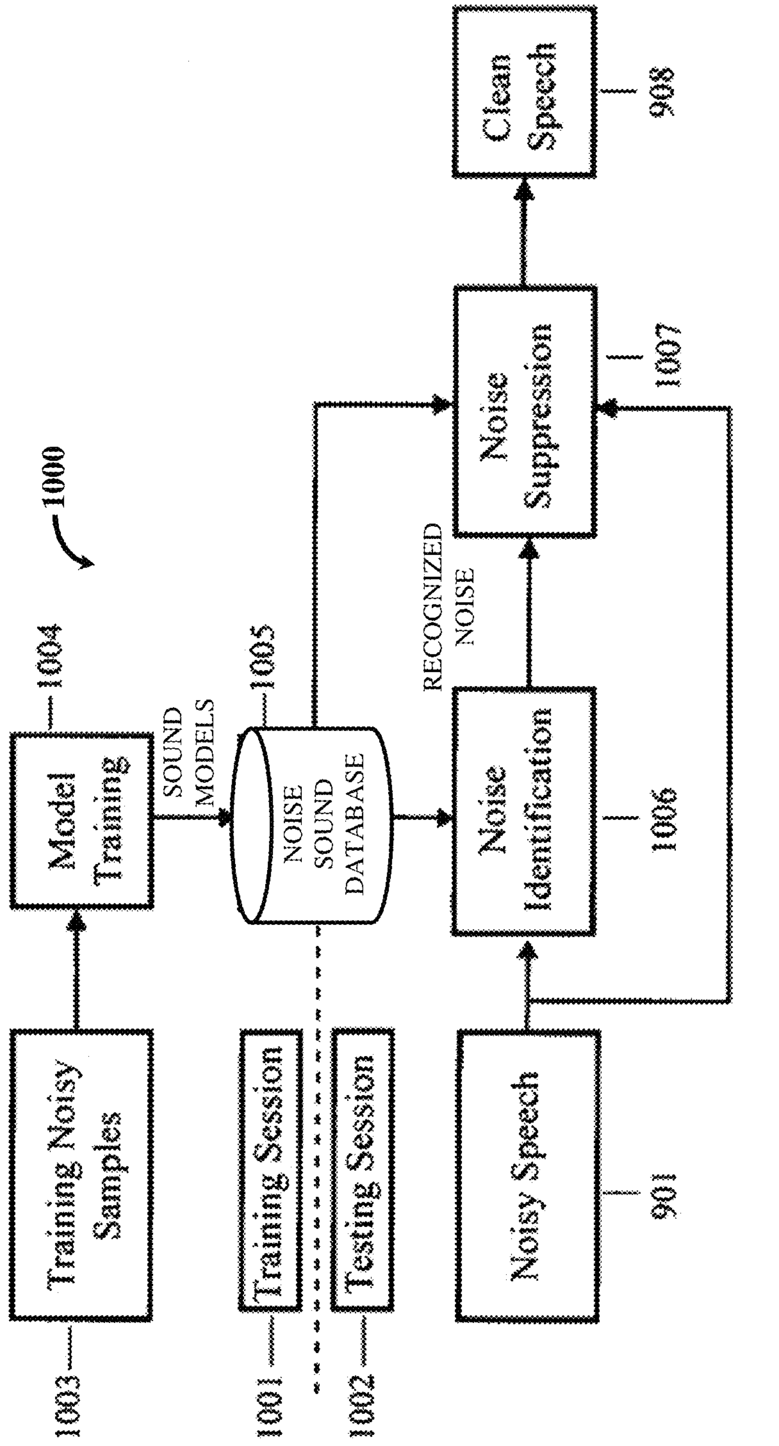
FIG. 10 exemplarily illustrates a model based noise reduction algorithm implemented by a model based noise reduction unit of the noise cancellation device.

FIG. 10 exemplarily illustrates a model based noise reduction algorithm implemented by the model based noise reduction unit 1000. FIG. 10 exemplarily illustrates a process flow diagram comprising the steps performed by the model based noise reduction unit 1000 for suppressing noise signals in the audio signal via a model based noise reduction method. In addition to environmental noise, there are other different noises generated, for example, by a self contained breathing apparatus such as air regulator inhalation noise, low pressure alarm noise, and personal alert safety system noise, which interfere with speech intelligibility and degrade the speech quality. The air regulator inhalation noise does not directly corrupt speech since users do not normally speak when inhaling. However, the noise can interfere with communications using a voice operated switch (VOX) mode with the communication device 106, exemplarily illustrated in FIG. 1, and is detracting to listeners. For those noises with known spectral patterns, a spectra model can be constructed to detect these noises. Once the noise is detected, a technique can be applied to cancel noise with the known spectral patterns. This method is known as the model based noise reduction algorithm.

The structure for model based noise cancellation is exemplarily illustrated in FIG. 10. The model based noise cancellation has two sessions: a training session 1001 and a testing session 1002. In the training session 1001, all kinds of known sounds or noise sound samples 1003 are first recorded and stored in a training database or a noise sound database 1005. In model training 1004, a Gaussian mixture model or a hidden Markov model is trained, which is named as model training 1004, to represent the statistical characteristics of represented speech sound. For each different kind of sound, a sound model is trained and stored in the noise sound database 1005. During the testing session 1002, that is, in a real time application where sound signals are detected, a decoder, for example, a noise identification unit 1006 is used to decode and compute the likelihood scores of the sound with a group of pre-trained sound models. Therefore, every sound model has an associated score. The sound model with the largest score is recognized as a noise sound model. Once the noise sound is identified by the noise identification unit 1006, the noise sound can be cancelled from the noisy speech 901 using the sub band noise suppression unit 1007 as disclosed in the detailed description of FIG. 11, to obtain clean speech 908. Compared to the full band method, the sub band implementation causes less speech distortion.

Figure 11:
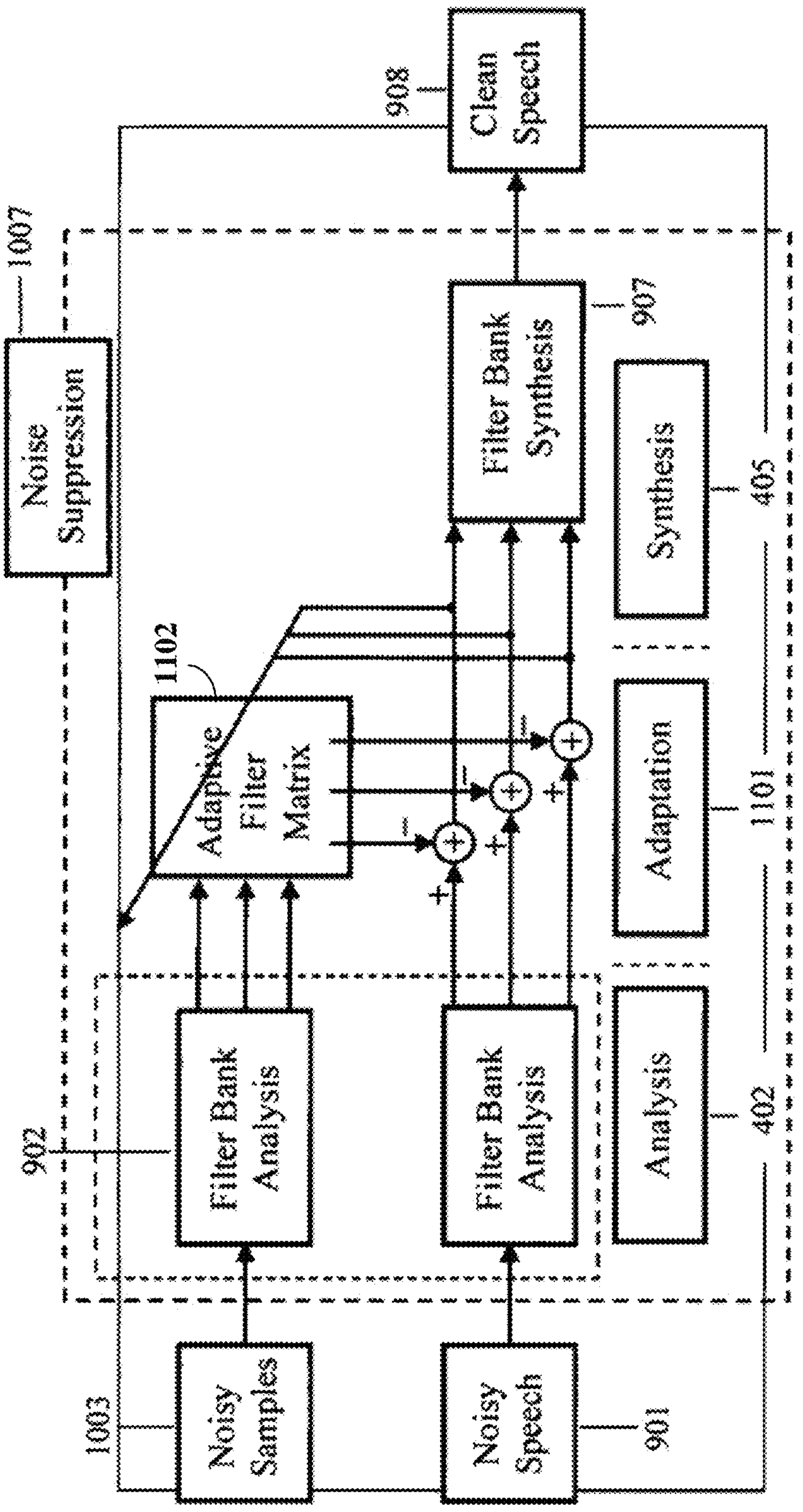
FIG. 11 exemplarily illustrates a noise suppression unit used for implementing the model based noise reduction algorithm shown in FIG. 10.

FIG. 11 exemplarily illustrates the noise suppression unit 1007 used for implementing the model based noise reduction algorithm shown in FIG. 10. Noise samples 1003, noisy speech 901, the filter bank analysis unit 402 such as the Wiener filter bank analysis unit 902, the filter bank synthesis unit 405 such as the Wiener filter bank synthesis unit 907, and clean speech 908 have the same functions as disclosed in the detailed description of FIG. 4, FIG. 9, and FIG. 10. The adaptive filters 1101 are used to estimate the noise in noisy speech 901. The adaptive filters 1101 in an adaptive filter matrix 1102 remove and suppress the noise signals on a sub band basis.

The fourth noise reduction algorithm uses a broadband noise reduction algorithm that takes advantage of structural correlations in speech signals as opposed to a broad frequency spread of noise signals. In an embodiment, a cochlear transform based noise reduction algorithm is utilized to decompose noisy speech signals into aurally meaningful band limited signals. This noise suppression method adaptively works on each of these sub band signals. The re-synthesized signal output by the noise suppression unit 1007 is a cleaner version of the noisy speech signals with minimal speech distortion. The cochlear transform based noise reduction algorithm is disclosed in non-provisional patent application Ser. No. 11/374,511 titled "Apparatus and method for noise reduction and speech enhancement with microphones and loudspeakers" filed on Mar. 13, 2006. The figures of the cochlear transform embodiments and their working principles are exemplarily illustrated in FIGS. 8A-10 of this patent application filed by the same assignee in this patent application.

The noise robust speech acquisition unit 102, exemplarily illustrated in FIG. 1, and noise reduction algorithms disclosed herein can guarantee speech intelligibility in a high noise environment. In order to support the voice operated switch (VOX) function and ensure that the radio channel is occupied only when speech exists, two voice activity detection algorithms have been utilized as disclosed in the detailed description of FIGS. 12A-12C, FIG. 13, and FIGS. 14A-14B.

Figure 12A:
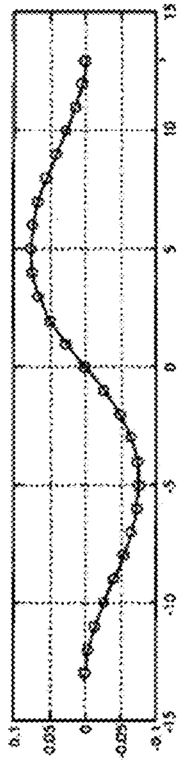
Figure 12A:
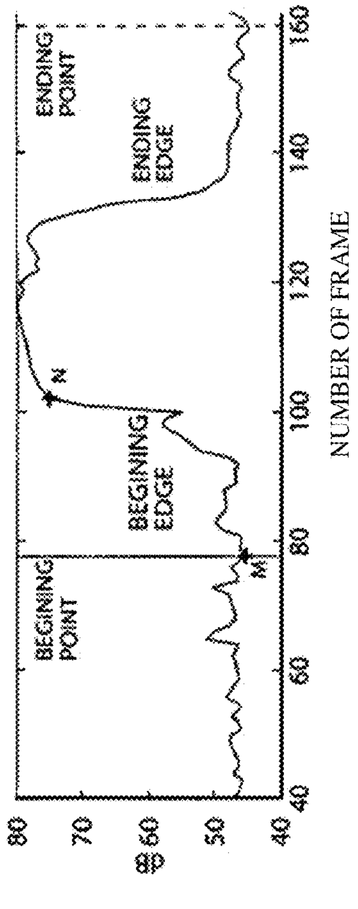
Figure 12C:
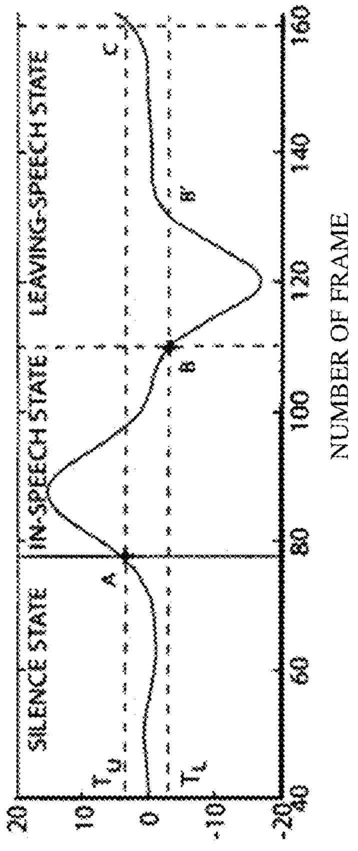

FIGS. 12A-12C exemplarily illustrate a change point detection algorithm implemented by the voice activity detection unit 407 exemplarily illustrated in FIG. 4. In the change point detection algorithm, the signal energy is calculated at the beginning. The speech section corresponds to an increased energy as exemplarily illustrated in FIG. 12A. An optimal filter, as exemplarily illustrated in FIG. 12B, is applied on the signal energy. When the filter approaches an increasing energy, the filter generates a peak; when the filter approaches a decreasing energy, the filter generates a valley as exemplarily illustrated in FIG. 12C. Two thresholds Tu and $T_L$ set an upper limit and a lower limit. Status with energy higher than Tu together with a peak is referred to as an in-speech state. Status with energy lower than $T_L$ together with a valley is referred to as a leaving speech state. The energy between Tu and $T_L$ is called as silence state. The signals are separated into three states: the silence state, the in-speech state, and the leaving speech state. Speech starts at the beginning of the in-speech state and speech ends at the end of the leaving speech state.

Figure 13:
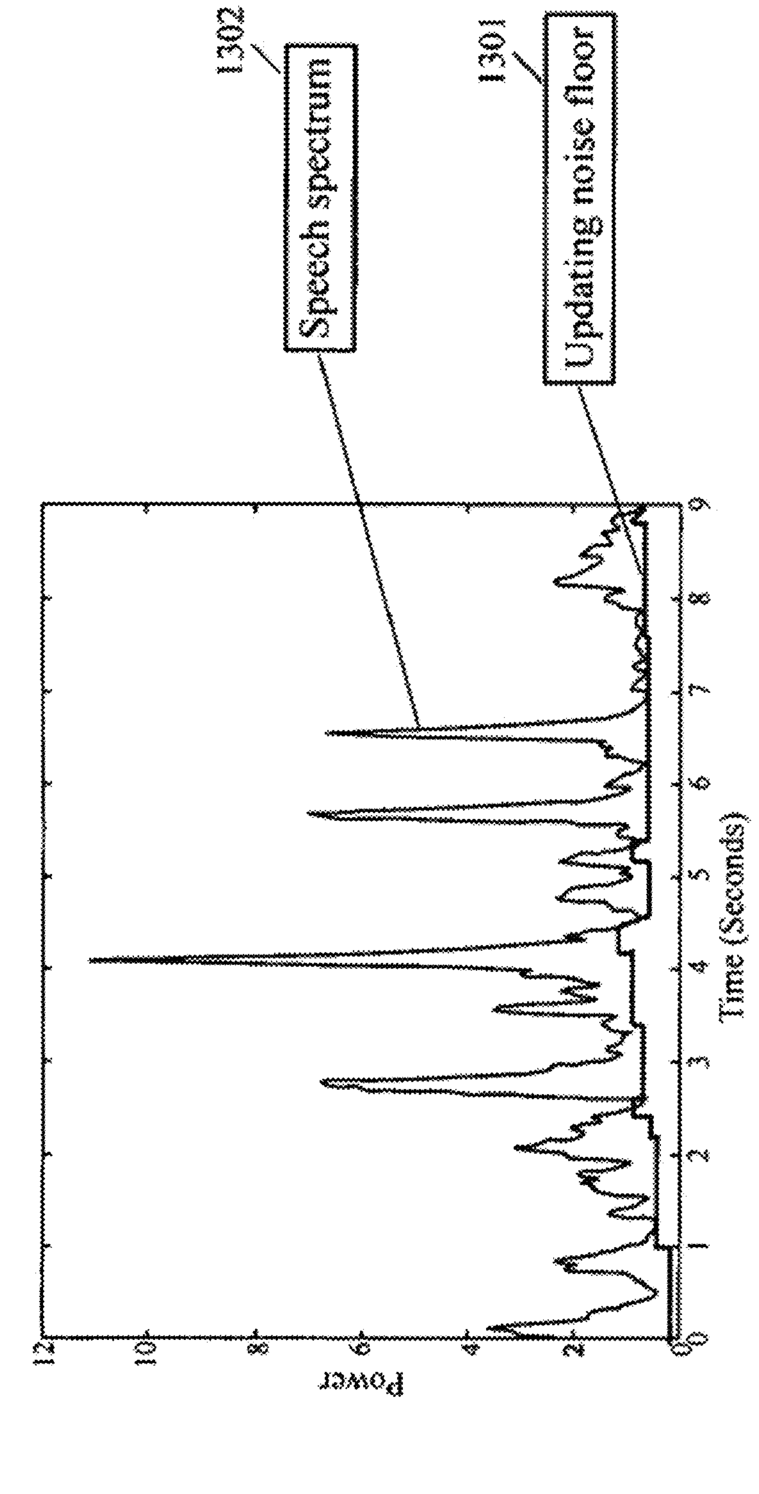
FIG. 13 exemplarily illustrates a graphical representation showing short time sub band power with an estimated noise floor of noisy speech signals where the frequency is 8000 Hz, the number of sub bands is 8, and the window size is 256.

FIG. 13 exemplarily illustrates a graphical representation showing short time sub band power with an estimated noise floor of noisy speech signals where the frequency is 8000 Hz, the number of sub bands is 8, and the window size is 256. FIG. 13 explains the principle of the energy based method. In the energy based method, the difference between the energy Y of the signals and the energy N of the noise is calculated and defined as DIST as disclosed in Equation (1). When the difference is greater than a threshold 6, DIST is "Speech" as disclosed in Equation (2) and when the difference is less than the threshold 6, DIST is "Silence" as disclosed in Equation (3).

$$DIST = Y - N \qquad \text{Equation (1)}$$

$$DIST = \begin{cases} \text{Speech} & DIST > \delta \qquad \text{Equation (2)} \\ \text{Silence} & DIST < \delta \qquad \text{Equation (3)} \end{cases}$$

One of the issues associated with the energy based method is how to estimate the noise power accurately. If a wrong threshold δ is used, the difference DIST cannot determine where the speech is. The minimum power of the sub band noise within a finite window is used to estimate the noise floor. The algorithm is based on the observation that a short time sub band power estimate of noisy speech signals exhibits distinct peaks and valleys as exemplarily illustrated in FIG. 13. While the peaks correspond to speech activity, the valleys of the smoothed noise estimate can be used to obtain an estimate of sub band noise power. To obtain reliable noise power estimates, the window size is selected in such a way that the window size is large enough to bridge any peak of speech activity. Plots of updating noise floor 1301 and a speech spectrum 1302 are exemplarily illustrated in FIG. 13.

Figure 14A:
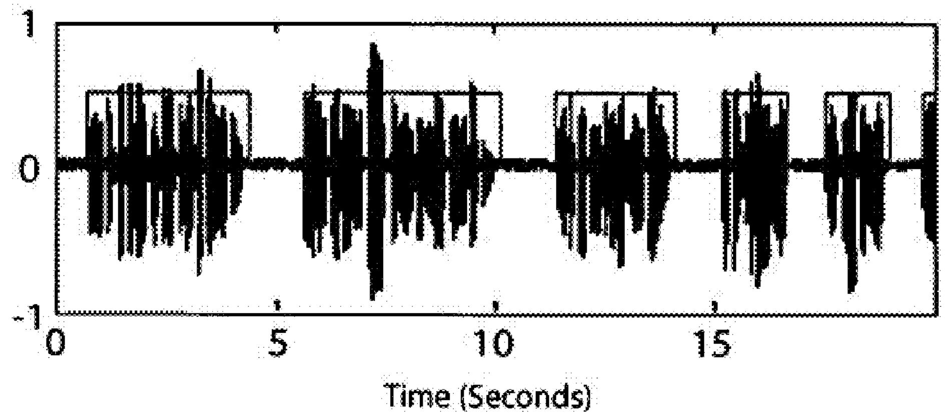
FIGS. 14A-14B exemplarily illustrate graphical representations showing the results applied with the voice activity detection unit.
Figure 14B:
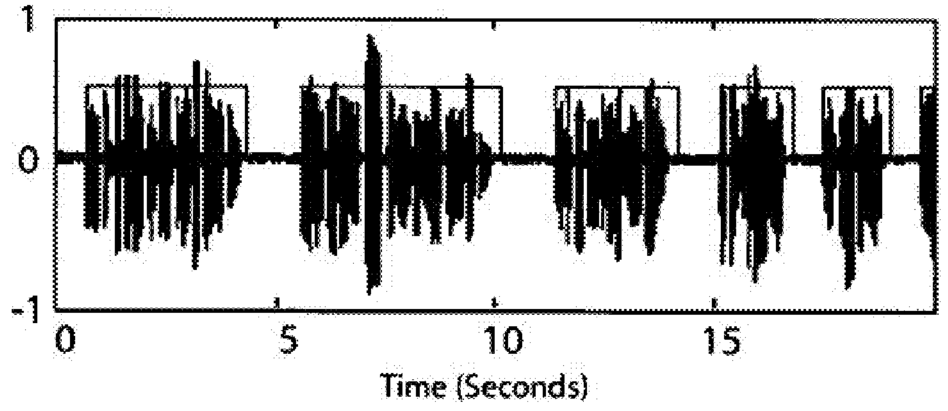

FIGS. 14A-14B exemplarily illustrate graphical representations showing the results applied with the voice activity detection unit 407 exemplarily illustrated in FIG. 4. The voice activity detection unit 407 implements two algorithms. One is the energy based algorithm and the other is the change point detection algorithm. FIG. 14A and FIG. 14B exemplarily illustrate the results after the energy based algorithm and the change point detection algorithm respectively have been implemented by the voice activity detection unit 407. The dark line indicates speech signals including speech sections and silence sections. The gray line presents the results after voice activity detection which indicates where the speech is. Each method can accurately identify the location of the speech section.

Figure 15:
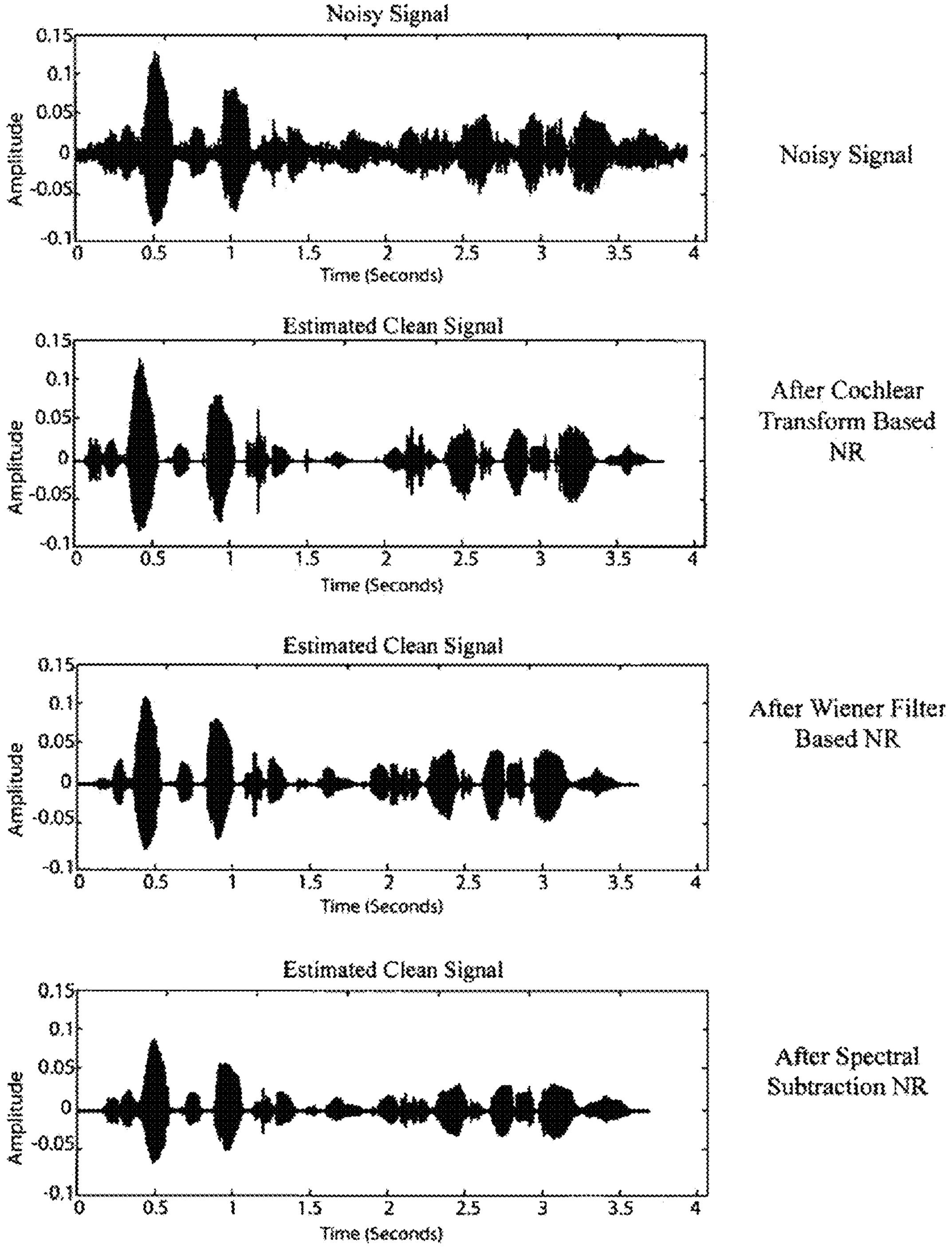
FIG. 15 exemplarily illustrates graphical representations showing improved audio signals generated by applying three noise reduction algorithms.
Figure 16:
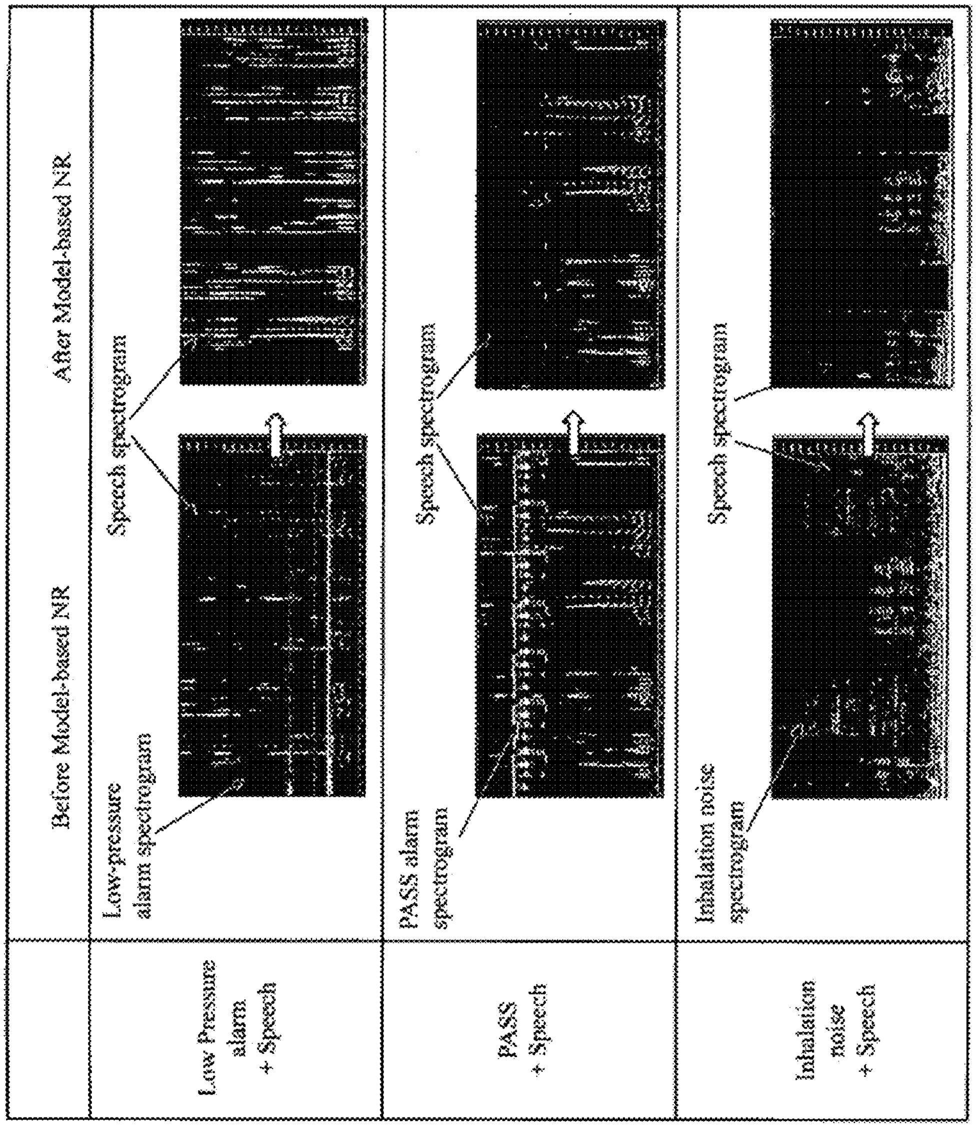
FIG. 16 exemplarily illustrates graphical representations showing improved audio signals generated by applying the model based noise reduction algorithm.
Figure 17:
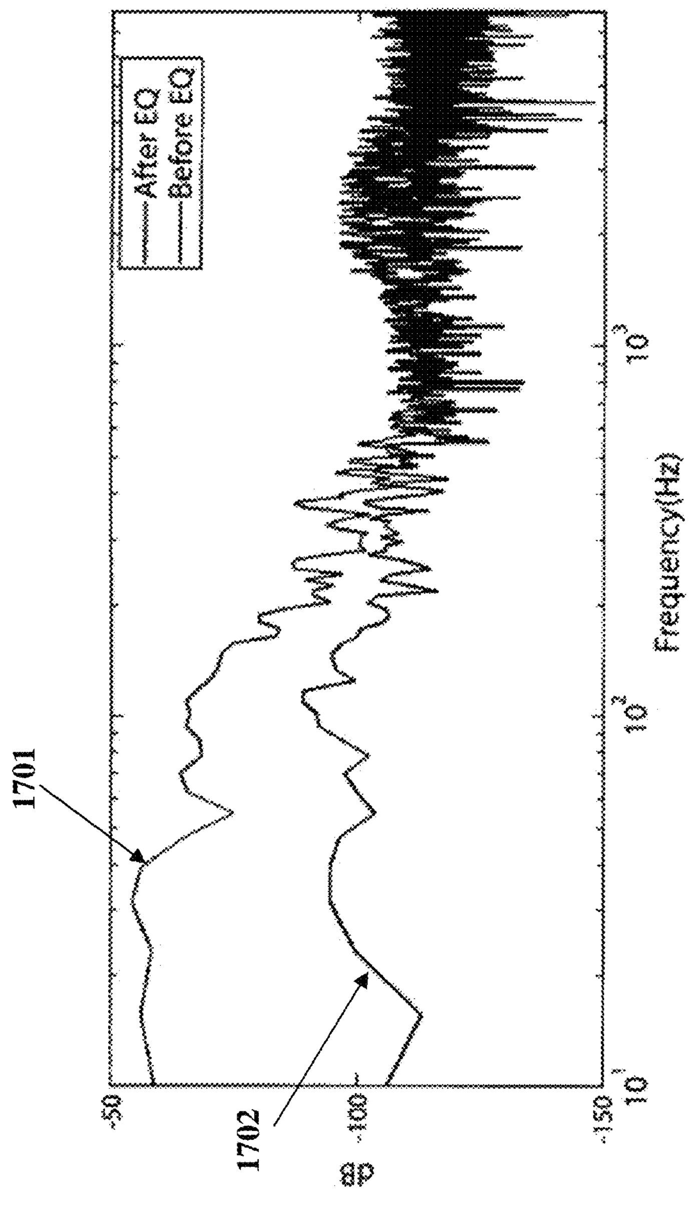
FIG. 17 exemplarily illustrates a graphical representation showing improved results by spectral equalization for the noise cancellation device with the in-the-ear microphone.

FIGS. 15-17 exemplarily illustrate improved results with the developed noise cancellation device 100 exemplarily illustrated in FIG. 1. FIG. 15 exemplarily illustrates graphical representations showing improved audio signals, that is, speech signals generated by applying three noise reduction (NR) algorithms. The noise reduction algorithms applied are the cochlear transform based noise reduction algorithm, the Wiener filter based noise reduction algorithm, and the spectral subtraction noise reduction algorithm. The x-axis represents the time in seconds and the y axis represents the signal magnitude. After the algorithms are applied, the signal-to-noise ratio improvement is, for example, about 10 decibels (dB) to about 15 dB.

FIG. 16 exemplarily illustrates graphical representations showing improved audio signals generated by applying the model based noise reduction algorithm. FIG. 16 exemplarily illustrates the result of the model based noise reduction on the noisy speech. The left column presents the noisy signals before model based noise reduction and the right column presents the signals after model based noise reduction. It is clear that low pressure alarm noise, personal alert safety system (PASS) noise, and inhalation noise are substantially suppressed while the speech spectrum is intact. For low pressure alarm noise and the PASS noise, although they may degrade the radio communication quality, the user, for example, a commander needs to hear the low pressure alarm through the communication device 106 exemplarily illustrated in FIG. 1, for example, the radio for the sake of safety. Therefore, the noise suppression level has to be controlled in such a way that both requirements can be met.

FIG. 17 exemplarily illustrates a graphical representation showing improved results by spectral equalization for the noise cancellation device 100 exemplarily illustrated in FIG. 1, with the in-the-ear microphone 202 exemplarily illustrated in FIG. 2. The horizontal axis represents a frequency range and the vertical axis represents energy level. The upper line 1701 shows the signals before the spectral equalization and the lower line 1702 shows the signals after spectral equalization. As shown, the signals are more evenly distributed after spectral equalization.

Figure 18:
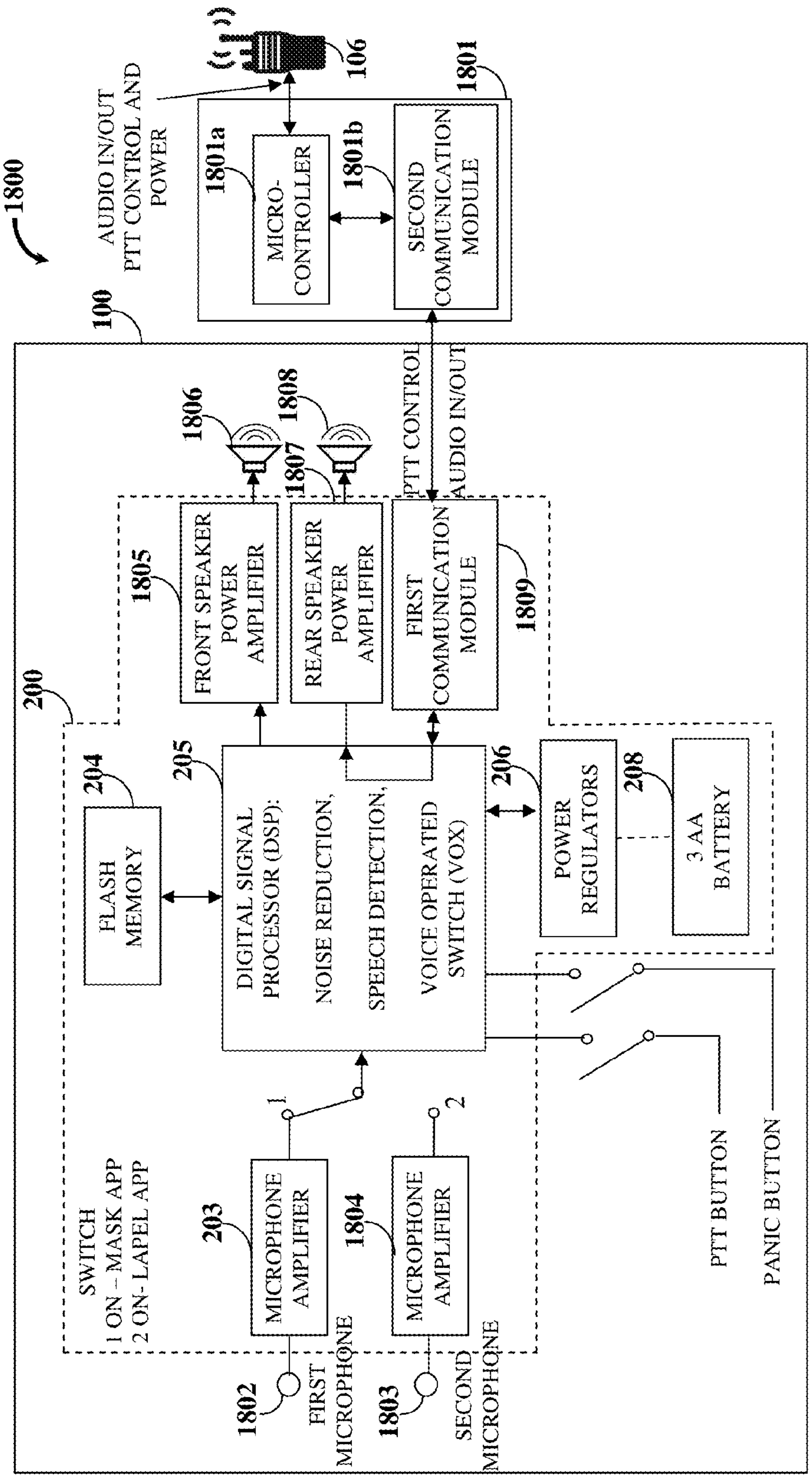
FIG. 18 illustrates a wearable communication system for personal face-to-face communication and wireless communication in a high noise environment.

FIG. 18 illustrates a wearable communication system 1800 for personal face-to-face communication and wireless communication in a high noise environment. The wearable communication system 1800 comprises the noise cancellation device 100 and a wireless coupling device 1801. The noise cancellation device 100 and the wireless coupling device 1801 communicate with each other through a wired connection or a wireless connection, for example, via a two way Bluetooth® of Bluetooth Sig, Inc., connection. The wireless coupling device 1801 is configured as a dongle attached via an electrical connector to the communication device 106. The noise cancellation device 100 comprises the speech acquisition unit 102, exemplarily illustrated in FIG. 1, comprising a first microphone 1802 operably positioned with respect to the wearable unit of the user, and a second microphone 1803. The first microphone 1802 is a contact microphone 201 exemplarily illustrated in FIG. 2. The first microphone 1802 receives voice vibrations from user speech in the high noise environment via the wearable unit and converts the voice vibrations into an audio signal. The second microphone 1803 detects voice vibrations in air and converts the voice vibrations into the audio signal. As exemplarily illustrated in FIG. 18, the noise cancellation device 100 further comprises the digital signal processing unit 200, a front loudspeaker 1806, a rear loudspeaker 1808, and a first communication module 1809. In an embodiment, an analog signal processing unit 300 may also be used as exemplarily illustrated and disclosed in the detailed description of FIG. 3. In another embodiment, the front loudspeaker 1806 and the rear loudspeaker 1808 of the noise cancellation device 100 are combined and configured as a single loudspeaker that performs the functions of both the front loudspeaker 1806 and the rear loudspeaker 1808. The front loudspeaker 1806 is in operative communication with the digital signal processing unit 200 and emits the speech signal for facilitating personal face-to-face communication in the high noise environment.

The first communication module 1809 transmits the speech signal from the noise cancellation device 100 to the communication device 106 and receives external speech signals transmitted by the communication device 106 during wireless communication. As used herein, the phrase “communication module” refers to a wired or a wireless module, for example, a Bluetooth® module of Bluetooth Sig, Inc., for transmitting and receiving audio signals between the noise cancellation device 100 and the wireless coupling device 1801. In an embodiment, the wearable communication system 1800 utilizes Bluetooth® modules for wireless communication. The Bluetooth® modules provide secure wireless Bluetooth® pairing strategy which prevents other wireless or Bluetooth® signals from interfering with the transmission.

The rear loudspeaker 1808 emits the external speech signals received from the communication device 106 for facilitating wireless communication in the high noise environment. The digital signal processing unit 200 comprises a first microphone amplifier 203 operably coupled to the first microphone 1802 or the contact microphone 201 and another or a second microphone amplifier 1804 operably coupled to the second microphone 1803, one or more power regulators 206, the energy storage device 208, the digital signal processor 205 as disclosed in the detailed description of FIG. 4, the analog to digital converter 401, exemplarily illustrated in FIG. 4, the digital to analog converter 406, exemplarily illustrated in FIG. 4, the flash memory 204, a front speaker power amplifier 1805 in operative communication with the front loudspeaker 1806, and a rear speaker power amplifier 1807 in operative communication with the rear loudspeaker 1808.

The wireless coupling device 1801 is attached to the communication device 106 and operably couples the noise cancellation device 100 to the communication device 106. The wireless coupling device 1801 comprises a second communication module **1801*b*, and a microcontroller 1801*a*. The second communication module 1801*b* receives the transmitted speech signal from the first communication module 1809 of the noise cancellation device 100 and transmits the external speech signal from the communication device 106 to the noise cancellation device 100, during wireless communication. The second communication module 1801*b* of the wireless coupling device 1801 is securely paired with the first communication module 1809 of the noise cancellation device 100 for preventing external wireless signals or other Bluetooth® signals from interfering with communication of the speech signal and the external speech signal between the wireless coupling device 1801 and the noise cancellation device 100. The microcontroller 1801*a* transmits the received speech signal from the noise cancellation device 100 to the communication device 106. The microcontroller 1801*a* further controls an operation of the wireless coupling device 1801 to prevent interference of the wireless coupling device 1801 with a normal operation of the communication device 106, that is, when the communication device 106 operates as a standalone device. For example, the wireless coupling device 1801** does not interfere with normal radio operations such as charging, battery change, push to talk (PTT) communication, channel selection, volume control, etc.

The noise cancellation device 100 is configured for multiple applications. The noise cancellation device 100 is attachable to a wearable unit. When the user wears the wearable unit, for example, a self contained breathing apparatus, the noise cancellation device 100 can be clipped on a face mask 101 exemplarily illustrated in FIGS. 21A-21C, of the self contained breathing apparatus. In this embodiment, the noise cancellation device 100 uses the contact microphone 201 with the digital signal processing unit 200 to generate the user's clean voice in noisy environments. In an embodiment, the contact microphone 201 is located within the noise cancellation device 100 at a connecting point between a voicemitter 2312 of the face mask 101 exemplarily illustrated in FIG. 23I, and the noise cancellation device 100. The contact microphone 201 picks up or receives voice vibrations from the voicemitter 2312. The built in front loudspeaker 1806 through the front speaker power amplifier 1805 amplifies the user's voice so that the user's voice can be heard locally. When a protective face mask 101 is not worn, the noise cancellation device 100 can be clipped on a lapel of a garment worn by the user and be used as a lapel microphone. In this embodiment, the noise cancellation device 100 uses the regular microphone, that is, the second microphone 1803 to pick up voice vibrations in air. In both the embodiments, the user's voice is transmitted wirelessly to the wireless coupling device 1801 which is connected to the communication device 106, for example, a handheld radio. The radio signal is amplified through the rear speaker power amplifier 1807 on the noise cancellation device 100, and then angled toward the user's ear through the rear loudspeaker 1808 or through an ear plug 802 exemplarily illustrated in FIG. 8A, worn by the user.

The wearable communication system 1800 disclosed herein provides clear communications in high noise environments using mask microphone technology and noise reduction solution. The wearable communication system 1800 provides a hands free communication solution. The wireless coupling device 1801 attaches to the communication device 106, which is typically carried inside the user's coat pocket or clipped onto his/her belt. The noise cancellation device 100 can either be attached to the face mask 101 or to the lapel of the user. When the user is wearing the wearable unit such as the self contained breathing apparatus, a voice operated switch function enables hands free communication. Since the noise cancellation device 100 and the wireless coupling device 1801 communicate wirelessly, the wearable communication system 1800 prevents any hazards caused due to tangled wires, for example, conventional lapel microphone wires that may get caught on an object. The wearable communication system 1800 disclosed herein can be used with or without the communication device 106. When working with the communication device 106, for example, the radio, the noise cancellation device 100 transmits the user's clear voice to the radio through the attached wireless coupling device 1801. The radio output is played through the rear loudspeaker 1808 of the noise cancellation device 100, which is close to the user's ear. When used without a radio, the noise cancellation device 100 operates as a voice amplifier and amplifies the user's voice through the front loudspeaker 1806, to allow other users to hear the user's voice clearly.

Figure 19:
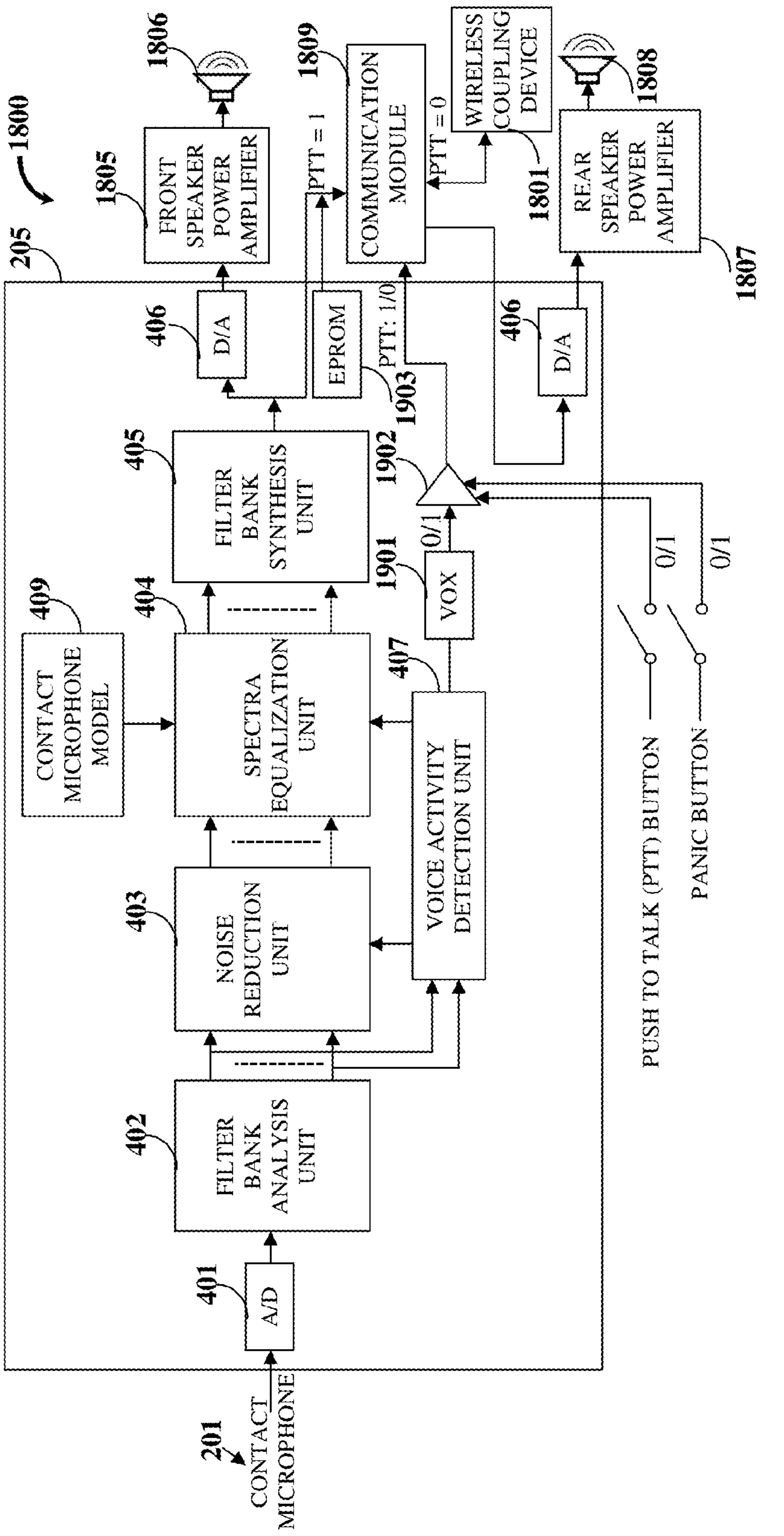
FIG. 19 exemplarily illustrates an embodiment of the wearable communication system, showing a digital signal processor of the noise cancellation device in operative communication with a contact microphone and a wireless coupling device.

FIG. 19 exemplarily illustrates an embodiment of the wearable communication system 1800, showing the digital signal processor 205, in operative communication with the contact microphone 201 and the wireless coupling device 1801. In this embodiment, the noise cancellation device 100 is attached to the face mask 101 exemplarily illustrated in FIGS. 21A-21C. The noise cancellation device 100 picks up the user's voice through the contact microphone 201 when the face mask 101 is worn. The contact microphone 201 detects voice vibrations on the face mask 101 generated inside by the user's voice, and converts the voice vibrations into an electronic signal. The contact microphone 201 is not sensitive to the vibrations on the face mask 101 generated outside by the background noise. The sub band noise reduction unit 403 and the spectra equalization unit 404 process the audio signal received via the contact microphone 201 and generate clear voice or the speech signal in high noise environments. The functions of the analog to digital converter 401, the filter bank analysis unit 402, the filter bank synthesis unit 405, and the digital to analog converter 406 of the digital signal processor 205 are disclosed in the detailed description of FIG. 4.

Since the contact microphone 201 picks up the speaker's or the user's own voice in the enclosed space, the audio signal's spectrum is different from the signal transmitted in open air. The spectra equalization unit 404 changes the signal spectrum of the analog signal or the sound captured by the contact microphone 201 to match the signal spectrum of audio signals transmitted in the open air by using the contact microphone model 409. The spectra equalization unit 404 boosts the low frequency information of the audio signal. The contact microphone model 409 simulates the difference between a close talk microphone and the contact microphone 201. The contact microphone model 409 corrects the spectral distortion such that the audio signals sound more natural after applying the contact microphone model 409.

The voice activity detection unit 407 detects whether speech exists, which is used as an input to the voice operated switch (VOX) 1901. The push to talk (PTT)/VOX switch 1902 allows the user to switch between the PTT communication mode and the VOX communication mode. When switched to the PTT communication mode, a PTT button 2302 exemplarily illustrated in FIGS. 23A-23C and FIG. 23E, can be pressed and released to function in the PTT communication mode. The voice activity detection unit 407 supports the VOX function and ensures that communication channels, for example, radio channels are occupied only when speech exists. The voice activity detection unit 407 detects speech and silence signals, for example, using the change point detection algorithm and the energy based algorithm also referred to as an "energy differencing algorithm".

When the push to talk (PTT) button 2302 is pressed or voice is detected by the voice activity detection unit 407 operating in a voice operated switch (VOX) communication mode, that is, either the VOX 1901 or the push to talk (PTT) switch is at 1, the noise cancellation device 100 transmits the user's voice through the communication device 106, exemplarily illustrated in FIG. 18, such as the radio to allow the other users to hear the user's or the speaker's voice clearly at a distance. The front loudspeaker 1806, in operative communication with the front speaker power amplifier 1805, plays the user's voice. This transmission is achieved wirelessly by the communication modules 1809 and 1801*b* on the noise cancellation device 100 and the wireless coupling device 1801 respectively as exemplarily illustrated in FIG. 18. When the PTT button 2302 is not pressed or voice is not detected in the VOX communication mode, that is, both the VOX 1901 and the PTT switch are at 0, the communication module 1801*b* of the wireless coupling device 1801 transmits the speech signal received by the communication device 106 to the noise cancellation device 100. The rear loudspeaker 1808, in operative communication with the rear speaker power amplifier 1807, on the noise cancellation device 100 plays the speech signal when the PTT button 2302 is not pressed by the user. In an embodiment, the speech signal is played through an ear plug 802, exemplarily illustrated in FIG. 8A, which is interfaced with the noise cancellation device 100, so that the user can clearly hear persons talking through the communication device 106.

Figure 23A:
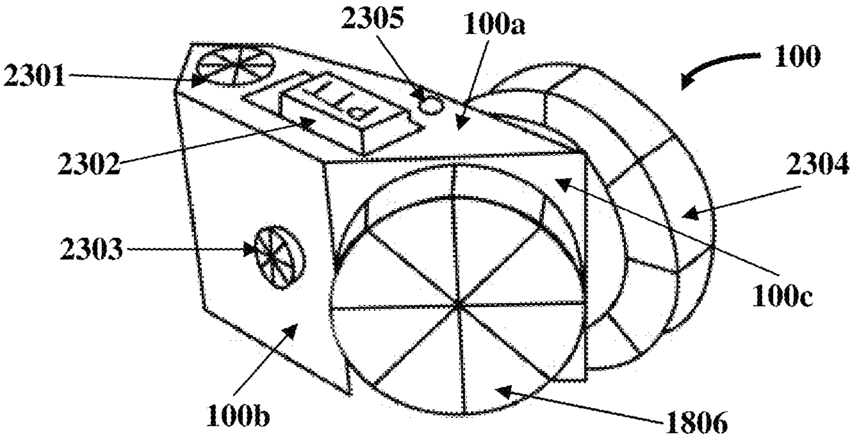
FIGS. 23A-23D exemplarily illustrate perspective views of the noise cancellation device.
Figure 23B:
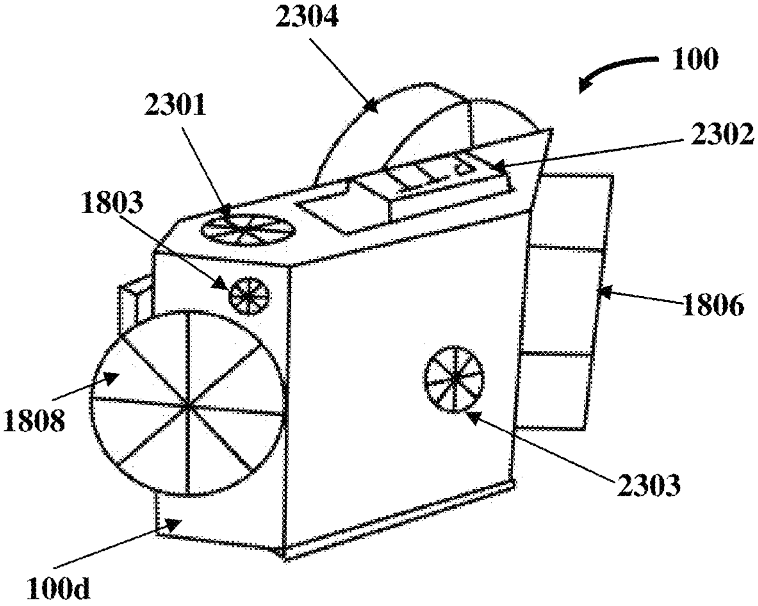
Figure 23C:
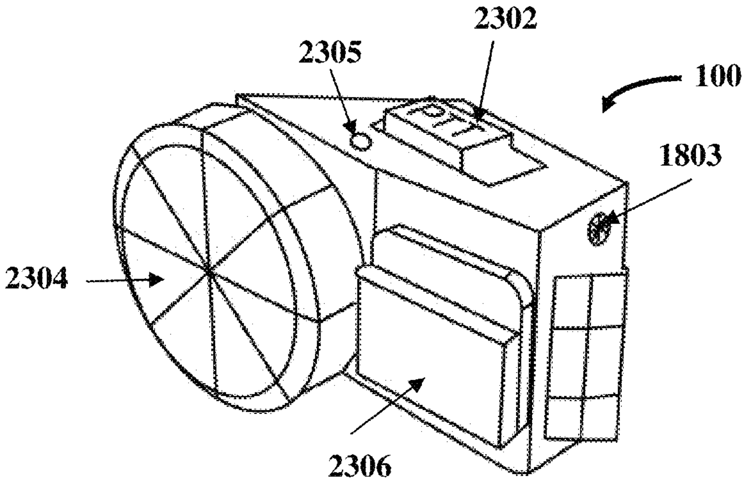
Figure 23D:
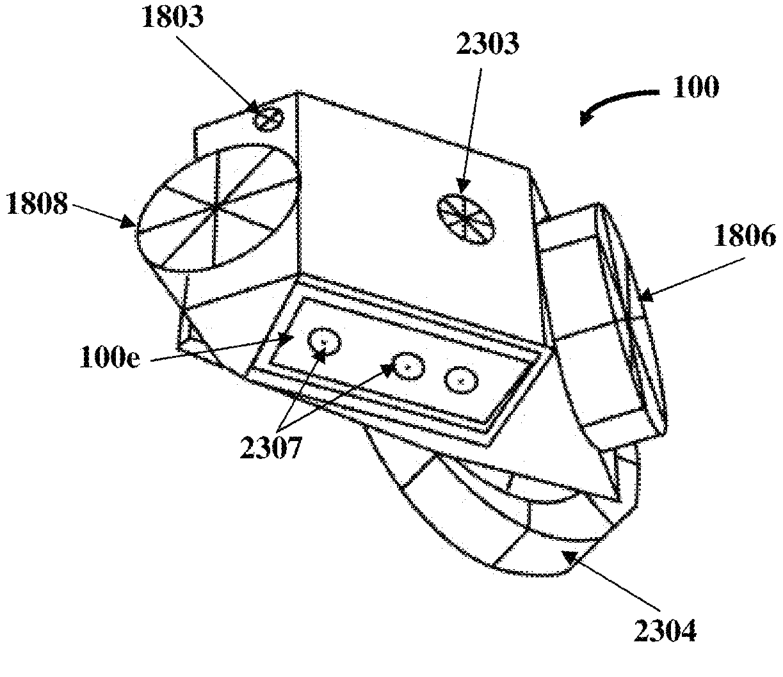
Figure 23E:
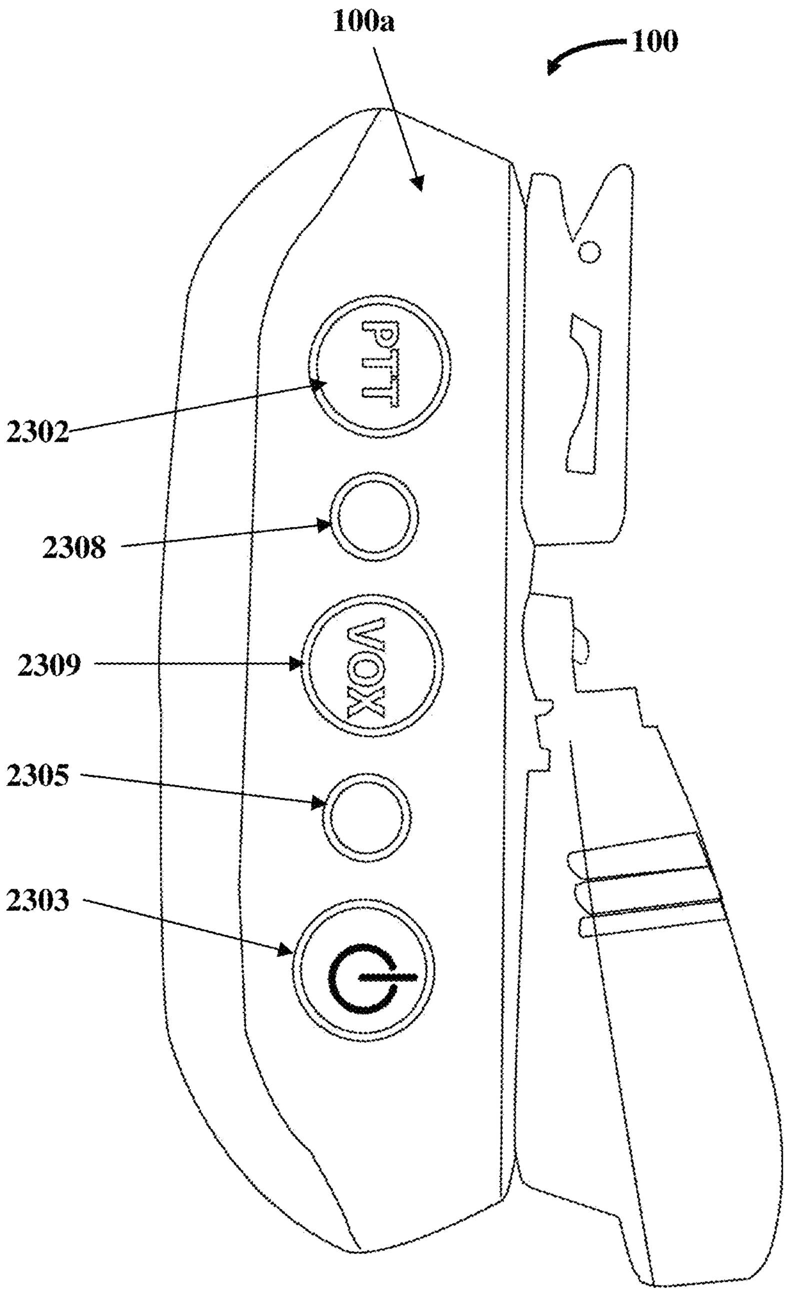
Figure 23F:
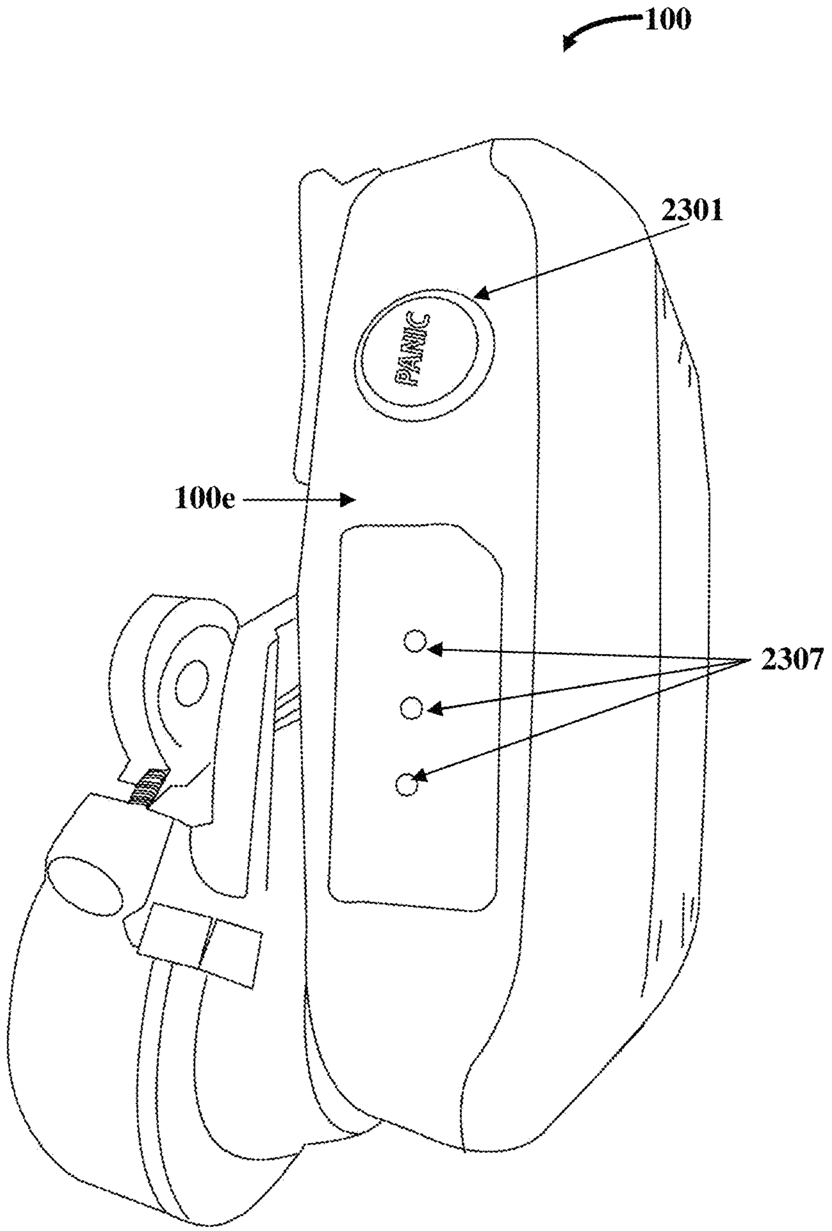

In an embodiment, a panic button 2301 is operably connected on the noise cancellation device 100 as exemplarily illustrated in FIGS. 23A-23B and FIG. 23F. The panic button 2301 allows a user to transmit an alert message when the user needs immediate assistance. When the panic button 2301 is pressed or activated by the user, the noise cancellation device 100 transmits a pre-recorded "HELP" alert message stored in an erasable programmable read only memory (EPROM) 1903, through the communication device 106 to another communication device at a distance. The noise cancellation device 100 assigns the highest priority for this alert message. The alert message is uniquely identifiable to the specific communication device 106 attached to the specific wireless coupling device 1801 so that the receiver of the alert message will know which user sent the alert message.

Figure 20:
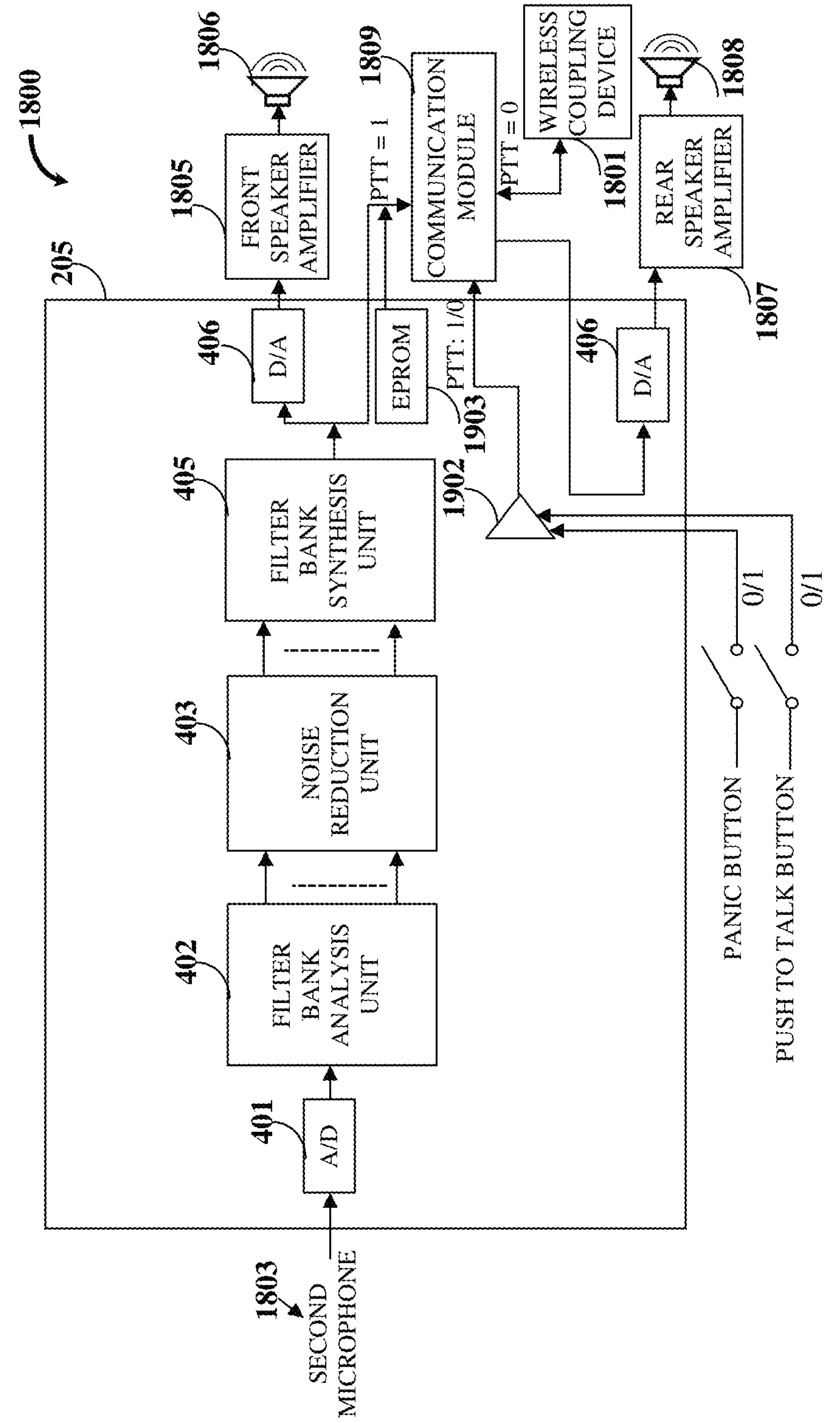
FIG. 20 exemplarily illustrates an embodiment of the wearable communication system, showing a digital signal processor of the noise cancellation device in operative communication with a regular microphone and a wireless coupling device.

FIG. 20 exemplarily illustrates an embodiment of the wearable communication system 1800, showing the digital signal processor 205 in operative communication with a regular microphone or the second microphone 1803 and the wireless coupling device 1801. In this embodiment, the noise cancellation device 100 exemplarily illustrated in FIG. 18, is used as a lapel microphone. The second microphone 1803 detects voice vibrations in the air and converts the voice vibrations into audio signals. The digital signal processor 205 comprising the analog to digital converter 401, the filter bank analysis unit 402, the noise reduction unit 403, the filter bank synthesis unit 405, and the digital to analog converter 406 processes the audio signals received from the second microphone 1803. The digital signal processor 205 operates control functions and audio functions comprising, for example, voice activity detection, noise reduction, howling control, etc., for the noise cancellation device 100. The front loudspeaker 1806 plays the processed audio signal so that the user wearing the face mask 101, exemplarily illustrated in FIGS. 21A-21C, can be heard clearly by other users around him/her in a noisy environment. The communication module 1809 is a two way communication module that transmits the audio signals to the communication device 106, exemplarily illustrated in FIG. 18, via the wireless coupling device 1801. The second microphone 1803 can also record a "HELP" alert message. The noise cancellation device 100 stores the alert message in the erasable programmable read only memory (EPROM) 1903 and transmits the alert message through the communication device 106 to another communication device when the user presses or activates the panic button 2301 exemplarily illustrated in FIGS. 23A-23B and FIG. 23F.

Figure 21A:
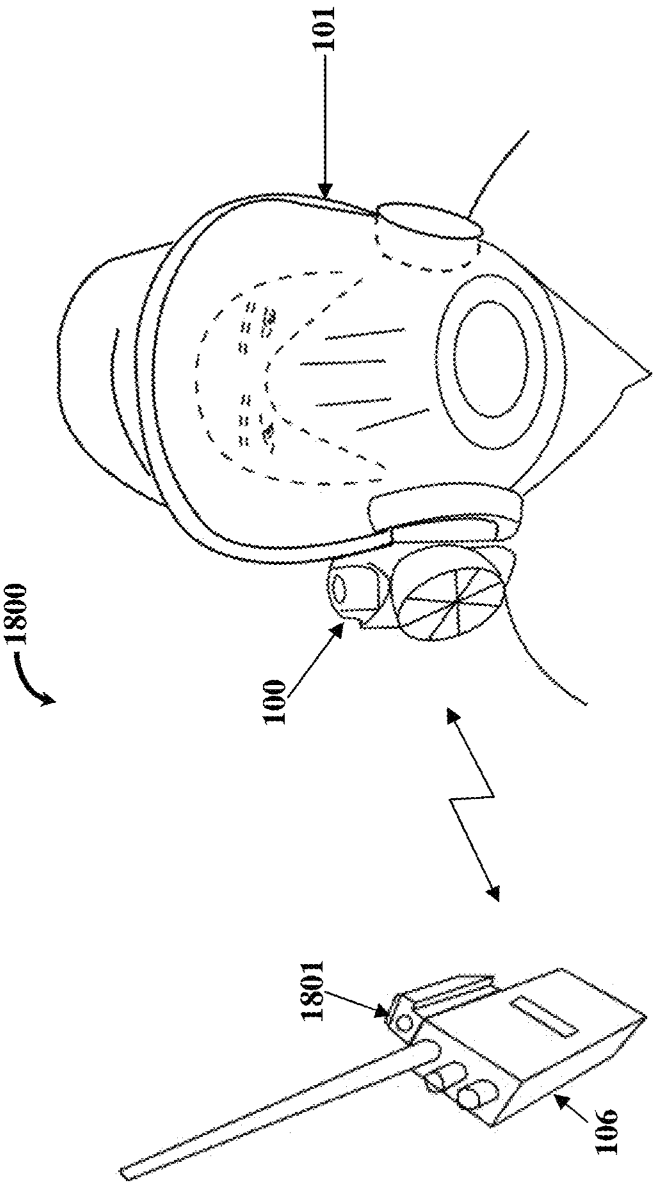
FIGS. 21A-21C exemplarily illustrate an embodiment of the wearable communication system, showing the noise cancellation device attached to a face mask of a user.
Figure 21B:
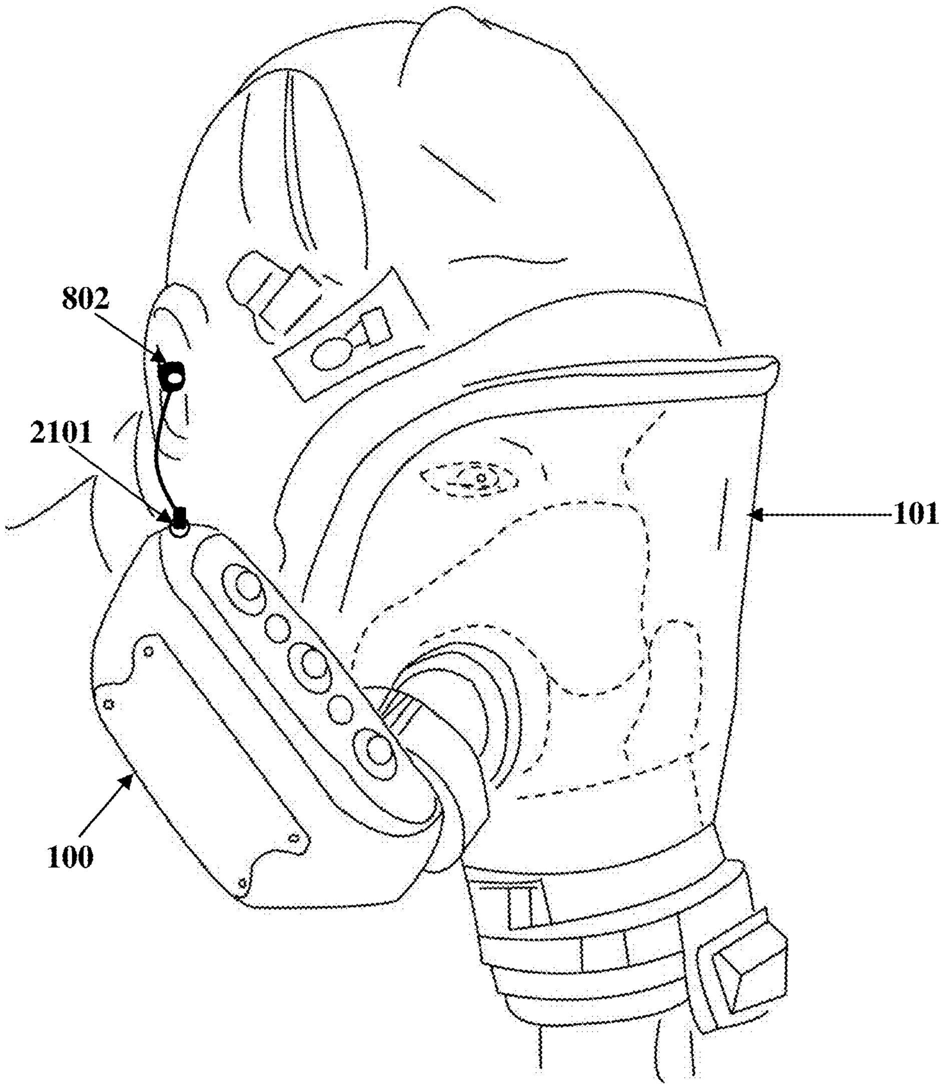
Figure 21C:
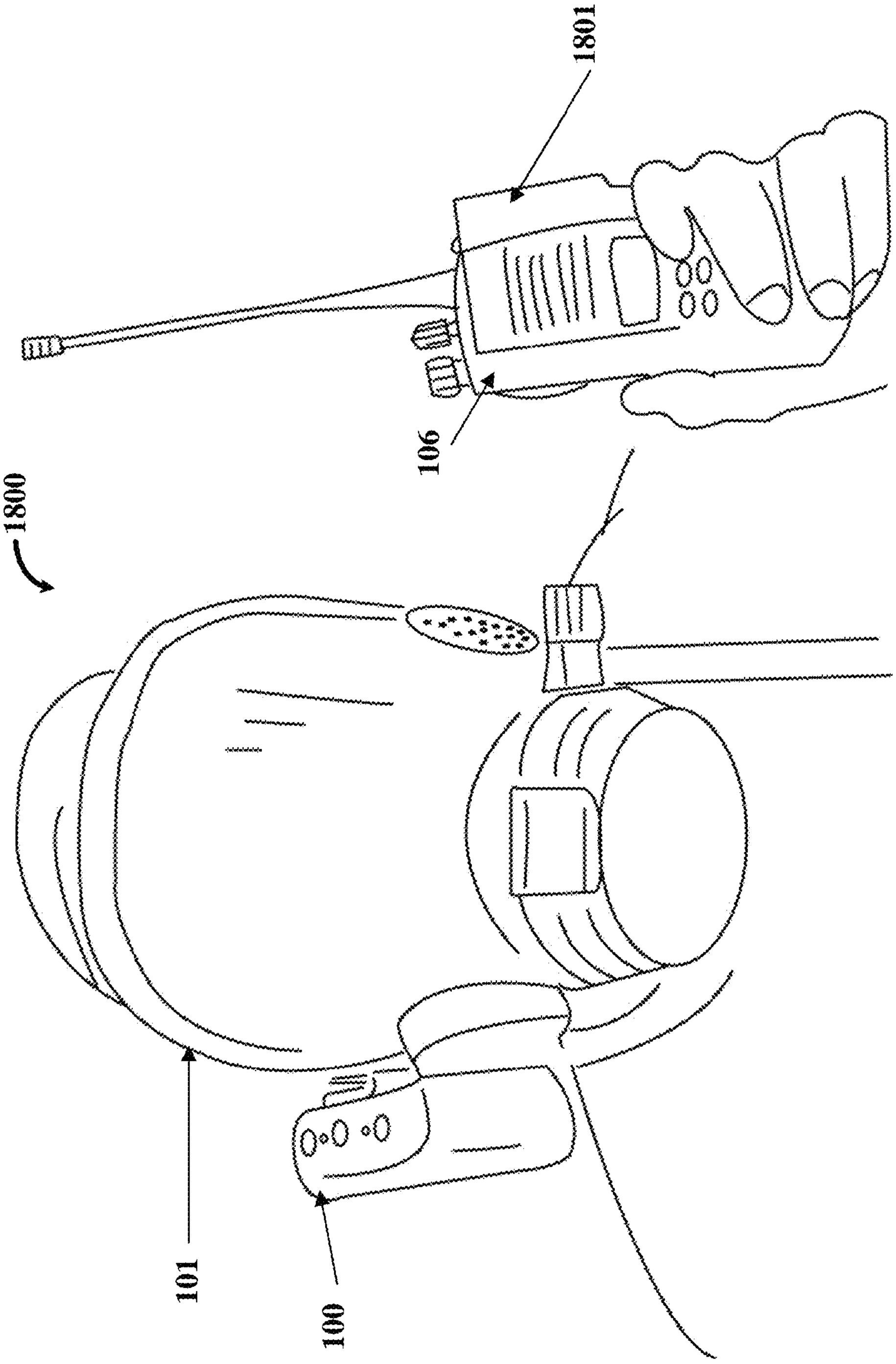

FIGS. 21A-21C exemplarily illustrate an embodiment of the wearable communication system 1800, showing the noise cancellation device 100 attached to the face mask 101 of a user. The noise cancellation device 100 attaches to the face mask 101 without blocking the user's vision, without affecting integrity of the seal of the protective face mask 101, and without interfering with the user's normal operation. In an embodiment, the noise cancellation device 100 is configured to receive voice vibrations from user speech via the contact microphone 201 exemplarily illustrated in FIG. 6, when the noise cancellation device 100 is attached to the face mask 101. The noise cancellation device 100 can remain attached to the face mask 101 for storage, maintenance, and operation. When the noise cancellation device 100 is attached to the face mask 101, the noise cancellation device 100 adds another function as a voice amplifier to amplify the user's voice through the built in front loudspeaker 1806 exemplarily illustrated in FIG. 18. The noise cancellation device 100 is in operative communication with the wireless coupling device 1801 attached to the communication device 106 as exemplarily illustrated in FIG. 21A and FIG. 21C. In an embodiment, the noise cancellation device 100 of the wearable communication system 1800 comprises an audio connector 2101 as exemplarily illustrated in FIG. 21B. The audio connector 2101 is a female connector that connects an ear plug 802 to the noise cancellation device 100. The audio connector 2101 allows the user to clearly hear the speech signal from the communication device 106 in high noise environments.

Figure 22A:
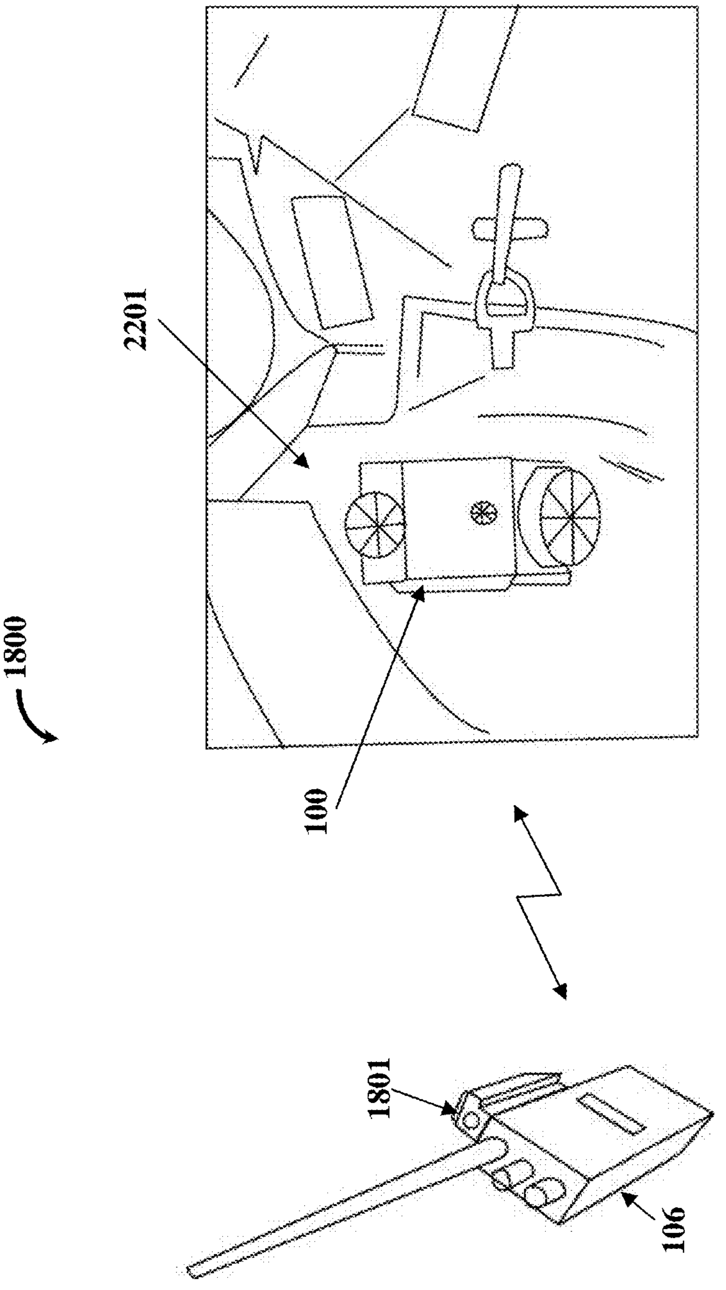
FIGS. 22A-22B exemplarily illustrate an embodiment of the wearable communication system, showing the noise cancellation device attached to a lapel of a user.
Figure 22B:
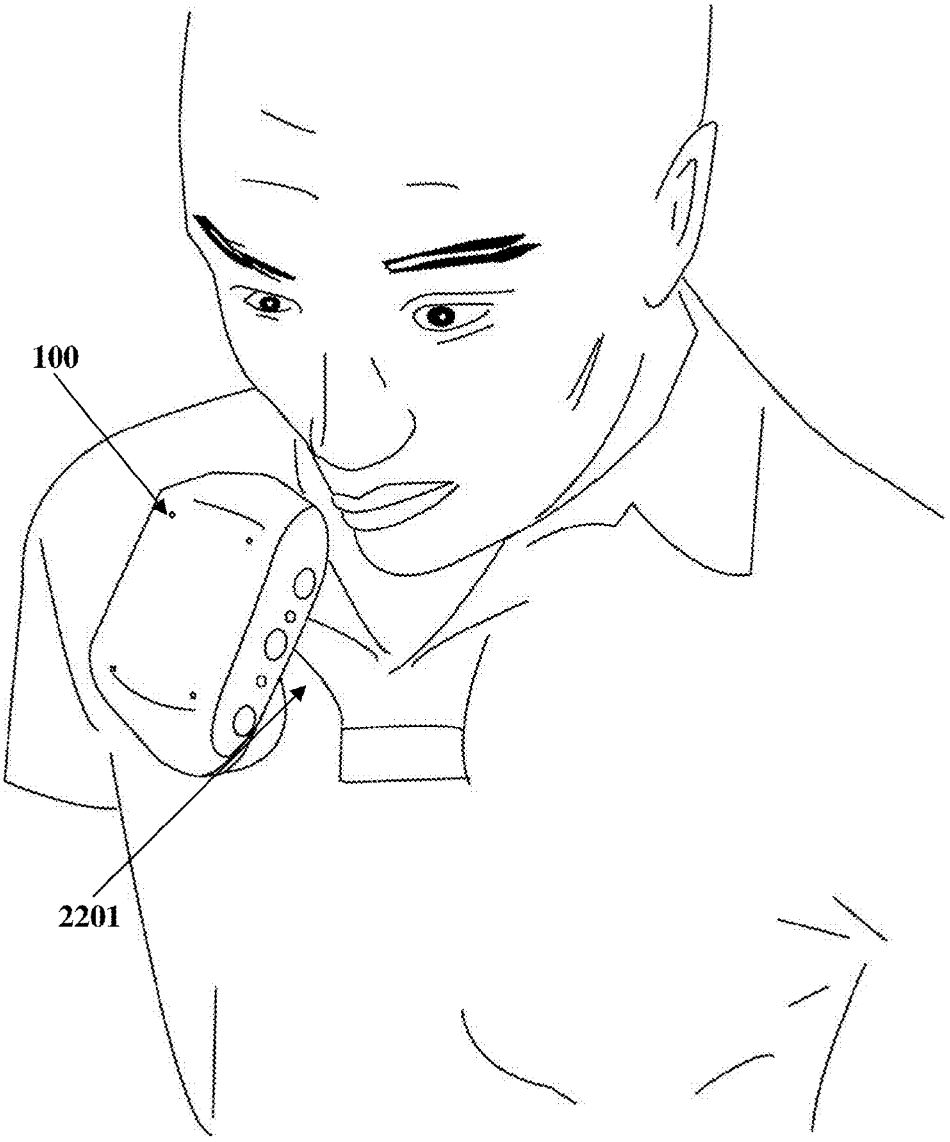

FIGS. 22A-22B exemplarily illustrate an embodiment of the wearable communication system 1800, showing the noise cancellation device 100 attached to a lapel 2201 of a user. In an embodiment, the noise cancellation device 100 can be attached to the lapel 2201 of the user and used as a lapel microphone when the user is not wearing a face mask 101 exemplarily illustrated in FIGS. 21A-21C, or other protective equipment as exemplarily illustrated in FIGS. 22A-22B. In this embodiment, the noise cancellation device 100 receives the user's voice vibrations through the second microphone 1803 exemplarily illustrated in FIG. 18. The noise cancellation device 100 processes the audio signals received from the second microphone 1803 and transmits the speech signals to the communication device 106 via the wireless coupling device 1801.

FIGS. 23A-23D exemplarily illustrate perspective views of the noise cancellation device 100. FIGS. 23A-23B exemplarily illustrate isometric views of the noise cancellation device 100. A panic button 2301, a push to talk (PTT) button 2302, and a light emitting diode (LED) indicator 2305 are positioned on an upper surface 100*a* of the noise cancellation device 100 as exemplarily illustrated in FIG. 23A. The panic button 2301 triggers an alert signal and transmits a pre-recorded distress message stored in the noise cancellation device 100 through the communication device 106, exemplarily illustrated in FIG. 18, to another device. For example, the panic button 2301 sends out an audio alarm and a pre-recorded audio signal for help. When the user presses the push to talk button 2302, the noise cancellation device 100 transmits the user's voice to the communication device 106 through the wireless coupling device 1801 exemplarily illustrated in FIG. 18. A power button 2303 is positioned on a surface 100*b* of the noise cancellation device 100. The power button 2303 allows the user to switch on and switch off the noise cancellation device 100. The LED indicator 2305 indicates whether the power is on or off, whether the noise cancellation device 100 is coupled to the wireless coupling device 1801, and also functions as a low power indicator. The front loudspeaker 1806 and the rear loudspeaker 1808 are positioned on opposing sides 100*c* and 100*d* of the noise cancellation device 100 respectively as exemplarily illustrated in FIGS. 23A-23B. The rear loudspeaker 1808 plays the audio signal from the communication device 106 when the push to talk button 2302 is not pressed. The regular or second microphone 1803 is positioned on one opposing side, for example, 100*d* of the noise cancellation device 100 as exemplarily illustrated in FIG. 23B. In an embodiment, when the noise cancellation device 100 is used as a lapel microphone as exemplarily illustrated in FIG. 23B, an external microphone is used instead of the contact microphone 201 exemplarily illustrated in FIG. 2.

FIG. 23C exemplarily illustrates a rear perspective view of the noise cancellation device 100, showing an interface 2304 between a face mask 101 and the contact microphone 201 exemplarily illustrated in FIG. 6. The light emitting diode (LED) indicator 2305 and a clip 2306 to attach the noise cancellation device 100 to the protective face mask 101 exemplarily illustrated in FIGS. 21A-21C, or in an embodiment to the lapel 2201 exemplarily illustrated in FIGS. 22A-22B, are also exemplarily illustrated in FIG. 23C. When the user wears a wearable unit, for example, a self contained breathing apparatus, the noise cancellation device 100 attaches to the voicemitter 2312 of the face mask 101 of the self contained breathing apparatus exemplarily illustrated in FIG. 23I, using the clip 2306. FIG. 23D exemplarily illustrates a bottom perspective view of the noise cancellation device 100, showing pairing buttons 2307 of the first communication module 1809 exemplarily illustrated in FIG. 18, used to operably couple or pair the noise cancellation device 100 with the wireless coupling device 1801. The pairing buttons 2307 are positioned on a bottom surface 100*e* of the noise cancellation device 100 as exemplarily illustrated in FIG. 23D. In order to pair the noise cancellation device 100 with the wireless coupling device 1801, the wireless coupling device 1801 slides into a bottom track of the noise cancellation device 100. This pairing mechanism enables easy and correct blind pairing.

FIGS. 23E-22F exemplarily illustrate side perspective views of an embodiment of the noise cancellation device 100. The push to talk (PTT) button 2302, a voice operated switch (VOX) light emitting diode (LED) indicator 2308, a VOX button 2309, a power and/or pairing LED indicator 2305, and the power button 2303 are positioned on an upper surface 100*a* of the noise cancellation device 100 as exemplarily illustrated in FIG. 23E. When the VOX button 2309 is pressed, the noise cancellation device 100 allows voice activity detection in a manner similar to the push to talk function. The VOX LED indicator 2308 indicates the status of activation of the VOX button 2309. The power and/or pairing LED indicator 2305 indicates whether the power is on or off and whether the noise cancellation device 100 is coupled to the wireless coupling device 1801. The panic button 2301 and the pairing buttons 2307 or pins are positioned on a bottom surface 100*e* of the noise cancellation device 100 as exemplarily illustrated in FIG. 23F. The panic button 2301 can trigger an alert signal and send a pre-recorded help signal or message through the communication device 106, exemplarily illustrated in FIG. 18, to another device, for example, a remote command center, indicating that the user is, for example, disabled, trapped, or in need of immediate help. The pre-recorded help signal or message can identity which user is asking for help.

Figure 23G:
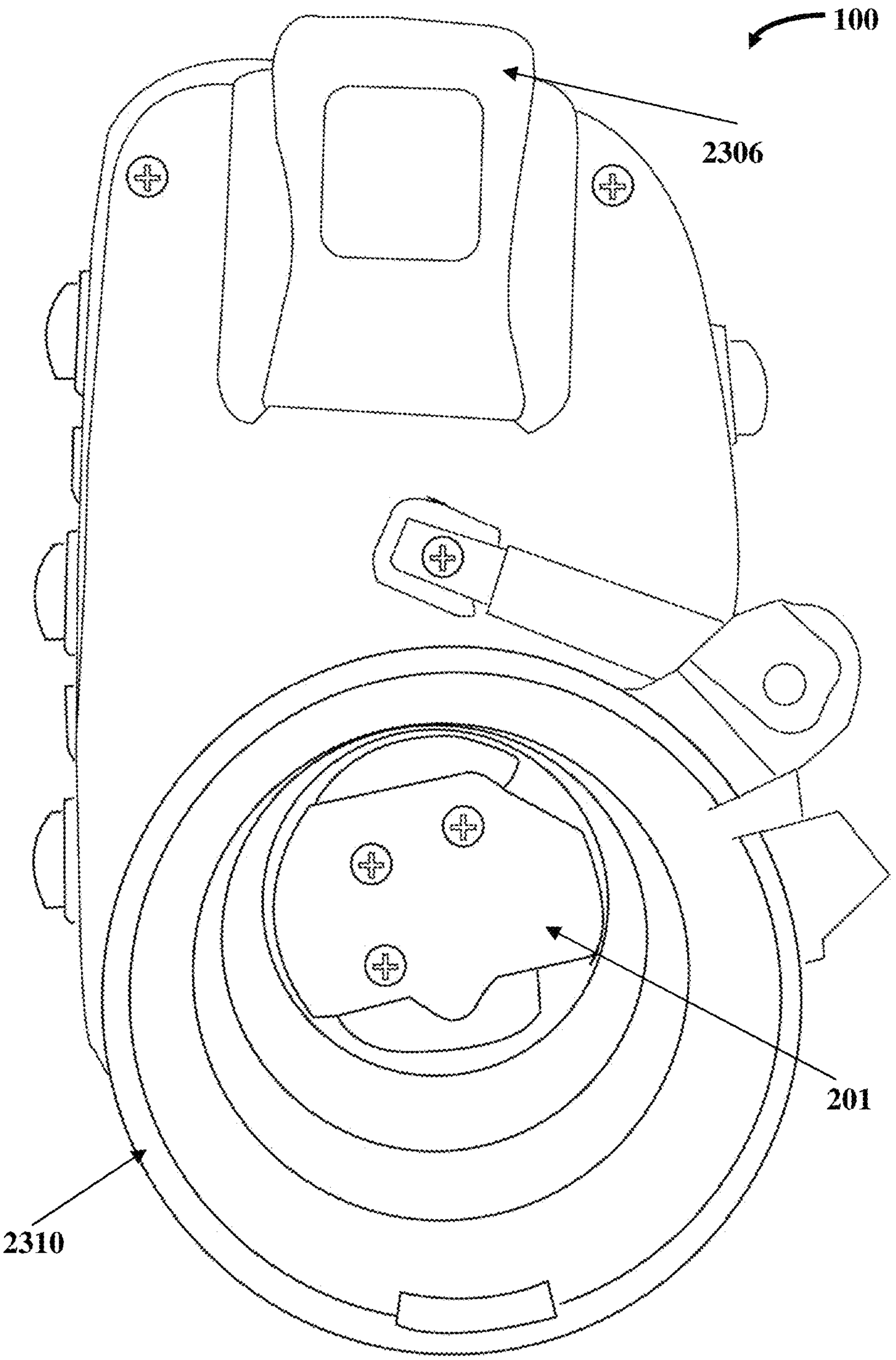
FIG. 23G exemplarily illustrates a front elevation view of the noise cancellation device.
Figure 23H:
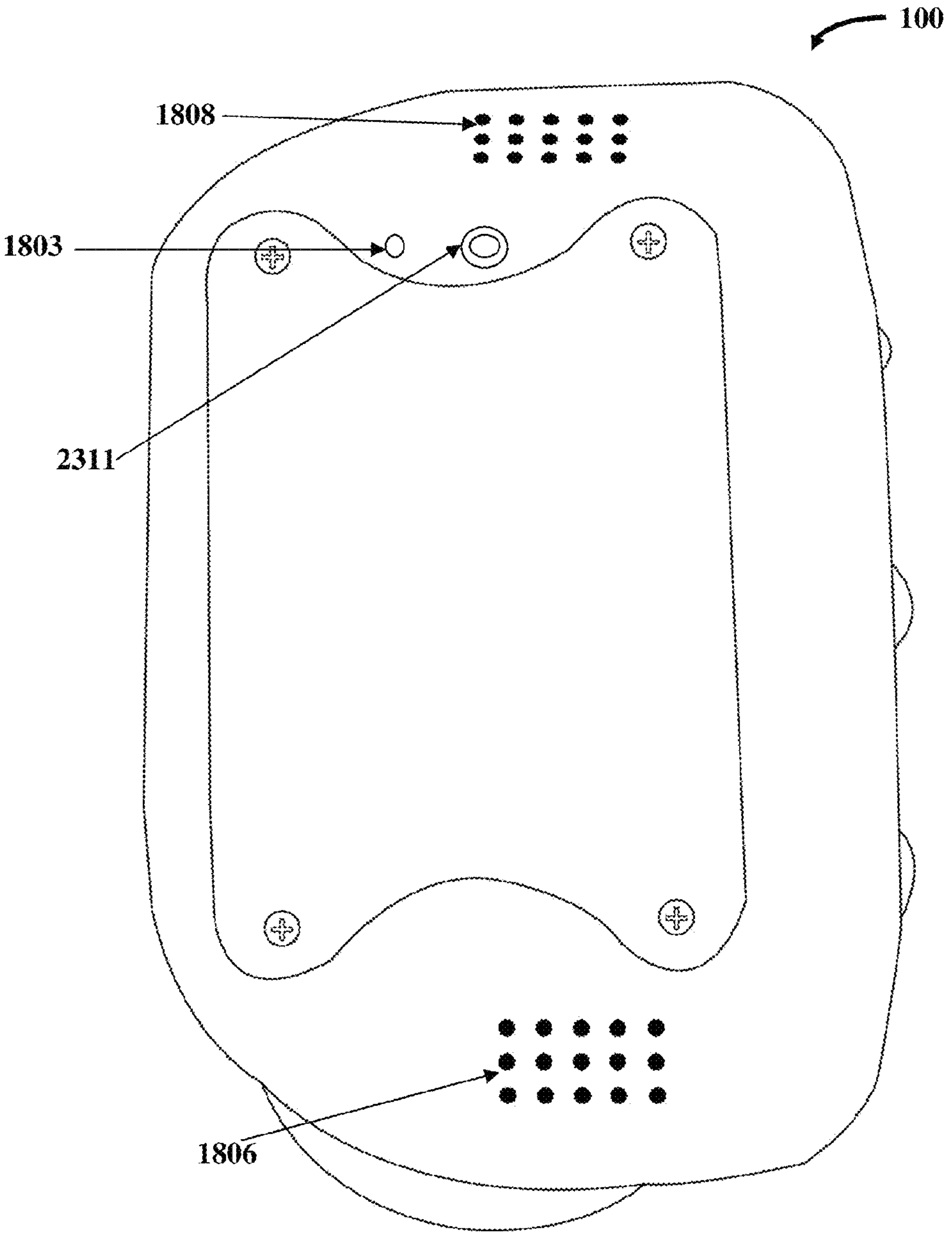
FIG. 23H exemplarily illustrates a rear elevation view of the noise cancellation device.

FIGS. 23G-23H exemplarily illustrate elevation views of the noise cancellation device 100. FIG. 23G exemplarily illustrates a front elevation view of the noise cancellation device 100. The clip 2306, the contact microphone 201, and a face piece adaptor 2310 are exemplarily illustrated in FIG. 23G. FIG. 23H exemplarily illustrates a rear elevation view of the noise cancellation device 100. The front loudspeaker 1806, the rear loudspeaker 1808, the second microphone 1803, and a lapel light emitting diode (LED) indicator 2311 are exemplarily illustrated in FIG. 23H. The face piece adaptor 2310 provides a universal solution for different makes and models of face masks 101. The noise cancellation device 100 can be attached to other face mask models using the face piece adaptor 2310. In an embodiment, the lapel LED indicator 2311 may function, for example, as a low power indicator.

Figure 23I:
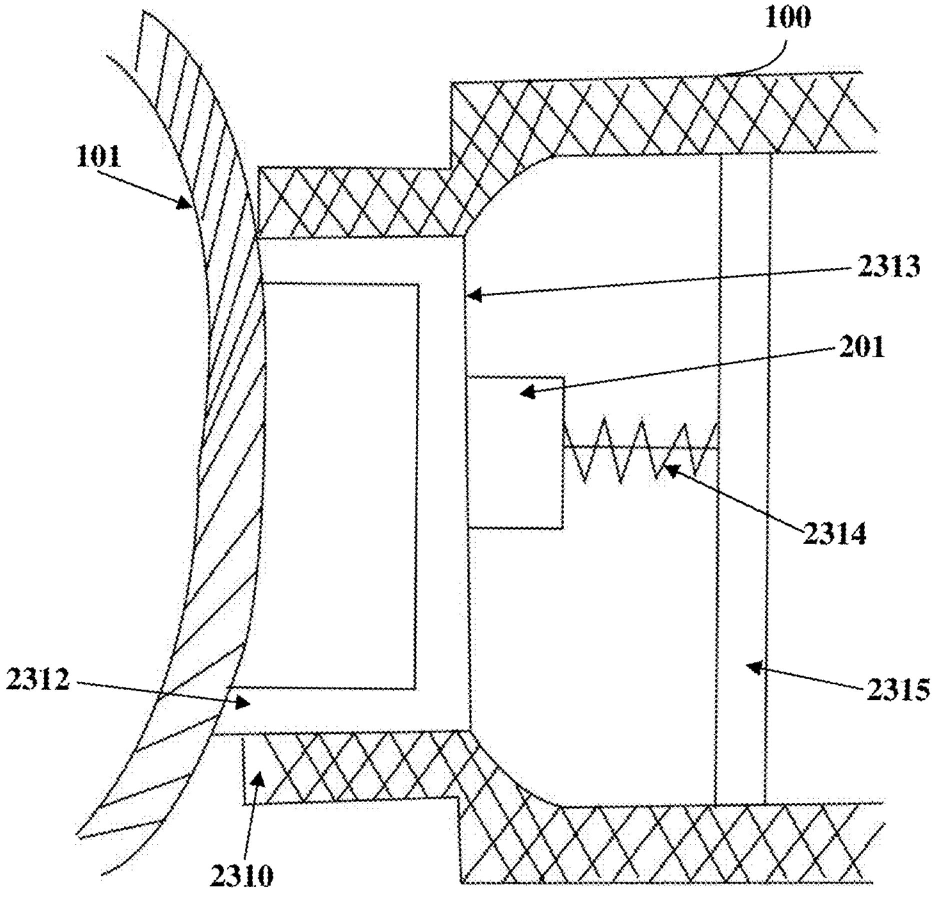
FIG. 23I exemplarily illustrates a cutaway sectional view of an embodiment of the noise cancellation device, showing a contact microphone attached to a voicemitter of a face mask.

FIG. 23I exemplarily illustrates a cutaway sectional view of an embodiment of the noise cancellation device 100, showing a contact microphone 201 attached to a voicemitter 2312 of a face mask 101. The noise cancellation device 100 is attached to the voicemitter 2312 of the face mask 101 via the face piece adaptor 2310. The contact microphone 201 is in contact with the voicemitter 2312, for example, through a thin, soft rubber layer 2313 that protects the contact microphone 201. The contact microphone 201 is supported by a spring 2314 attached to the contact microphone 201 and a printed circuit board 2315. The printed circuit board 2315 comprises the microphone amplifiers 203 and 1804, the analog to digital converter 401, the digital signal processor 205, etc., of the noise cancellation device 100 exemplarily illustrated in FIG. 18. The contact microphone 201 receives the voice vibrations from the voicemitter 2312.

Figure 24A:
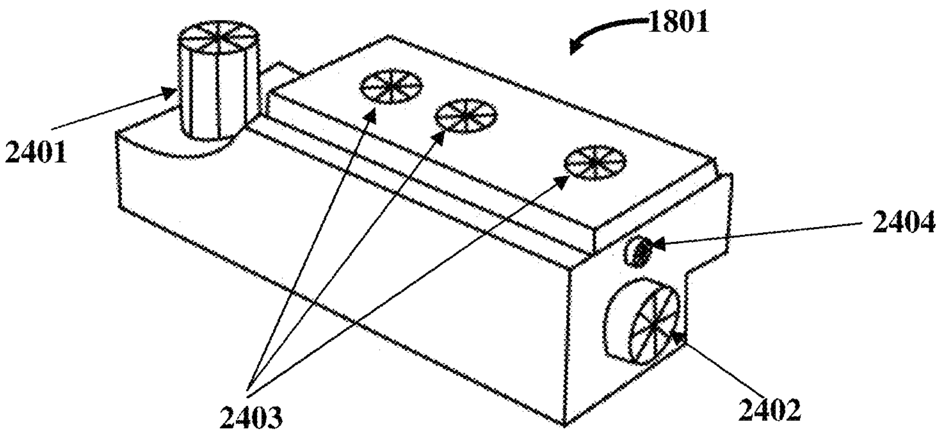
FIGS. 24A-24B exemplarily illustrate perspective views of the wireless coupling device of the wearable communication system.
Figure 24B:
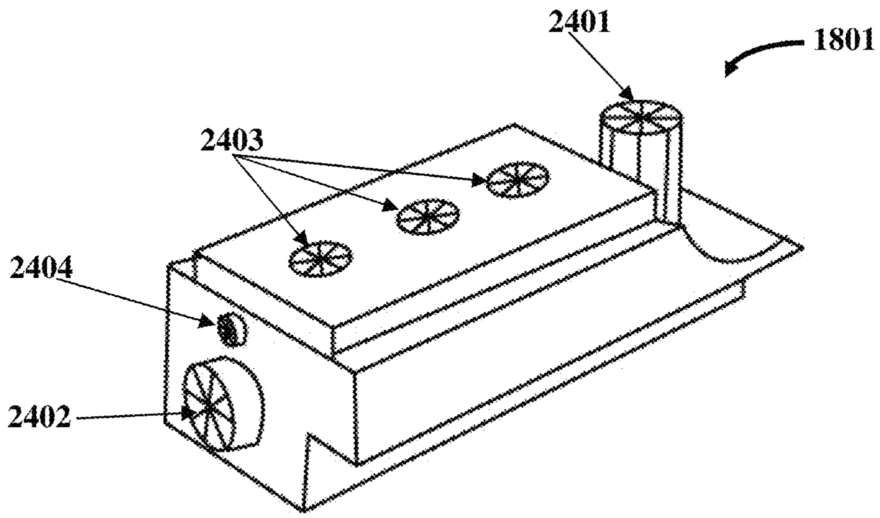

FIGS. 24A-24B exemplarily illustrate perspective views of the wireless coupling device 1801 of the wearable communication system 1800 exemplarily illustrated in FIG. 18. The wireless coupling device 1801 can remain attached to the communication device 106 exemplarily illustrated in FIG. 18, for storage, maintenance, and operation. The wireless coupling device 1801 is compatible with existing communication devices, for example, radios without the need for upgrading or changing commercial off-the-shelf (COTS) radios. A variety of radio connectors 2401 enable the wireless coupling device 1801 to work with different types of communication devices 106. A release button 2402 is operably connected on the wireless coupling device 1801 as exemplarily illustrated in FIGS. 24A-24B. The release button 2402 releases control of the communication device 106 for allowing the communication device 106 to operate as a standalone device, even when the wireless coupling device 1801 is attached to the communication device 106. The release button 2402, when pressed, releases the audio and control functions back to the communication device 106 allowing the communication device 106 to function as a normal communication device 106, when the wireless coupling device 1801 is attached to the communication device 106. For example, if the communication device 106 is a radio, the release button 2402, when pressed, releases audio and control functions back to the radio for allowing a user to operate the radio in a normal manner. The pairing buttons 2403 pair the noise cancellation device 100 and the wireless coupling device 1801. The pairing buttons 2403 are configured to support blind pairing. The wireless coupling device 1801 further comprises a light emitting diode (LED) indicator 2404 for indicating, for example, whether the noise cancellation device 100 is coupled to the wireless coupling device 1801 and the status of other operations performed in the wireless coupling device 1801.

Figure 24C:
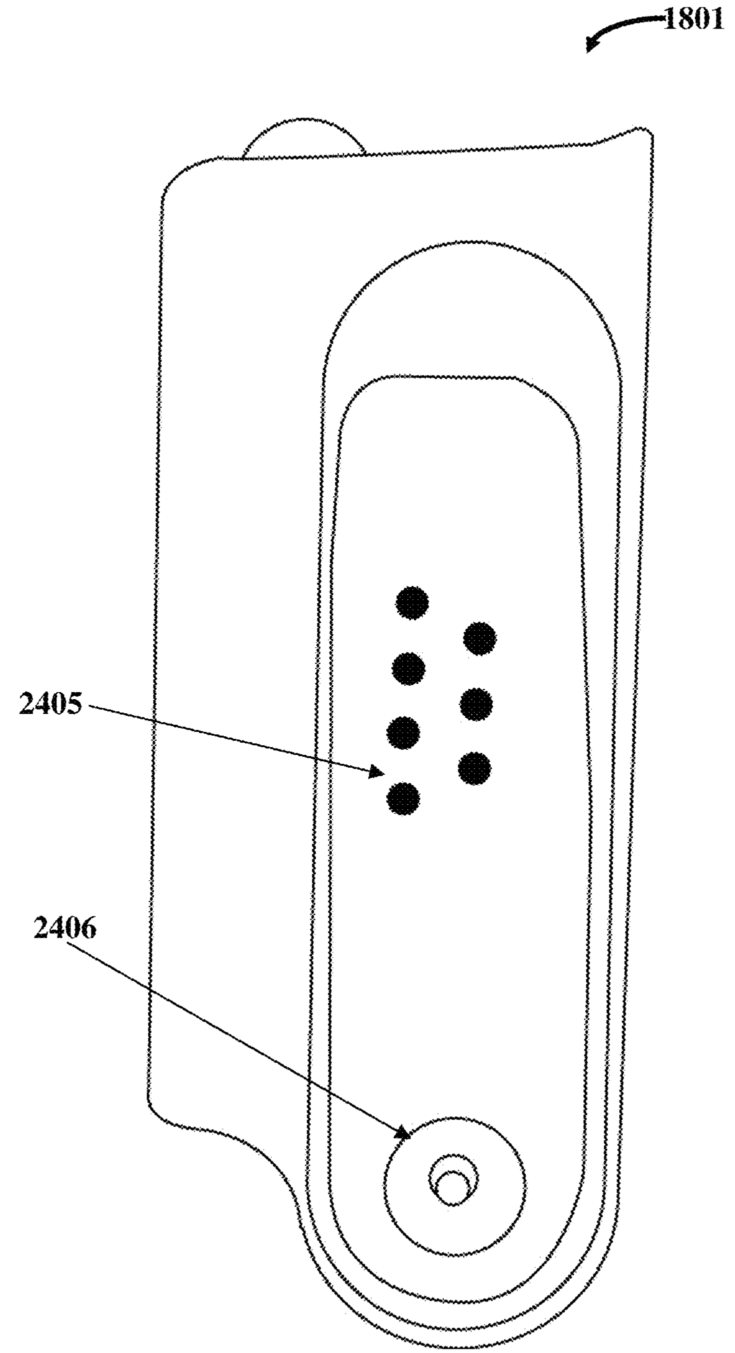
FIGS. 24C-24D exemplarily illustrate side views of the wireless coupling device.
Figure 24D:
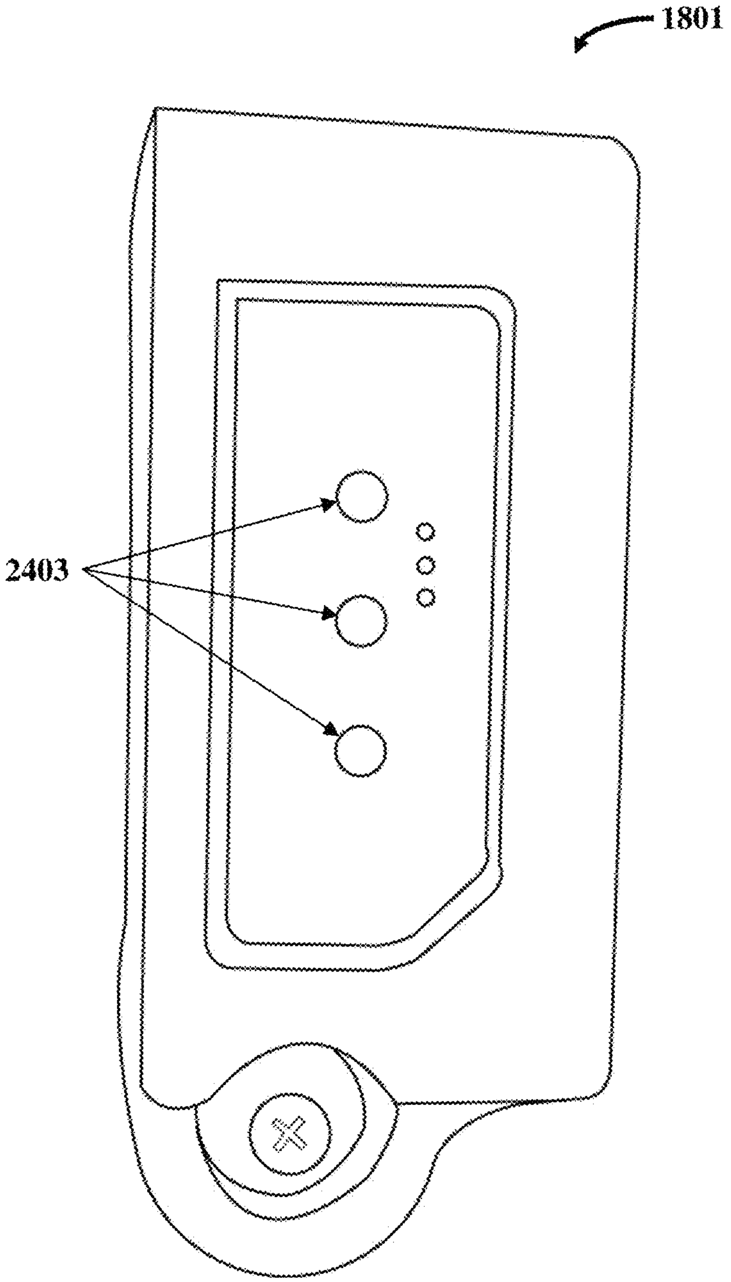

FIGS. 24C-24D exemplarily illustrate side views of the wireless coupling device 1801. FIG. 24C exemplarily illustrates a left side elevation view of the wireless coupling device 1801. Attachment pins 2405 and a screw 2406 for attaching the wireless coupling device 1801 to the communication device 106 are exemplarily illustrated in FIG. 24C. FIG. 24D exemplarily illustrates a right side view of the wireless coupling device 1801. The secure pairing circles or buttons 2403 that pair the noise cancellation device 100 exemplarily illustrated in FIG. 18, and the wireless coupling device 1801 are exemplarily illustrated in FIG. 24D.

Figure 24E:
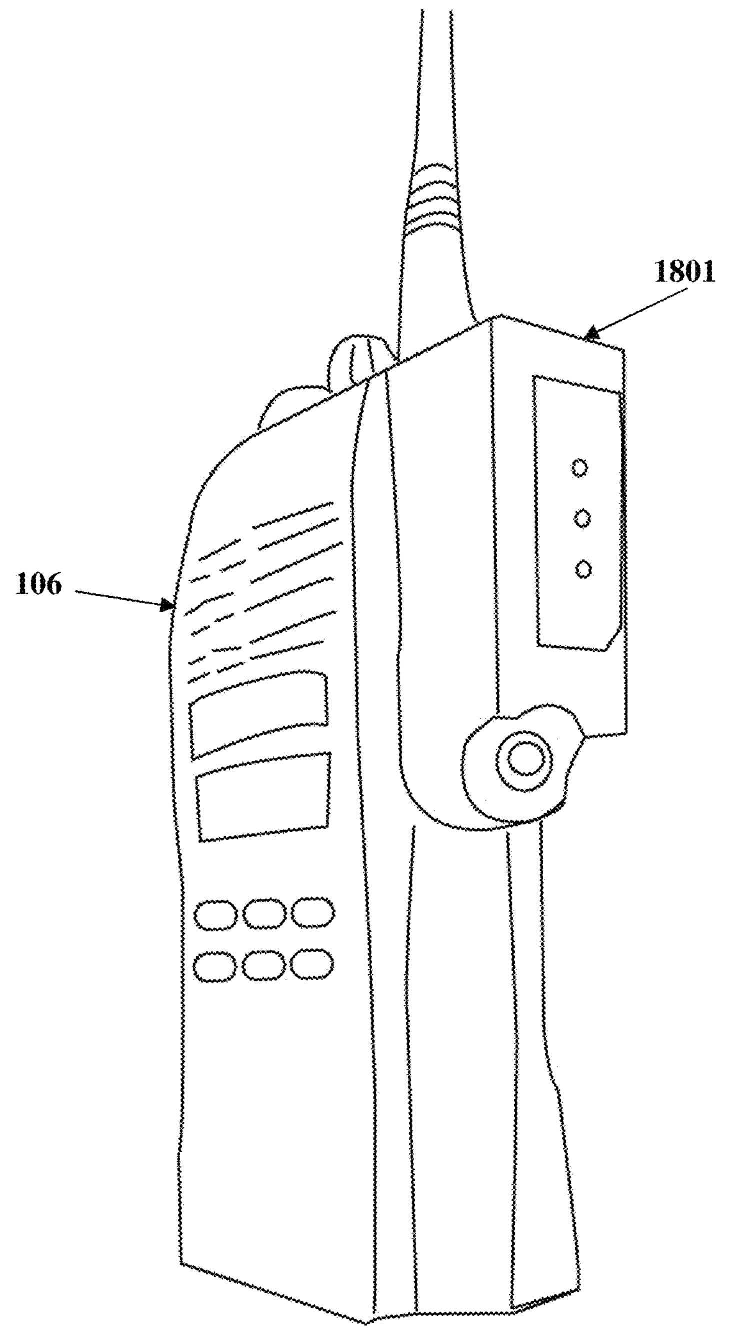
FIGS. 24E-24F exemplarily illustrate perspective views of the wireless coupling device attached to a communication device.
Figure 24F:
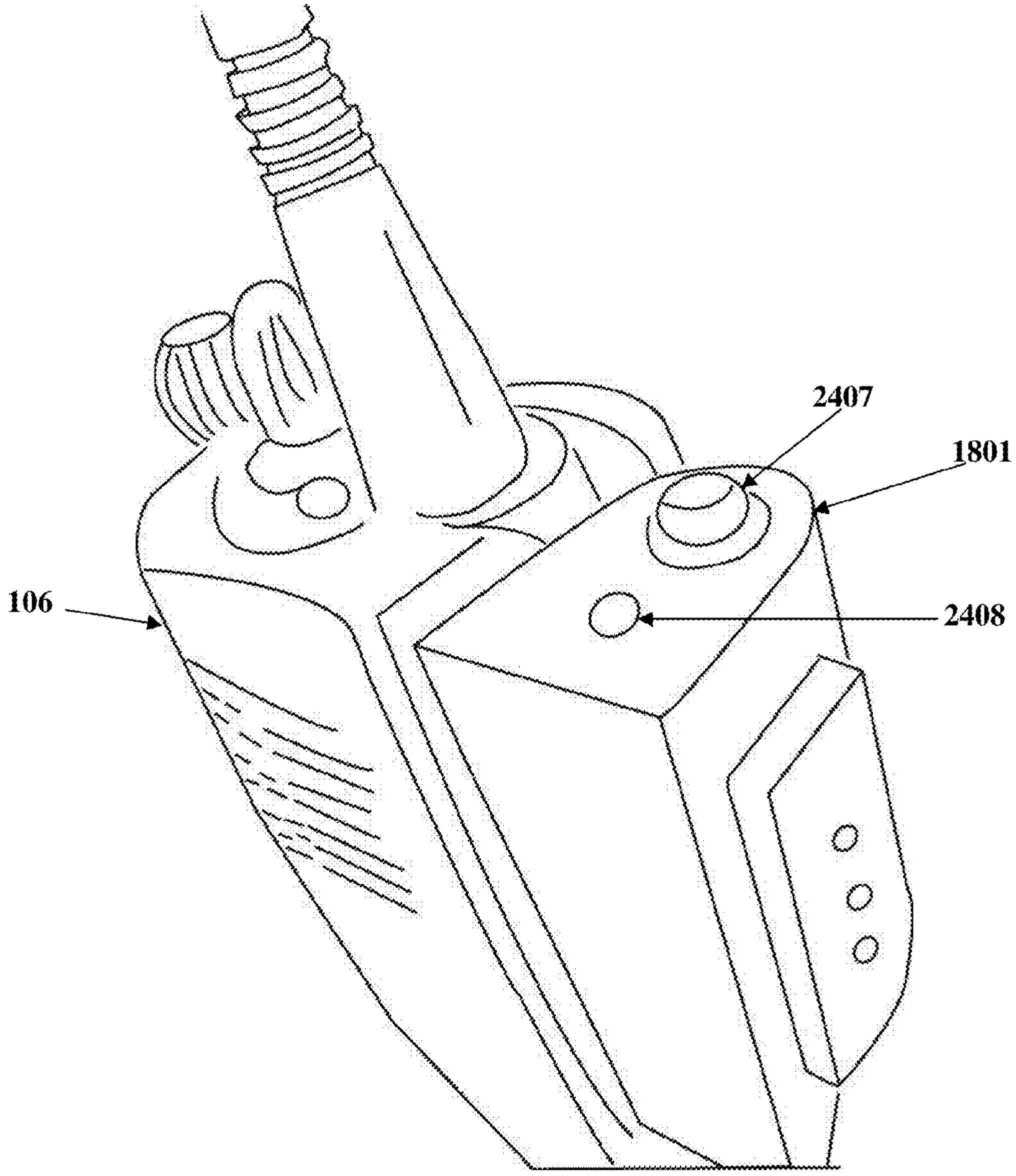

FIGS. 24E-24F exemplarily illustrate perspective views of the wireless coupling device 1801 attached to a communication device 106, for example, a radio. FIG. 24E exemplarily illustrates the wireless coupling device 1801 securely attached to the communication device 106, for example, a Motorola® HT 1250 radio of Motorola, Inc. A power button 2407 and a power/pairing light emitting diode (LED) indicator 2408 of the wireless coupling device 1801 are exemplarily illustrated in FIG. 24F. The power button 2407 allows the user to switch on and switch off the wireless coupling device 1801. The power/pairing LED indicator 2408 indicates whether the power is on or off and whether the wireless coupling device 1801 is coupled to the noise cancellation device 100 exemplarily illustrated in FIG. 18.

Figure 25:
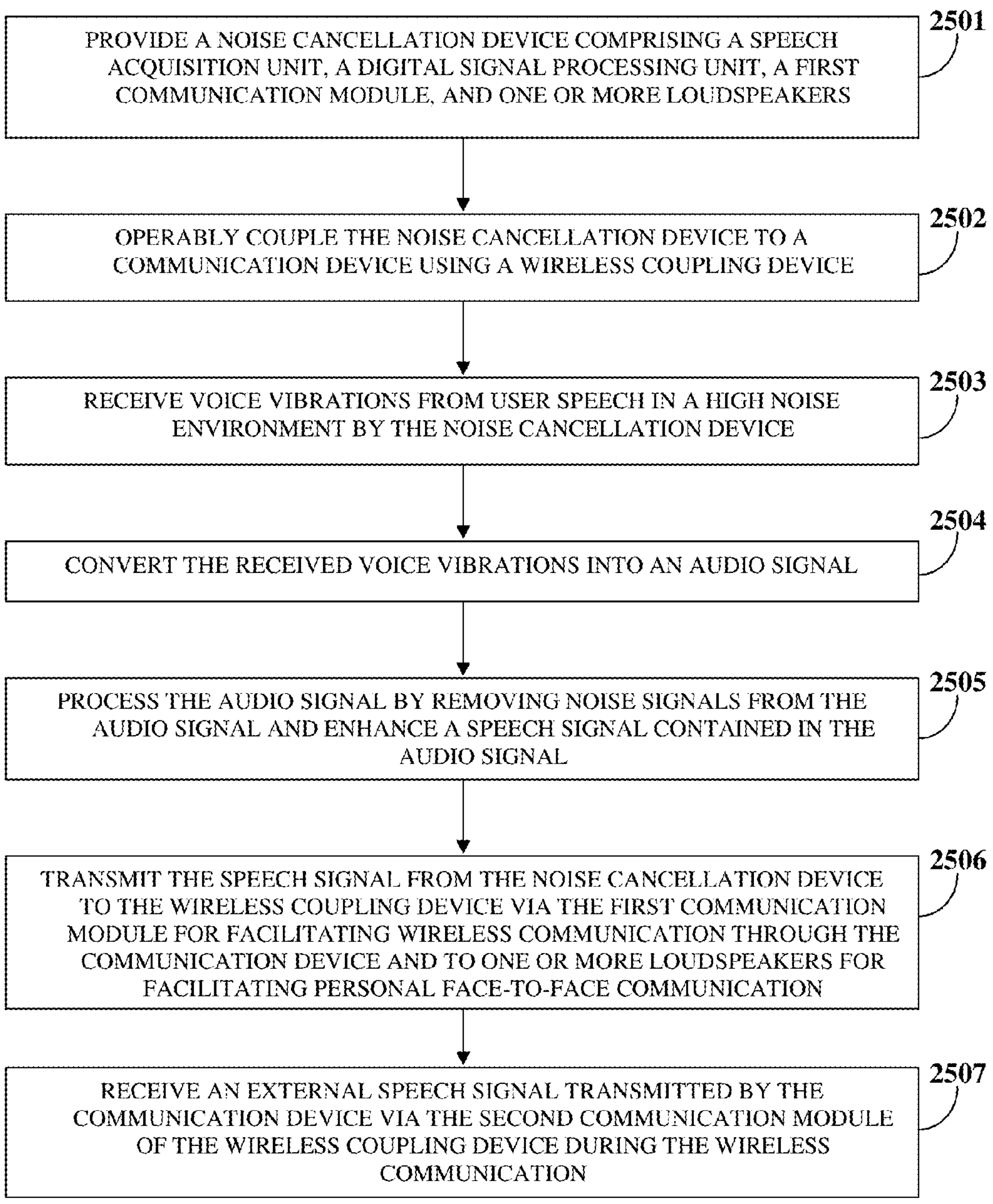
FIG. 25 illustrates a method for personal face-to-face communication and wireless communication in a high noise environment.

FIG. 25 illustrates a method for personal face-to-face communication and wireless communication in a high noise environment. The method disclosed herein provides 2501 the noise cancellation device 100 comprising the speech acquisition unit 102 exemplarily illustrated in FIG. 1, with a first microphone 1802, that is, a contact microphone 201 exemplarily illustrated in FIG. 2, and a second microphone 1803, the digital signal processing unit 200 in operative communication with the speech acquisition unit 102, the first communication module 1809, one or more loudspeakers, for example, the front loudspeaker 1806 and the rear loudspeaker 1808 as exemplarily illustrated and disclosed in the detailed description of FIG. 18. In the method disclosed herein, the noise cancellation device 100 is operably coupled 2502 to the communication device 106 using the wireless coupling device 1801. The noise cancellation device 100 receives 2503 voice vibrations from user speech in the high noise environment, where the voice vibrations from user speech are received by the first microphone 1802 via the wearable unit, and the voice vibrations from user speech in air are received by the second microphone 1803.

The noise cancellation device 100 converts 2504 the received voice vibrations into an audio signal. The digital signal processing unit 200 of the noise cancellation device 100 processes 2505 the audio signal by removing noise signals from the audio signal, and enhancing a speech signal contained in the audio signal. The noise cancellation device 100 then transmits 2506 the speech signal from the noise cancellation device 100 to the wireless coupling device 1801 via the first communication module 1809 of the noise cancellation device 100 for facilitating wireless communication through the communication device 106 in the high noise environment and, for example, to the front loudspeaker 1806 for facilitating personal face-to-face communication in the high noise environment. The front loudspeaker 1806, in operative communication with the digital signal processing unit 200, emits the speech signal during personal face-to-face communication. The noise cancellation device 100 receives 2507 the external speech signal transmitted by the communication device 106 via the second communication module 1801*b* of the wireless coupling device 1801 during the wireless communication. The rear loudspeaker 1808 emits the external speech signal transmitted by the communication device 106 during the wireless communication.

In the method disclosed herein, the second communication module 1801*b* of the wireless coupling device 1801 is securely paired with the first communication module 1809 of the noise cancellation device 100 for preventing external wireless signals from interfering with communication of the speech signal and the external speech signal between the wireless coupling device 1801 and the noise cancellation device 100. In an embodiment, the wireless coupling device 1801 releases control of the communication device 106 for allowing the communication device 106 to operate as a standalone device, when the wireless coupling device 1801 is attached to the communication device 106, on activation of the release button 2402 operably connected on the wireless coupling device 1801 exemplarily illustrated in FIGS. 24A-24B. The noise cancellation device 100 also triggers an alert signal and transmits a pre-recorded distress message through the communication device 106 to another device, for example, at a remote command center when the user is in distress, on activation of the panic button 2301 operably connected on the noise cancellation device 100 exemplarily illustrated in FIGS. 23A-23B.

Figure 26:
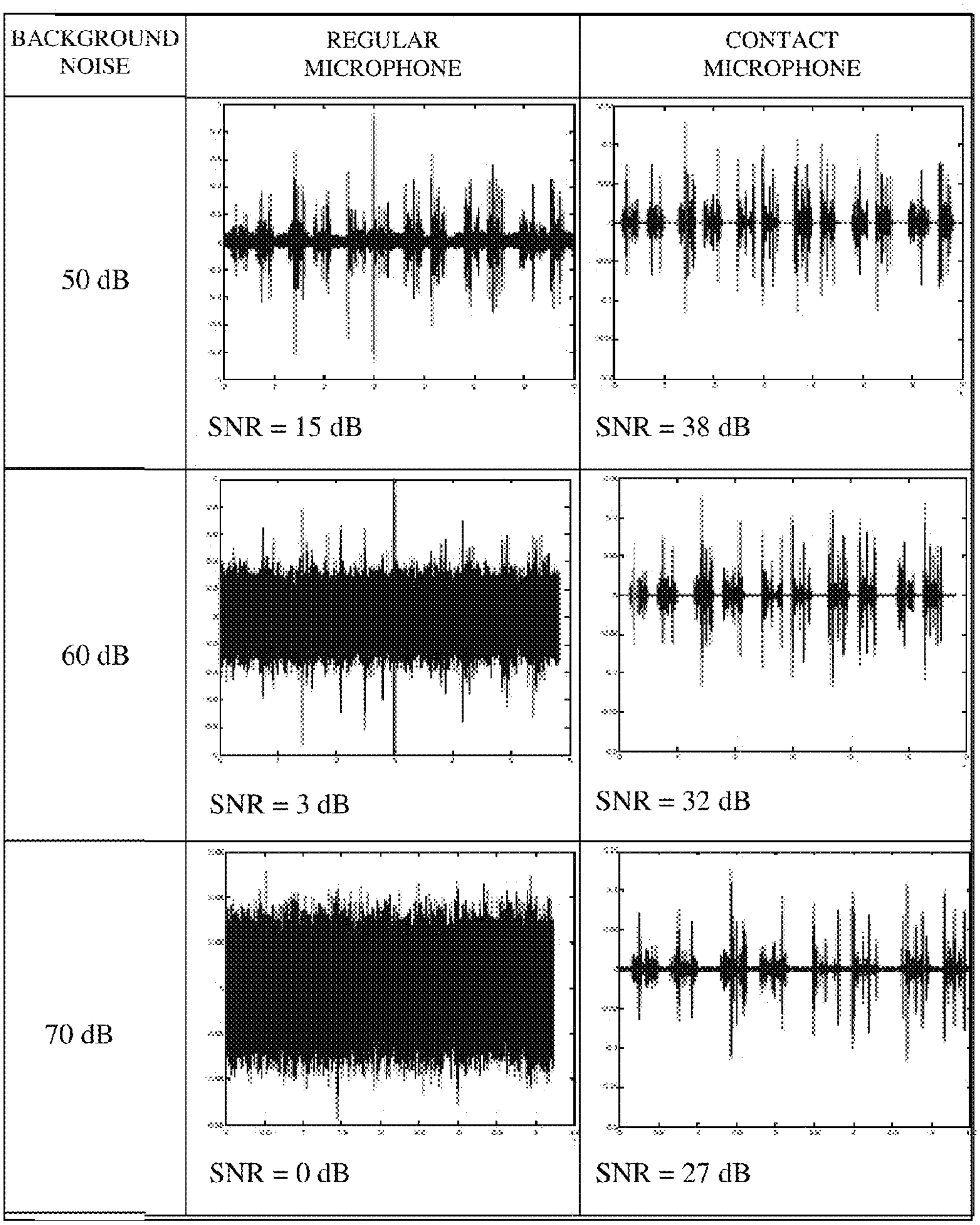
FIG. 26 exemplarily illustrates a table showing a comparison of signal-to-noise ratios of a regular microphone and a contact microphone for different background noise levels.

FIG. 26 exemplarily illustrates a table showing a comparison of signal-to-noise ratios of a regular or second microphone 1803, exemplarily illustrated in FIG. 18, and a contact microphone 201, exemplarily illustrated in FIG. 2, for different background noise levels. In order to verify the properties of the contact microphone 201 and the second microphone 1803, multiple bench mark tests are performed on the contact microphone 201 and the second microphone 1803. During the bench mark tests, a background noise is played, for example, from about 50 decibels (dB) to about 70 dB and the contact microphone 201 and the second microphone 1803 record this background noise simultaneously. The experimental results are exemplarily illustrated in FIG. 26. From the experimental results, it is inferred that the contact microphone 201 provides a higher signal-to-noise ratio than the second microphone 1803.

Figure 27A:
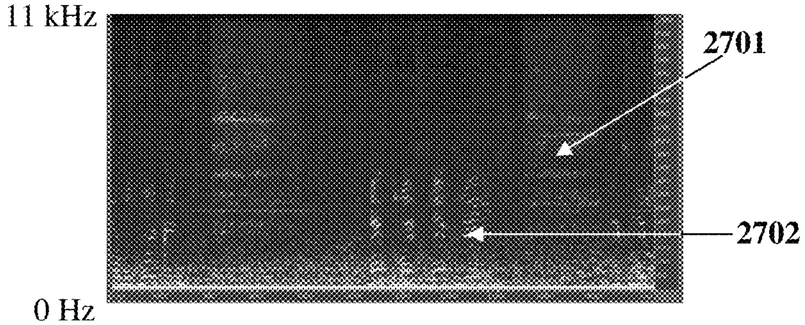
FIGS. 27A-27C exemplarily illustrate graphical representations of a noise spectrum generated by a wearable unit.
Figure 27B:
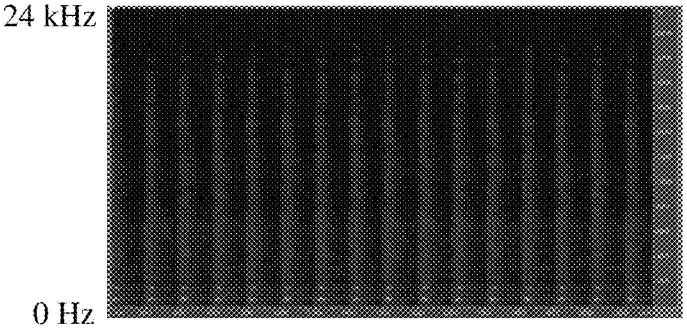
Figure 27C:
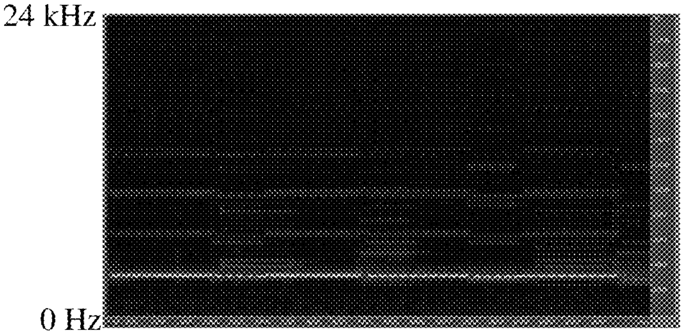

FIGS. 27A-27C exemplarily illustrate graphical representations of a noise spectrum generated by a wearable unit, for example, a self contained breathing apparatus. FIG. 27A exemplarily illustrates a noise spectrum 2701 generated by air regulator inhalation noise. The air regulator inhalation noise is broadband and is similar to white noise. FIG. 27B exemplarily illustrates a noise spectrum generated by a low pressure alarm. The low pressure alarm is similar to a knocking sound with a repetition rate of, for example, about 25 Hz. FIG. 27C exemplarily illustrates a noise spectrum generated by a personal alert safety system (PASS) device alarm. The PASS device alarm is similar to a chirping sound with time varying, rich harmonic content. The model based noise reduction unit 1000 exemplarily illustrated in FIG. 10, suppresses the noise signals generated by the self contained breathing apparatus. A short time Fourier transform applied to noise samples shows dramatically different patterns from speech 2702 as exemplarily illustrated in FIGS. 27A-27C. For noises with a known spectral pattern, the model based noise reduction unit 1000 constructs spectra models to detect these noises. Once detected, the noise signals are cancelled, for example, using the model based noise reduction algorithm disclosed in the detailed description of FIG. 10.

Figure 28A:
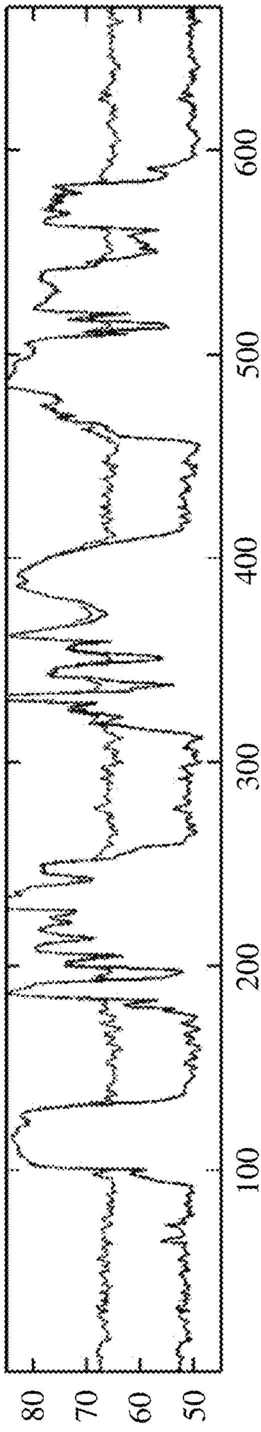
FIG. 28A exemplarily illustrates a graphical representation showing energy contours for two utterances with a 5 dB signal-to-noise ratio and a 20 dB signal-to-noise ratio.

FIG. 28A exemplarily illustrates a graphical representation showing energy contours for two utterances with a 5 dB signal-to-noise ratio and a 20 dB signal-to-noise ratio. To test the robustness of the change point detection algorithm against noise, two utterances with different signal-to-noise ratios (SNR) are used. The 5 dB utterance is generated by artificially adding a car noise to the 20 dB utterance.

Figure 28B:
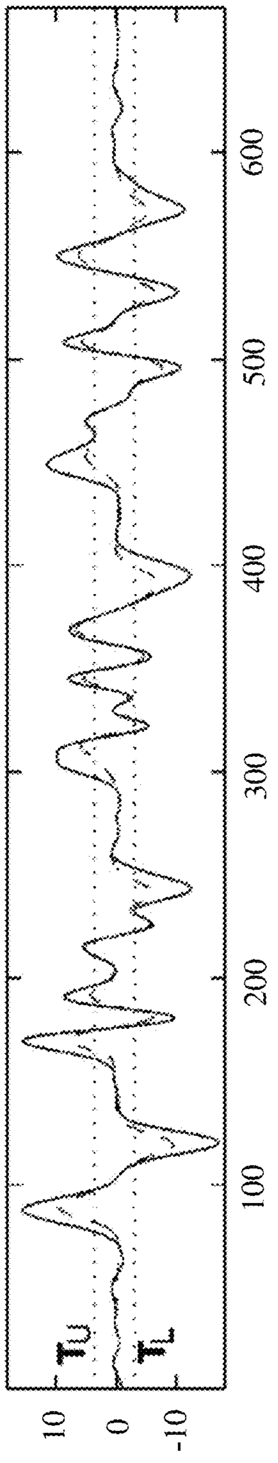
FIG. 28B exemplarily illustrates a graphical representation showing filter outputs for two utterances with a 5 dB signal-to-noise ratio and a 20 dB signal-to-noise ratio.

FIG. 28B exemplarily illustrates a graphical representation showing filter outputs for two utterances with a 5 dB signal-to-noise ratio and a 20 dB signal-to-noise ratio. The filter outputs for 20 dB signal-to-noise ratio are represented using a solid line and for 5 dB signal-to-noise ratio are represented using a dashed line. The filter outputs for the 20 dB signal-to-noise ratio and the 5 dB signal-to-noise ratio are almost invariant, although their background energy levels have a difference of 15 dB, which ensures the robustness in speech detection.

Figure 28C:
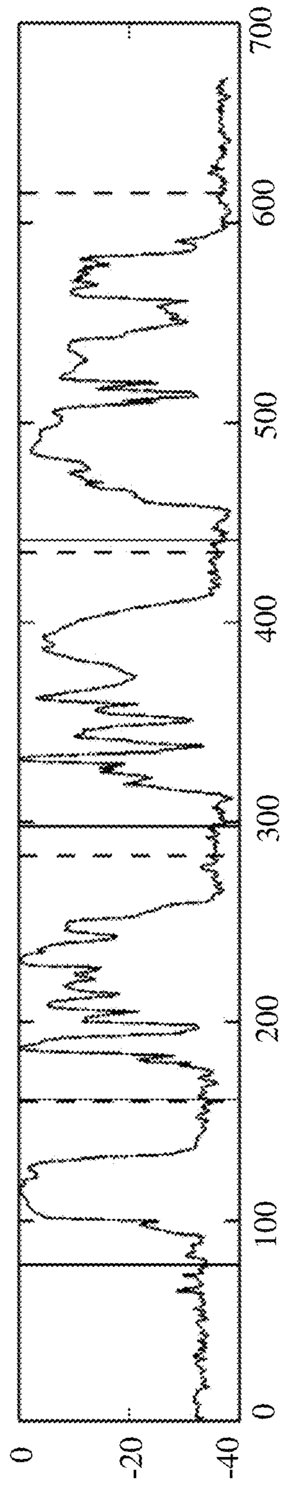
FIG. 28C exemplarily illustrates a graphical representation showing detected endpoints and normalized energy for an utterance with a 20 dB signal-to-noise ratio.
Figure 28D:
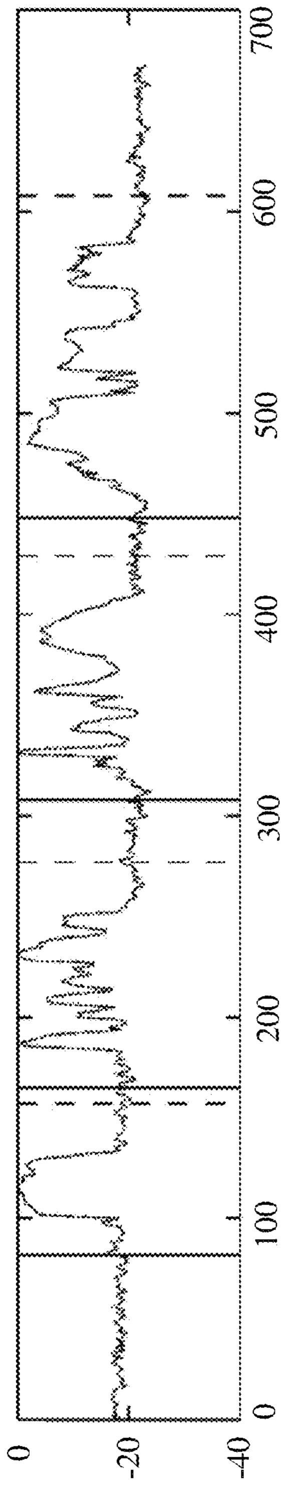
FIG. 28D exemplarily illustrates a graphical representation showing detected endpoints and normalized energy for an utterance with a 5 dB signal-to-noise ratio.

FIGS. 28C-28D exemplarily illustrate graphical representations showing detected endpoints and normalized energy for utterances with different signal-to-noise ratios. FIG. 28C exemplarily illustrates a graphical representation showing detected endpoints and normalized energy for an utterance with a 20 dB signal-to-noise ratio. FIG. 28D exemplarily illustrates a graphical representation showing detected endpoints and normalized energy for an utterance with a 5 dB signal-to-noise ratio.

Figure 29:
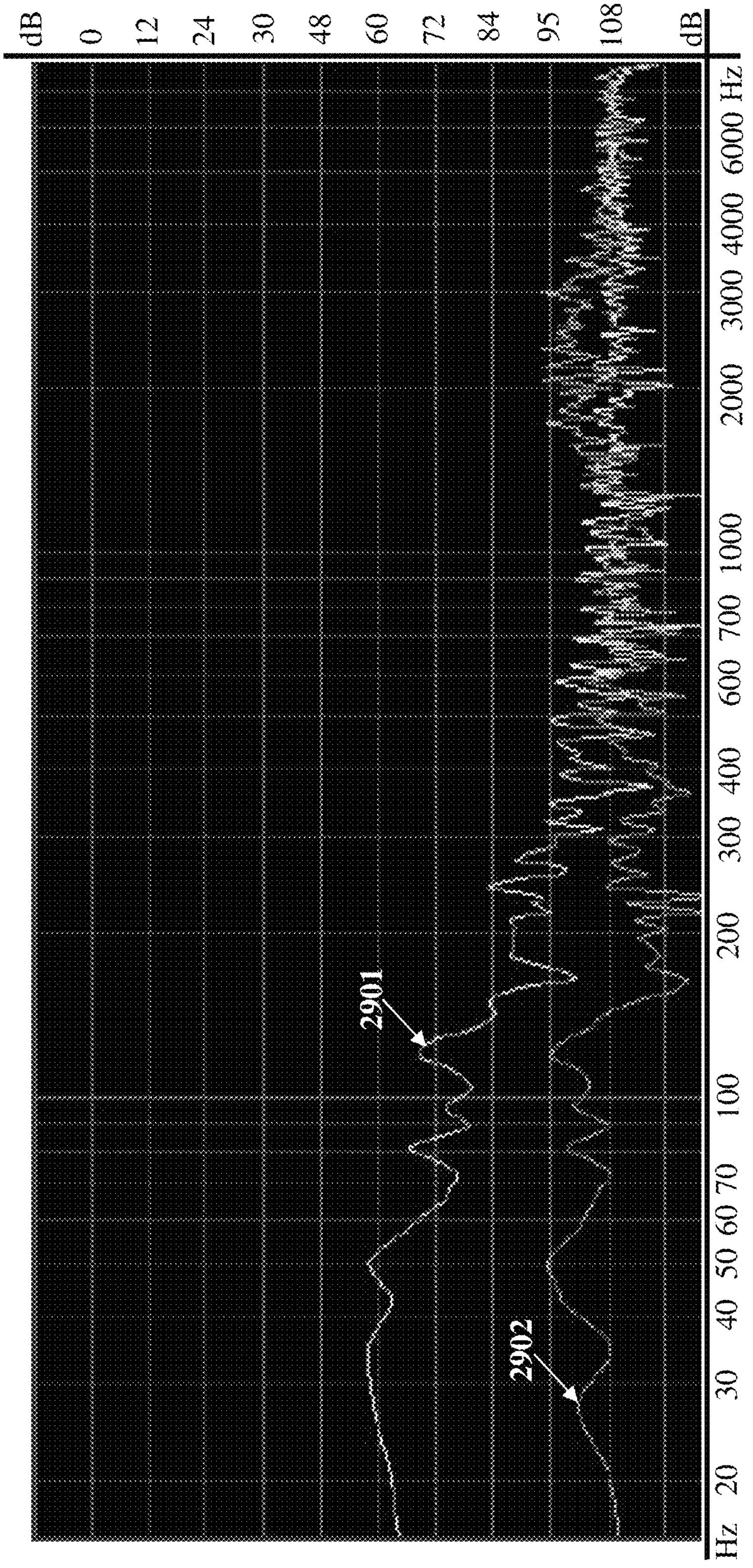
FIG. 29 exemplarily illustrates a graphical representation showing a signal spectrum before spectral equalization and after spectral equalization.

FIG. 29 exemplarily illustrates a graphical representation showing signal spectrum before spectral equalization and after spectral equalization. FIG. 29 exemplarily illustrates the improved results after spectral equalization of the audio signals. The horizontal axis represents the frequency range and the vertical axis represents the energy level. The upper line 2901 represents the audio signals before spectral equalization and the lower line 2902 represents the audio signals after spectral equalization. The audio signals are more evenly distributed after spectral equalization.

In the foregoing description, the present invention can be implemented in a variety of embodiments, namely with one or two different microphones, in analog or digital implementations, with one or more loudspeakers or communication devices, and with one or a combination of noise reduction algorithms. These embodiments will be apparent to any skilled practitioner in the art.

It will be readily apparent that the various methods, algorithms, and computer programs disclosed herein may be implemented on computer readable media appropriately programmed for computing devices. As used herein, the phrase "computer readable media" refers to non-transitory computer readable media that participate in providing data, for example, instructions that may be read by a computer, a processor or a similar device. Non-transitory computer readable media comprise all computer readable media, for example, non-volatile media, volatile media, and transmission media, except for a transitory, propagating signal. Non-volatile media comprise, for example, other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to a processor, etc. Common forms of computer readable media comprise, for example, a flash memory card, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

The computer programs that implement the methods and algorithms disclosed herein may be stored and transmitted using a variety of media, for example, the computer readable media in a number of manners. In an embodiment, hard-wired circuitry or custom hardware may be used in place of, or in combination with, software instructions for implementation of the processes of various embodiments. Therefore, the embodiments are not limited to any specific combination of hardware and software. In general, the computer program codes comprising computer executable instructions may be implemented in any programming language. The computer program codes or software programs may be stored on or in one or more mediums as object code. Various aspects of the method and system disclosed herein may be implemented as programmed elements, or non-programmed elements, or any suitable combination thereof. The computer program product disclosed herein comprises one or more computer program codes for implementing the processes of various embodiments.

Where databases are described such as the noise sound database 1005, it will be understood by one of ordinary skill in the art that (i) alternative database structures to those described may be readily employed, and (ii) other memory structures besides databases may be readily employed. Any illustrations or descriptions of any sample databases disclosed herein are illustrative arrangements for stored representations of information. Any number of other arrangements may be employed besides those suggested by tables illustrated in the drawings or elsewhere. Similarly, any illustrated entries of the databases represent exemplary information only; one of ordinary skill in the art will understand that the number and content of the entries can be different from those disclosed herein. Further, despite any depiction of the databases as tables, other formats including relational databases, object-based models, and/or distributed databases may be used to store and manipulate the data types disclosed herein. Likewise, object methods or behaviors of a database can be used to implement various processes such as those disclosed herein. In addition, the databases may, in a known manner, be stored locally or remotely from a device that accesses data in such a database. In embodiments where there are multiple databases in the system, the databases may be integrated to communicate with each other for enabling simultaneous updates of data linked across the databases, when there are any updates to the data in one of the databases.

The present invention can be configured to work in a network environment comprising one or more computers that are in communication with one or more devices via a network. The computers may communicate with the devices directly or indirectly, via a wired medium or a wireless medium or via any appropriate communications mediums or combination of communications mediums. Each of the devices comprises processors that are adapted to communicate with the computers. In an embodiment, each of the computers is equipped with a network communication device, for example, a network interface card, a modem, or other network connection device suitable for connecting to a network. Each of the computers and the devices executes an operating system. While the operating system may differ depending on the type of computer, the operating system will continue to provide the appropriate communications protocols to establish communication links with the network. Any number and type of machines may be in communication with the computers. The present invention is not limited to a particular computer system platform, processor, operating system, or network.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

We claim:

1. A noise cancellation device for personal face-to-face communication through air and wireless communication in a high noise environment, comprising:

a speech acquisition unit comprising a contact microphone positioned on a rigid surface of a wearable unit, said contact microphone configured to receive reverberations generated on said rigid surface of said wearable unit by voice vibrations from user speech within said wearable unit, and to convert said reverberations into an audio signal;

an audio signal processing unit, in operative communication with said speech acquisition unit, configured to process said audio signal, remove noise signals from said audio signal, and enhance a speech signal contained in said audio signal;

a communication interface configured to connect said noise cancellation device to a communication device, wherein said communication interface, in operative communication with said audio signal processing unit, is configured to transmit said speech signal to said communication device for facilitating said wireless communication in said high noise environment; and one or more loudspeakers, in operative communication with one or more power amplifiers, configured to amplify and emit one or more of said speech signal and an external speech signal received from said communication device via said communication interface for facilitating said personal face-to-face communication through air and said wireless communication in said high noise environment.

2. The noise cancellation device of claim 1, wherein said noise cancellation device is attachable to said wearable unit.

3. The noise cancellation device of claim 1, wherein said reverberations are mechanical vibrations excited by said user speech within said wearable unit, and wherein said contact microphone comprises an integrated piezoelectric transducer configured to transform said reverberations into electric analog signals.

4. The noise cancellation device of claim 1, wherein said audio signal processing unit is configured as a digital signal processing unit comprising:

a pre-amplifier operably coupled to said contact microphone, said pre-amplifier configured to amplify said audio signal received from said contact microphone;

a linear power regulator configured to provide a stable voltage and current supply to said noise cancellation device;

a switch power regulator configured to provide said stable voltage and said current supply to said noise cancellation device;

an energy storage device configured to provide power supply to said noise cancellation device;

a digital signal processor configured to process said audio signal;

an analog to digital converter configured to convert said audio signal from an analog format to a digital format;

a digital to analog converter configured to convert said audio signal from said digital format to said analog format;

a flash memory configured to store computer program codes for said digital signal processor; and one or more power amplifiers, in operative communication with said one or more loudspeakers, configured to amplify said audio signal processed by said digital signal processor.

5. The noise cancellation device of claim 4, wherein said pre-amplifier, said analog to digital converter, said digital to analog converter, and said flash memory are configured to be one of connected to said digital signal processor and integrated in said digital signal processor.

6. The noise cancellation device of claim 4, wherein said digital signal processor comprises:

a filter bank analysis unit configured to decompose a single channel full band audio signal into a plurality of sub band audio signals;

a noise reduction unit configured to suppress said noise signals in said audio signal;

a spectra equalization unit configured to equalize energy of said audio signal in low frequency bands and high frequency bands;

a voice activity detection unit configured to detect locations of said speech signal and a silence signal in said audio signal by one of change point detection and energy differencing; and a filter bank synthesis unit configured to combine said sub band audio signals together into a single channel full band speech signal.

7. The noise cancellation device of claim 6, wherein said noise reduction unit comprises:

a Wiener filter based noise reduction unit configured to suppress said noise signals from said high noise environment and enhance quality of said speech signal;

a model based noise reduction unit configured to suppress said noise signals generated by said wearable unit; and a spectral subtraction noise reduction unit configured to reduce degrading effects of said noise signals acoustically added in said audio signal.

8. The noise cancellation device of claim 7, wherein said model based noise reduction unit is configured to perform model based noise reduction by:

recording and storing a plurality of noise sound samples in a noise sound database;

training a plurality of sound models to represent statistical characteristics of said noise sound samples, wherein said sound models are represented by a Gaussian mixture model and a hidden Markov model;

decoding said audio signal and assigning a score to each of said trained sound models based on a comparison of said decoded audio signal with said each of said trained sound models;

identifying a noise sound model based on said assigned score of said each of said trained sound models; and removing said noise signals from said audio signal based on said identified noise sound model to obtain a clean said speech signal.

9. The noise cancellation device of claim 7, wherein said model based noise reduction unit comprises a noise suppression unit comprising:

a filter bank analysis unit configured to decompose a single channel full band audio signal into a plurality of sub band audio signals;

a plurality of adaptive filters in an adaptive filter matrix configured to remove and suppress said noise signals on a sub band basis; and a filter bank synthesis unit configured to combine said sub band audio signals together into a single channel full band speech signal.

10. The noise cancellation device of claim 6, wherein said voice activity detection unit comprises an optimal filter configured to detect decrease and increase in energy of said audio signal, wherein said optimal filter is further configured to utilize a set of energy thresholds to separate said speech signal into a silence state, an in-speech state, and a leaving speech state, wherein said set of said energy thresholds is configured by a minimum value of a sub band noise power within a finite window to estimate a noise floor.

11. The noise cancellation device of claim 1, wherein said audio signal processing unit is configured as an analog signal processing unit comprising:

a pre-amplifier operably coupled to said contact microphone, said pre-amplifier configured to amplify said audio signal received from said contact microphone;

an analog signal processor configured to process said audio signal, said analog signal processor comprising:

a plurality of first band-pass filters configured to decompose a single channel full band audio signal into a plurality of sub band audio signals;

a plurality of noise reduction filters configured to suppress said noise signals in said audio signal;

a plurality of spectra equalization filters configured to equalize energy of said audio signal in low frequency bands and high frequency bands;

a voice activity detection unit configured to detect locations of said speech signal and a silence signal in said audio signal by one of change point detection and energy differencing; and a plurality of second band-pass filters configured to synthesize said sub band audio signals into a single channel full band speech signal; and one or more power amplifiers configured to amplify said single channel full band speech signal prior to transmitting said single channel full band speech signal to said one or more loudspeakers.

12. The noise cancellation device of claim 11, wherein said noise reduction filters suppress said noise signals and enhance quality of said speech signal by applying at least one of a Wiener filter based noise reduction, a spectral subtraction noise reduction, and a model based noise reduction.

13. The noise cancellation device of claim 11, wherein said voice activity detection unit comprises an optimal filter configured to detect decrease and increase in energy of said audio signal, wherein said optimal filter is further configured to utilize a set of energy thresholds to separate said speech signal into a silence state, an in-speech state, and a leaving speech state, wherein said set of said energy thresholds is configured by a minimum value of a sub band noise power within a finite window to estimate a noise floor.

14. The noise cancellation device of claim 1, further comprising a panic button configured to trigger an alert signal and transmit a pre-recorded distress message stored in said noise cancellation device through said communication device to another device.

15. The noise cancellation device of claim 1, wherein said noise signals removed from said audio signal by said audio signal processing unit comprise background noise, air regulator inhalation noise, low pressure alarm noise, and personal alert safety system noise.

16. A wearable communication system for personal face-to-face communication through air and wireless communication in a high noise environment, comprising:

a noise cancellation device, comprising:

a speech acquisition unit comprising a first microphone positioned on a rigid surface of a wearable unit, wherein said first microphone is a contact microphone configured to receive reverberations generated on said rigid surface of said wearable unit by voice vibrations from user speech within said wearable unit, and to convert said reverberations into an audio signal;

a digital signal processing unit, in operative communication with said speech acquisition unit, configured to process said audio signal, remove noise signals comprising background noise, air regulator inhalation noise, low pressure alarm noise, and personal alert safety system noise from said audio signal, and enhance a speech signal contained in said audio signal;

a first communication module configured to transmit said speech signal from said noise cancellation device to a communication device and receive an external speech signal transmitted by said communication device during said wireless communication; and one or more loudspeakers, in operative communication with one or more power amplifiers, configured to amplify and emit one or more of said speech signal and said external speech signal received from said communication device for facilitating said personal face-to-face communication through air and said wireless communication in said high noise environment; and a wireless coupling device attached to said communication device and configured to operably couple said noise cancellation device to said communication device, said wireless coupling device comprising:

a second communication module configured to receive said transmitted speech signal from said first communication module of said noise cancellation device and transmit said external speech signal from said communication device to said noise cancellation device during said wireless communication; and a microcontroller configured to transmit said received speech signal from said noise cancellation device to said communication device.

17. The wearable communication system of claim 16, wherein said microcontroller of said wireless coupling device is further configured to control an operation of said wireless coupling device to prevent interference of said wireless coupling device when said communication device operates as a standalone device.

18. The wearable communication system of claim 16, wherein said digital signal processing unit of said noise cancellation device comprises:

a pre-amplifier operably coupled to said contact microphone, said pre-amplifier configured to amplify said audio signal received from said contact microphone;

one or more power regulators configured to provide a stable voltage and current supply to said wearable communication system;

an energy storage device configured to provide power supply to said wearable communication system;

a digital signal processor configured to process said audio signal;

an analog to digital converter configured to convert said audio signal from an analog format to a digital format;

a digital to analog converter configured to convert said audio signal from said digital format to said analog format;

a flash memory configured to store computer program codes for said digital signal processor; and one or more power amplifiers, in operative communication with said one or more loudspeakers, configured to amplify said audio signal processed by said digital signal processor and said received external speech signal from said communication device.

19. The wearable communication system of claim 18, wherein said digital signal processor comprises:

a filter bank analysis unit configured to decompose a single channel full band audio signal into a plurality of sub band audio signals;

a noise reduction unit configured to suppress said noise signals in said audio signal;

a spectra equalization unit configured to equalize energy of said audio signal in low frequency bands and high frequency bands;

a voice activity detection unit configured to detect locations of said speech signal and a silence signal in said audio signal by one of change point detection and energy differencing; and a filter bank synthesis unit configured to combine said sub band audio signals together into a single channel full band speech signal.

20. The wearable communication system of claim 19, wherein said noise reduction unit comprises:

a Wiener filter based noise reduction unit configured to suppress said noise signals from said high noise environment and enhance quality of said speech signal;

a model based noise reduction unit configured to suppress said noise signals generated by said wearable unit; and a spectral subtraction noise reduction unit configured to reduce degrading effects of said noise signals acoustically added in said audio signal.

21. The wearable communication system of claim 20, wherein said model based noise reduction unit is configured to perform model based noise reduction by:

recording and storing a plurality of noise sound samples in a noise sound database;

training a plurality of sound models to represent statistical characteristics of said noise sound samples, wherein said sound models are represented by a Gaussian mixture model and a hidden Markov model;

decoding said audio signal and assigning a score to each of said trained sound models based on a comparison of said decoded audio signal with said each of said trained sound models;

identifying a noise sound model based on said assigned score of said each of said trained sound models; and removing said noise signals from said audio signal based on said identified noise sound model to obtain a clean said speech signal.

22. The wearable communication system of claim 20, wherein said model based noise reduction unit comprises a noise suppression unit comprising:

a filter bank analysis unit configured to decompose a single channel full band audio signal into a plurality of sub band audio signals;

a plurality of adaptive filters in an adaptive filter matrix configured to remove and suppress said noise signals on a sub band basis; and a filter bank synthesis unit configured to combine said sub band audio signals together into a single channel full band speech signal.

23. The wearable communication system of claim 19, wherein said voice activity detection unit comprises an optimal filter configured to detect decrease and increase in energy of said audio signal, wherein said optimal filter is further configured to utilize a set of energy thresholds to separate said speech signal into a silence state, an in-speech state, and a leaving speech state, wherein said set of said energy thresholds is configured by a minimum value of a sub band noise power within a finite window to estimate a noise floor.

24. The wearable communication system of claim 16, wherein said first microphone is located within said noise cancellation device and is operably connected to a voicemitter placed on said rigid surface of said wearable unit, and wherein said first microphone is configured to receive voice vibrations from said voicemitter.

25. The wearable communication system of claim 16, wherein said reverberations are mechanical vibrations excited by said user speech within said wearable unit, and wherein said contact microphone comprises an integrated piezoelectric transducer configured to transform said reverberations into electric analog signals.

26. The wearable communication system of claim 16, wherein said noise cancellation device is attached to said wearable unit.

27. The wearable communication system of claim 16, wherein said wearable unit is one of a mask, an item of clothing, and protective equipment.

28. The wearable communication system of claim 16, wherein said noise cancellation device is configured to receive said voice vibrations from said user speech via said first microphone, when said noise cancellation device is attached to a mask of said wearable unit.

29. The wearable communication system of claim 16, wherein said noise cancellation device is configured to receive voice vibrations from said user speech via a lapel microphone, when said noise cancellation device is attached to an item of clothing of said wearable unit.

30. The wearable communication system of claim 16, further comprising a panic button operably connected on said noise cancellation device, wherein said panic button is configured to trigger an alert signal and transmit a pre-recorded distress message stored in said noise cancellation device through said communication device to another device.

31. The wearable communication system of claim 16, wherein said second communication module of said wireless coupling device is securely paired with said first communication module of said noise cancellation device for preventing external wireless signals from interfering with communication of said speech signal and said external speech signal between said wireless coupling device and said noise cancellation device.

32. The wearable communication system of claim 16, further comprising a release button operably connected on said wireless coupling device, wherein said release button is configured to release control of said communication device for allowing said communication device to operate as a standalone device, when said wireless coupling device is attached to said communication device.

33. A method for personal face-to-face communication through air and wireless communication in a high noise environment, comprising:

providing a noise cancellation device comprising a speech acquisition unit, a digital signal processing unit in operative communication with said speech acquisition unit, a first communication module, and one or more loudspeakers in operative communication with one or more power amplifiers, wherein said speech acquisition unit comprises a contact microphone positioned on a rigid surface of a wearable unit;

operably coupling said noise cancellation device to a communication device using a wireless coupling device, wherein said wireless coupling device comprises a second communication module and a microcontroller;

receiving reverberations generated on said rigid surface of said wearable unit by voice vibrations from user speech within said wearable unit, by said contact microphone;

converting said received reverberations into an audio signal by said speech acquisition unit;

processing said audio signal by said digital signal processing unit of said noise cancellation device by removing noise signals comprising background noise, air regulator inhalation noise, low pressure alarm noise, and personal alert safety system noise from said audio signal, and enhancing a speech signal contained in said audio signal;

transmitting said speech signal from said noise cancellation device to said wireless coupling device via said first communication module of said noise cancellation device for facilitating said wireless communication through said communication device in said high noise environment, and to said one or more loudspeakers for facilitating said personal face-to-face communication through air in said high noise environment; and receiving an external speech signal transmitted by said communication device via said second communication module of said wireless coupling device by said noise cancellation device during said wireless communication.

34. The method of claim 33, further comprising amplifying and emitting said speech signal by said one or more loudspeakers in operative communication with said digital signal processing unit of said noise cancellation device during said personal face-to-face communication through air.

35. The method of claim 33, further comprising amplifying and emitting said external speech signal transmitted by said communication device during said wireless communication by said one or more loudspeakers of said noise cancellation device.

36. The method of claim 33, further comprising triggering an alert signal and transmitting a pre-recorded distress message by said noise cancellation device through said communication device to another device, on activation of a panic button operably connected on said noise cancellation device.

37. The method of claim 33, further comprising securely pairing said second communication module of said wireless coupling device with said first communication module of said noise cancellation device for preventing external wireless signals from interfering with communication of said speech signal and said external speech signal between said wireless coupling device and said noise cancellation device.

38. The method of claim 33, further comprising releasing control of said communication device by said wireless coupling device for allowing said communication device to operate as a standalone device, when said wireless coupling device is attached to said communication device, on activation of a release button operably connected on said wireless coupling device.

39. The noise cancellation device of claim 1, further comprising an in-the-ear microphone for picking up speech signals from cochlear emissions for said personal face-to-face communication through air and said wireless communication in said high noise environment, when said wearable unit is not worn in said high noise environment.

40. The noise cancellation device of claim 1, further comprising an in-the-ear microphone in addition to said contact microphone for picking up speech signals from cochlear emissions for improved personal face-to-face communication through air and wireless communication in said high noise environment.

* * * * *